United States Patent
Pan

(10) Patent No.: US 12,452,935 B2
(45) Date of Patent: Oct. 21, 2025

(54) METHOD AND APPARATUS FOR SUPPORTING DISCOVERY INTEGRATED INTO DIRECT LINK ESTABLISHMENT PROCEDURE IN A WIRELESS COMMUNICATION SYSTEM

(71) Applicant: ASUS Technology Licensing Inc., Taipei (TW)

(72) Inventor: Li-Te Pan, Taipei (TW)

(73) Assignee: ASUS Technology Licensing Inc., Taipei (TW)

(*) Notice: Subject to any disclaimer, the term of this patent is extended or adjusted under 35 U.S.C. 154(b) by 0 days.

(21) Appl. No.: 18/518,011

(22) Filed: Nov. 22, 2023

(65) Prior Publication Data

US 2024/0179764 A1    May 30, 2024

Related U.S. Application Data

(60) Provisional application No. 63/428,001, filed on Nov. 25, 2022.

(51) Int. Cl.
*H04W 76/10* (2018.01)
*H04W 76/14* (2018.01)
(Continued)

(52) U.S. Cl.
CPC .......... *H04W 76/10* (2018.02); *H04W 76/14* (2018.02); *H04W 76/18* (2018.02); *H04W 76/38* (2018.02); *H04W 88/04* (2013.01); *H04W 92/18* (2013.01)

(58) Field of Classification Search
CPC ..... H04W 76/10; H04W 76/14; H04W 76/15; H04W 76/38; H04W 88/04; H04W 92/18;
(Continued)

(56) References Cited

U.S. PATENT DOCUMENTS

2017/0311293 A1* 10/2017 Jung .............. H04W 76/14
2019/0082495 A1* 3/2019 Kim .............. H04W 48/16
(Continued)

FOREIGN PATENT DOCUMENTS

WO    2022/233296    10/2022

OTHER PUBLICATIONS

"3GPP TS 23-287 V17.4.0," 3rd Generation Partnership Project; Technical Specification Group Services and System Aspects; Architecture enhancements for 5G System (5GS) to support Vehicle-to-Everything (V2X) services (Release 17), pp. 1-60 (Year: 2022).*
(Continued)

*Primary Examiner* — Thomas R Cairns
(74) *Attorney, Agent, or Firm* — Cooper Legal Group LLC

(57) ABSTRACT

A method and device for a relay User Equipment (UE). In one embodiment, the relay UE receives a first PC5 message from a first remote UE for initiating a first direct link establishment procedure for a UE-to-UE (U2U) relay communication with a second remote UE. Furthermore, the relay UE, in response to reception of the first PC5 message, sends a second PC5 message for initiating a second direct link establishment procedure for the U2U relay communication with the first remote UE. In addition, the relay UE sends a reject message corresponding to the first PC5 message to the first remote UE if the second direct link establishment procedure is not completed within a period.

20 Claims, 28 Drawing Sheets

(51) Int. Cl.
　　　*H04W 76/18*　　　(2018.01)
　　　*H04W 76/38*　　　(2018.01)
　　　*H04W 88/04*　　　(2009.01)
　　　*H04W 92/18*　　　(2009.01)

(58) Field of Classification Search
　　　CPC ..... H04W 76/18; H04W 8/005; H04W 40/22; H04W 40/24; H04W 40/246; H04W 76/11; H04B 7/15
　　　See application file for complete search history.

(56) References Cited

U.S. PATENT DOCUMENTS

| | | | |
|---|---|---|---|
| 2022/0377524 A1* | 11/2022 | Ferdi | H04W 8/005 |
| 2023/0328828 A1* | 10/2023 | Wu | H04W 76/38 370/315 |
| 2023/0354144 A1* | 11/2023 | Fu | H04W 40/22 |

OTHER PUBLICATIONS

"3GPP TR 23.752 V17.0.0," 3rd Generation Partnership Project; Technical Specification Group Services and System Aspects; Study on system enhancement for Proximity based Services (ProSe) in the 5G System (5GS) (Release 17), pp. 1-183 (Year: 2021).*

ZTE, "Replace 5G PRUK ID with PRUK ID," 3GPP TSG-CT WG1 Meeting #137-e, E-Meeting, Aug. 18-26, 2022, 3rd Generation Partnership Project, pp. 1-9 (Year: 2022).*

* cited by examiner

Legend:
- PC5-U: The SDAP/PDCP/RLC/MAC/PHY functionality is specified in TS 38.300 [12].

METHOD AND APPARATUS FOR SUPPORTING DISCOVERY INTEGRATED INTO DIRECT LINK ESTABLISHMENT PROCEDURE IN A WIRELESS COMMUNICATION SYSTEM

CROSS-REFERENCE TO RELATED APPLICATIONS

The present application claims the benefit of U.S. Provisional Patent Application Ser. No. 63/428,001 filed on Nov. 25, 2022, the entire disclosure of which is incorporated herein in its entirety by reference.

FIELD

This disclosure generally relates to wireless communication networks, and more particularly, to a method and apparatus for supporting discovery integrated into direct link establishment procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a relay User Equipment (UE). In one embodiment, the relay UE receives a first PC5 message from a first remote UE for initiating a first direct link establishment procedure for a UE-to-UE (U2U) relay communication with a second remote UE. Furthermore, the relay UE, in response to reception of the first PC5 message, sends a second PC5 message for initiating a second direct link establishment procedure for the U2U relay communication with the first remote UE. In addition, the relay UE sends a reject message corresponding to the first PC5 message to the first remote UE if the second direct link establishment procedure is not completed within a period.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.287 V17.4.0, "Architecture enhancements for 5G System (5GS) to support Vehicle-to-Everything (V2X) services"; TS 23.304 V17.3.0, "Proximity based Services (ProSe) in the 5G System (5GS) (Release 17)"; TS 24.554 v17.2.1, "Proximity-services (ProSe) in 5G System (5GS) protocol aspects; Stage 3 (Release 17)"; TS 38.331 V17.2.0, "NR; Radio Resource Control (RRC) protocol specification (Release 17)"; TR 38.836 V17.0.0, "Study on NR sidelink relay; (Release 17)"; TR 23.700-33 V1.1.0, "Study on system enhancement for Proximity based Services (ProSe) in the 5G System (5GS); Phase 2 (Release 18)"; TS 38.323 V17.2.0, "Radio Resource Control (RRC) protocol specification (Release 17)"; RAN2 #119-e chairman's note "RAN2-119-e-Positioning-Relay-2022-08-26-2000_com"; and RAN2 #119bis-e chairman's note "RAN2-119bis-e-Positioning-Relay-2022-10-19-2000_EOM". The standards and documents listed above are hereby expressly incorporated by reference in their entirety.

Figure 1:
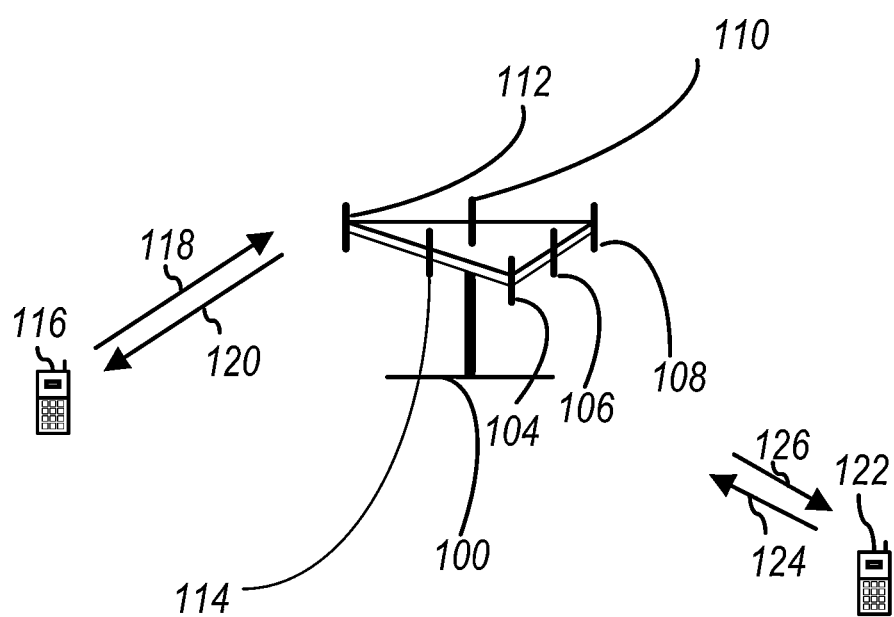
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
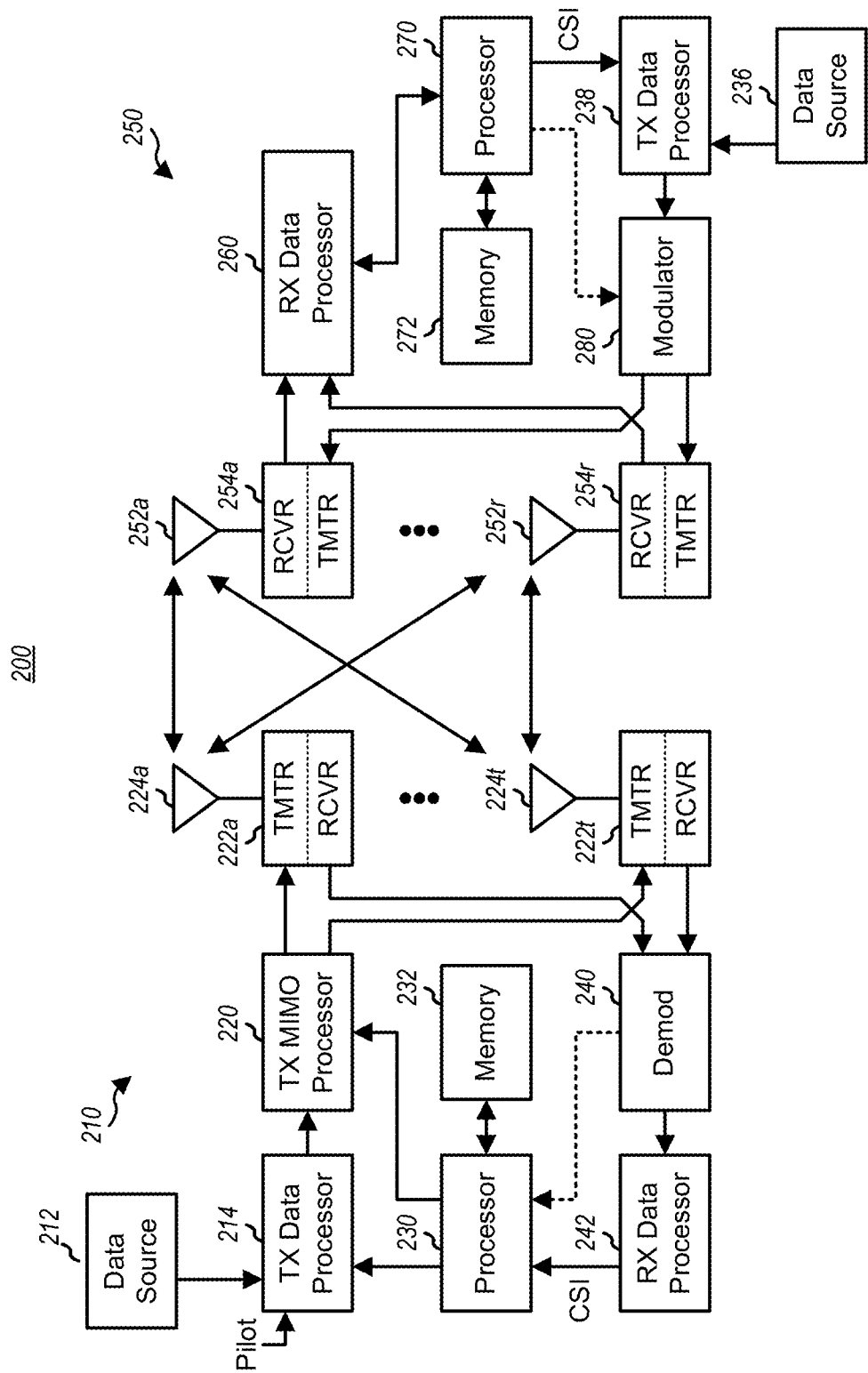
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides Nr modulation symbol streams to Nr transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from Nr antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
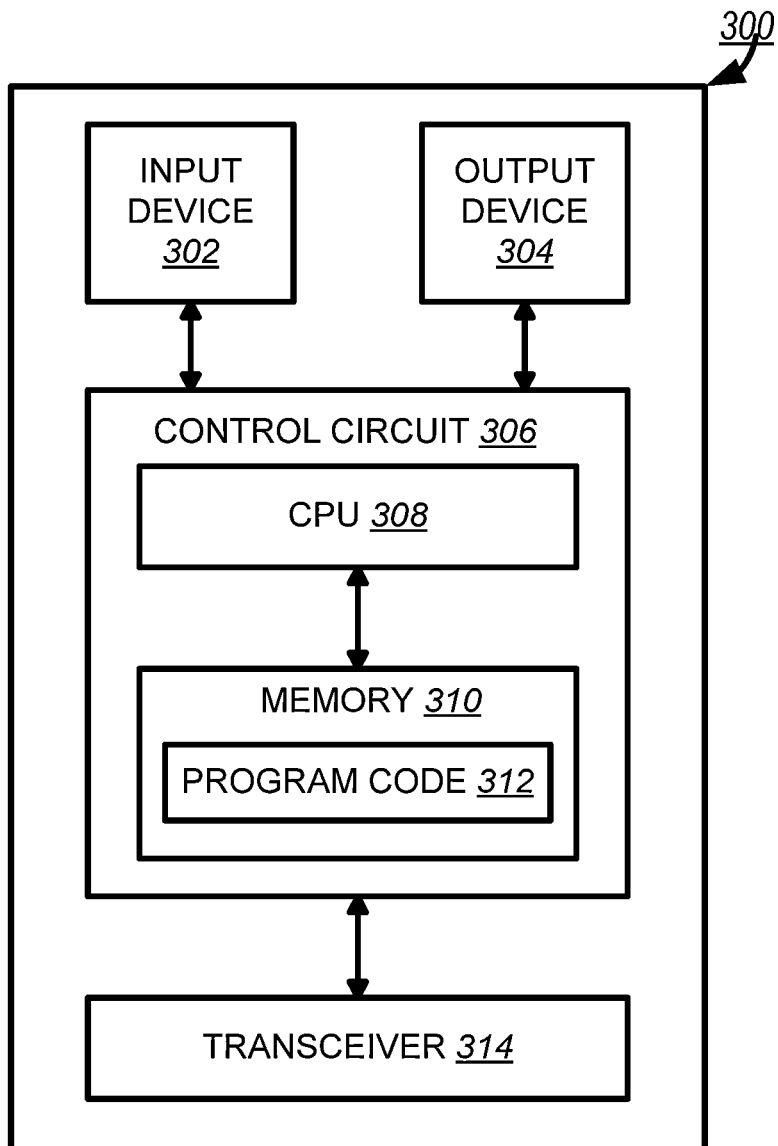
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
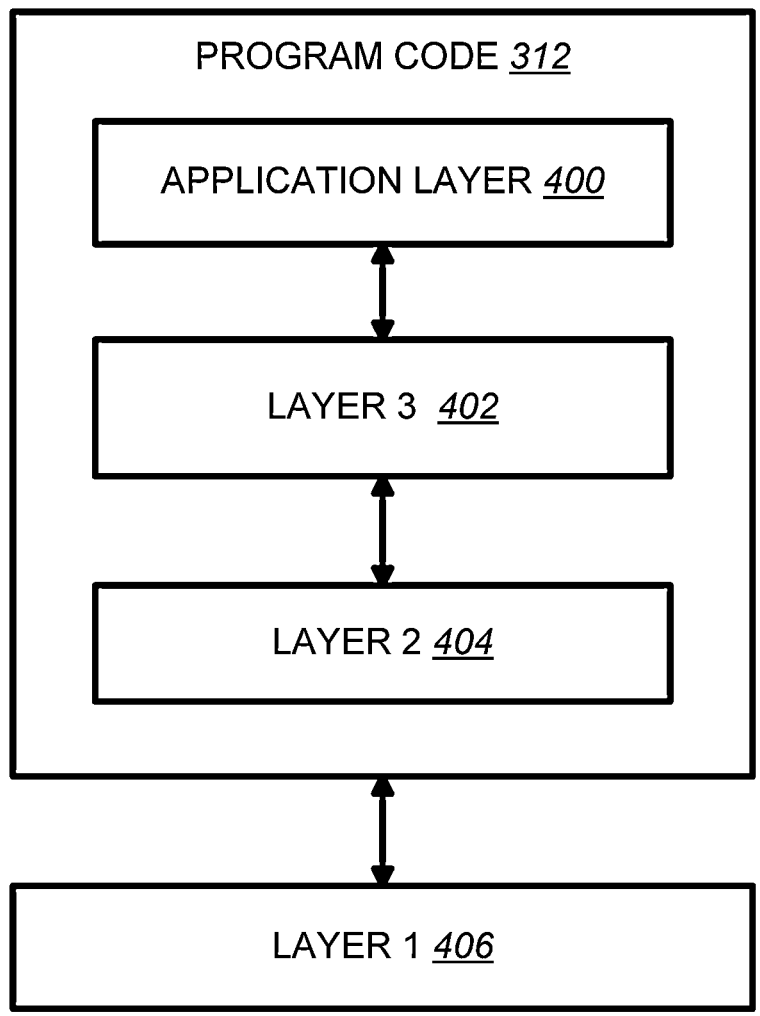
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
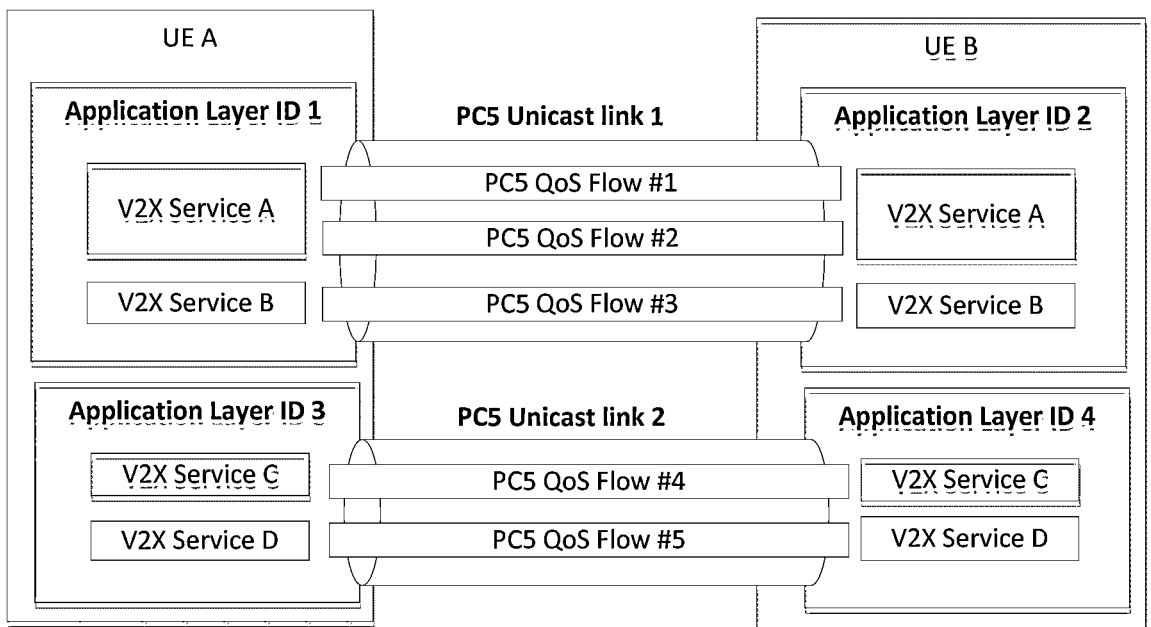
FIG. 5 is a reproduction of FIG. 5.2.1.4-1 of 3GPP TS 23.287 V17.4.0.

3GPP TS 23.287 introduced the following:
5.2.1.4 Unicast Mode Communication Over PC5 Reference Point Unicast mode of communication is only supported over NR based PC5 reference point. FIG.
5.2.1.4-1 Illustrates an Example of PC5 Unicast Links.
[FIG. 5.2.1.4-1 of 3GPP TS 23.287 V17.4.0, Entitled "Example of PC5 Unicast Links", is Reproduced as FIG. 5]

The following principles apply when the V2X communication is carried over PC5 unicast link:
  A PC5 unicast link between two UEs allows V2X communication between one or more pairs of peer V2X services in these UEs. All V2X services in the UE using the same PC5 unicast link use the same Application Layer ID.
  NOTE 1: An Application Layer ID can change in time as described in clauses 5.6.1.1 and 6.3.3.2, due to privacy. This does not cause a re-establishment of a PC5 unicast link. The UE triggers a Link Identifier Update procedure as specified in clause 6.3.3.2.
  One PC5 unicast link supports one or more V2X service types) if these V2X service types are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.
  NOTE 2: A source UE is not required to know whether different target Application Layer IDs over different PC5 unicast links belong to the same target UE.
  A PC5 unicast link supports V2X communication using a single network layer protocol e.g. IP or non-IP.
  A PC5 unicast link supports per-flow QoS model as specified in clause 5.4.1.
  If multiple V2X service types use a PC5 unicast link, one PC5 QoS Flow identified by PFI may be associated with more than one V2X service types.

When the Application layer in the UE initiates data transfer for a V2X service type which requires unicast mode of communication over PC5 reference point:
  the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service type as specified in clause 6.3.3.4; otherwise
  the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response/Ack, Disconnect Request/Response, Link Modification Request/Accept, Keep-alive/Ack) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:
  Application Layer ID and Layer-2 ID of UE A; and
  Application Layer ID and Layer-2 ID of UE B; and
  network layer protocol used on the PC5 unicast link; and
  the information about PC5 QOS Flow(s). For each PC5 QoS Flow, the PC5 QoS Context and the PC5 QoS Rule(s) as defined in clause 5.4.1.1.3.

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one V2X service type (e.g. the UE establishes multiple unicast links with multiple UEs for a same V2X service type).

The Unicast Link Profile shall be updated accordingly after a Layer-2 link modification for an established PC5 unicast link as specified in clause 6.3.3.4 or Layer-2 link identifier update as specified in clause 6.3.3.2.

Upon receiving an indication from the AS layer that the PC5-RRC connection was released due to RLF, the V2X layer in the UE locally releases the PC5 unicast link associated with this PC5-RRC connection. The AS layer uses PC5 Link Identifier to indicate to the V2X layer the PC5 unicast link whose PC5-RRC connection was released.

When the PC5 unicast link has been released as specified in clause 6.3.3.3, the V2X layer of each UE for the PC5 unicast link informs the AS layer that the PC5 unicast link has been released. The V2X layer uses PC5 Link Identifier to indicate the released unicast link.

3GPP 23.304 introduced some procedures related to unicast link communication as follows:

5.3.4 Unicast Mode 5G ProSe Direct Communication

Unicast mode of 5G ProSe direct communication is supported over NR based PC5 reference point. A PC5 unicast link between two UEs is established for the 5G ProSe direct communication; and the PC5 unicast link could be maintained, modified, and released according to the application layer requests or communication requirements.

For the PC5 unicast link of the 5G ProSe direct communication, the principal for the PC5 unicast link of V2X communication described in TS 23.287 [2] clause 5.2.1.4 is reused with the following differences:
  V2X service is replaced by ProSe Application;
  V2X service type is replaced by ProSe identifier;
  New data unit types are supported (including IPv4, Ethernet and Unstructured).
  [ . . . ]

5.8.2 Identifiers for 5G ProSe Direct Communication
5.8.2.1 General

Each UE has one or more Layer-2 IDs for 5G ProSe direct communication over PC5 reference point, consisting of:
  Source Layer-2 ID(s); and
  Destination Layer-2 ID(s).

Source and Destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames. The selection of the Source and Destination Layer-2 ID(s) by a UE depends on the communication mode of 5G ProSe direct communication over PC5 reference point for this layer-2 link, as described in clauses 5.8.2.2, 5.8.2.3, and 5.8.2.4. The Source Layer-2 IDs may differ between different communication modes.
  [ . . . ]

5.8.2.4 Identifiers for Unicast Mode 5G ProSe Direct Communication

For unicast mode of 5G ProSe direct communication over PC5 reference point, the Destination Layer-2 ID used depends on the communication peer. The Layer-2 ID of the communication peer, identified by the peer's Application Layer ID, may be discovered during the establishment of the PC5 unicast link, or known to the UE via prior ProSe direct communications, e.g. existing or prior unicast link to the same Application Layer ID, or obtained from 5G ProSe direct discovery process. The initial signalling for the establishment of the PC5 unicast link may use the known Layer-2 ID of the communication peer, or a default destination Layer-2 ID associated with the ProSe service (i.e. ProSe identifier) configured for PC5 unicast link establishment, as specified in clause 5.1.3.1. During the PC5 unicast link establishment procedure, Layer-2 IDs are exchanged, and should be used for future communication between the two UEs, as specified in clause 6.4.3.

The UE maintains a mapping between the Application Layer IDs and the source Layer-2 IDs used for the PC5 unicast links, as the ProSe application layer does not use the Layer-2 IDs. This allows the change of source Layer-2 ID without interrupting the ProSe applications.

When Application Layer IDs change, the source Layer-2 ID(s) of the PC5 unicast link(s) shall be changed if the link(s) was used for 5G ProSe communication with the changed Application Layer IDs.

Based on privacy configuration as specified in clause 5.1.3.1, the update of the new identifiers of a source UE to the peer UE for the established unicast link may cause the peer UE to change its Layer-2 ID and optionally IP address/prefix if IP communication is used as defined in clause 6.4.3.2.
  [ . . . ]

6.1.1.2.2 PC5 Signalling Protocol

The PC5 Signalling Protocol stack specified in clause 6.1.2 of TS 23.287 [2] is used. The protocol used for the control plane signalling over the PC5 reference point for the secure layer-2 link is specified in clauses 6.4.3, 6.5.1 and 6.5.2.
  [ . . . ]

6.1.2.2 UE—UE

Figure 6:
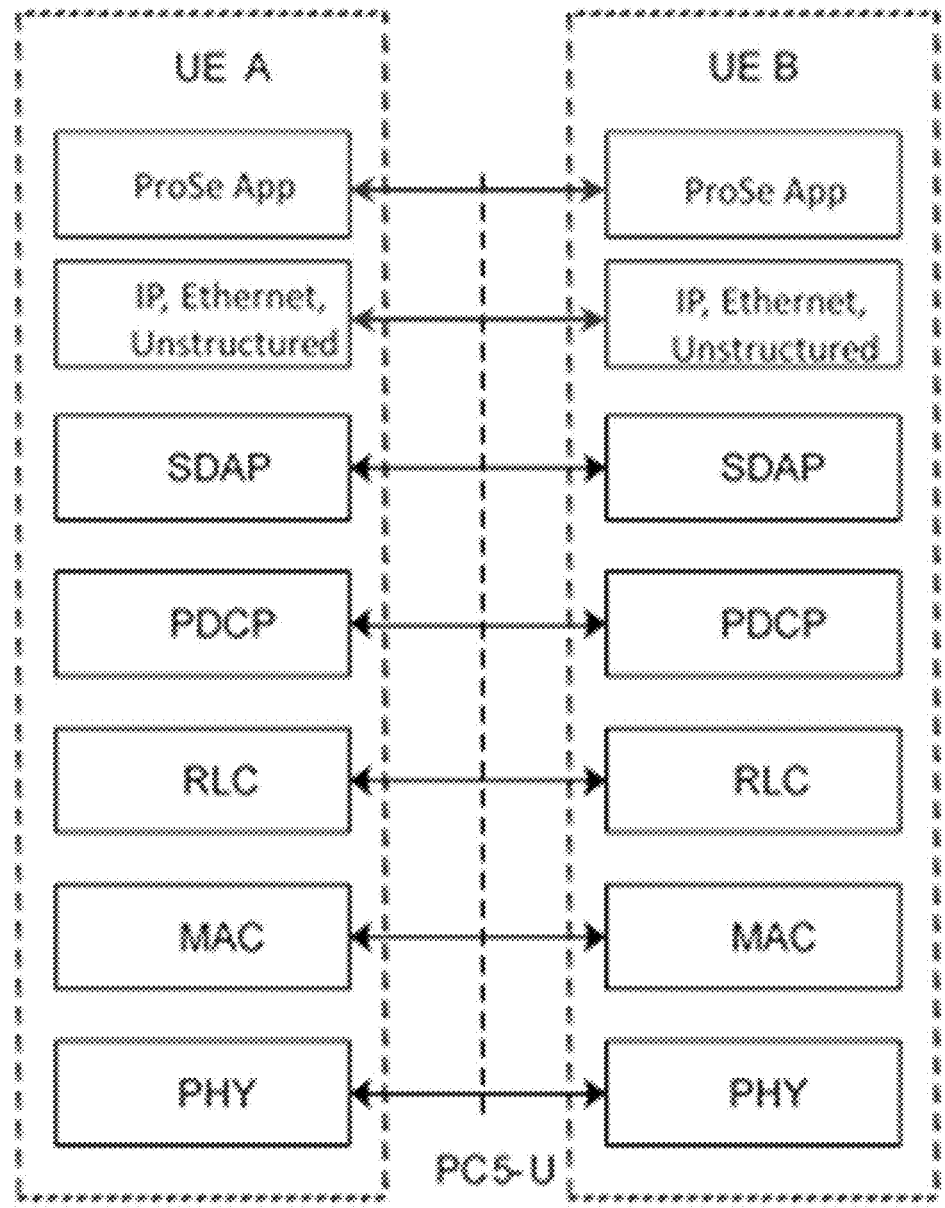
FIG. 6 is a reproduction of FIG. 6.1.2.2-1 of 3GPP TS 23.304 V17.3.0.

FIG. 6.1.2.2-1 depicts a user plane for NR PC5 reference point, i.e. PC5 User Plane Protocol stack.

[FIG. 6.1.2.2-1 of 3GPP TS 23.304 V17.3.0, Entitled "User Plane for NR PC5 Reference Point", is Reproduced as FIG. 6]

IP, Ethernet and Unstructured PDCP SDU types are supported. For IP PDCP SDU type, both IPv4 and IPv6 are supported.

The packets from ProSe application layer are handled by the ProSe layer before transmitting them to the AS layer, e.g. ProSe layer maps the IP, Ethernet and Unstructured packets to PC5 QoS Flow and marks the corresponding PFI.
  [ . . . ]

6.3.2 5G ProSe Direct Discovery Procedures Over PC5 Reference Point 6.3.2.1 General A PC5 communication channel is used to carry the discovery message over PC5 and the discovery message over PC5 is differentiated from other PC5 messages by AS layer. Both Model A and Model B discovery as defined in TS 23.303 [3] are supported:
  Model A uses a single discovery protocol message (Announcement).
  Model B uses two discovery protocol messages (Solicitation and Response).

Depicted in FIG. 6.3.2.1-1 is the procedure for 5G ProSe Direct Discovery with Model A.

Figure 7:
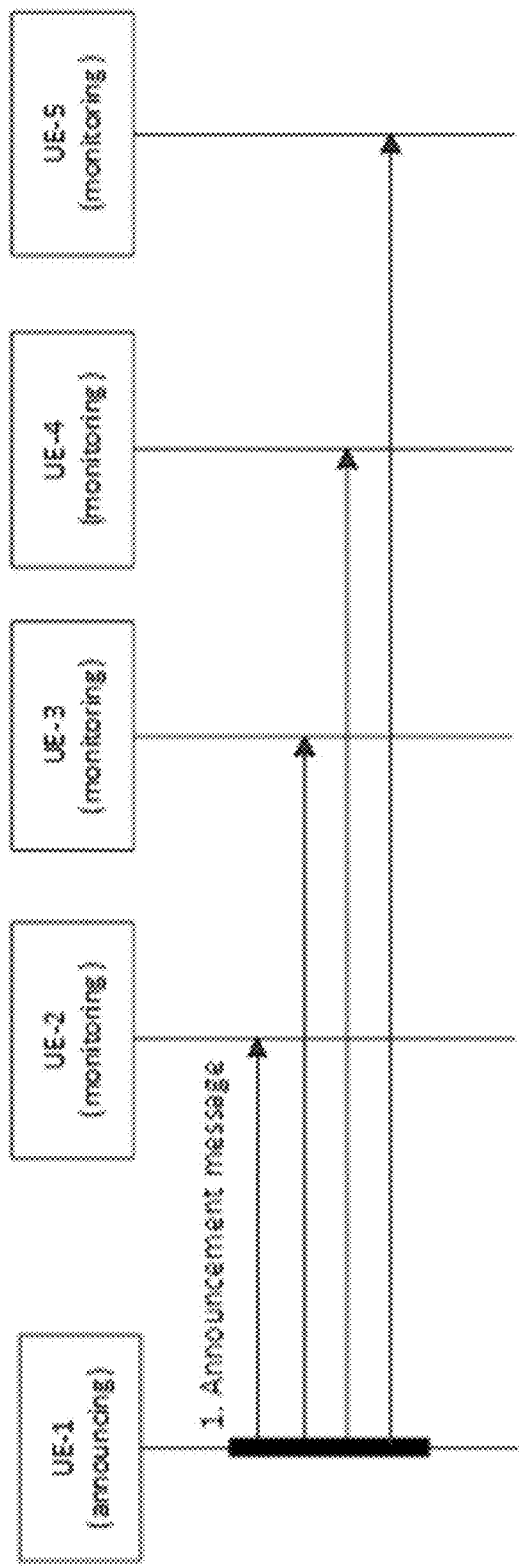
FIG. 7 is a reproduction of FIG. 6.3.2.1-1 of 3GPP TS 23.304 V17.3.0.

[FIG. 6.3.2.1-1 of 3GPP TS 23.304 V17.3.0, Entitled "5G ProSe Direct Discovery with Model A", is Reproduced as FIG. 7]

1. The Announcing UE sends an Announcement message. The Announcement message may include the Type of Discovery Message, ProSe Application Code or ProSe Restricted Code, security protection element, [metadata information]. The Application layer metadata information may be included as metadata in the Announcement message.
   The Destination Layer-2 ID and Source Layer-2 ID used to send the Announcement message are specified in clause 5.8.1.2 and clause 5.8.1.3.

Figure 8:
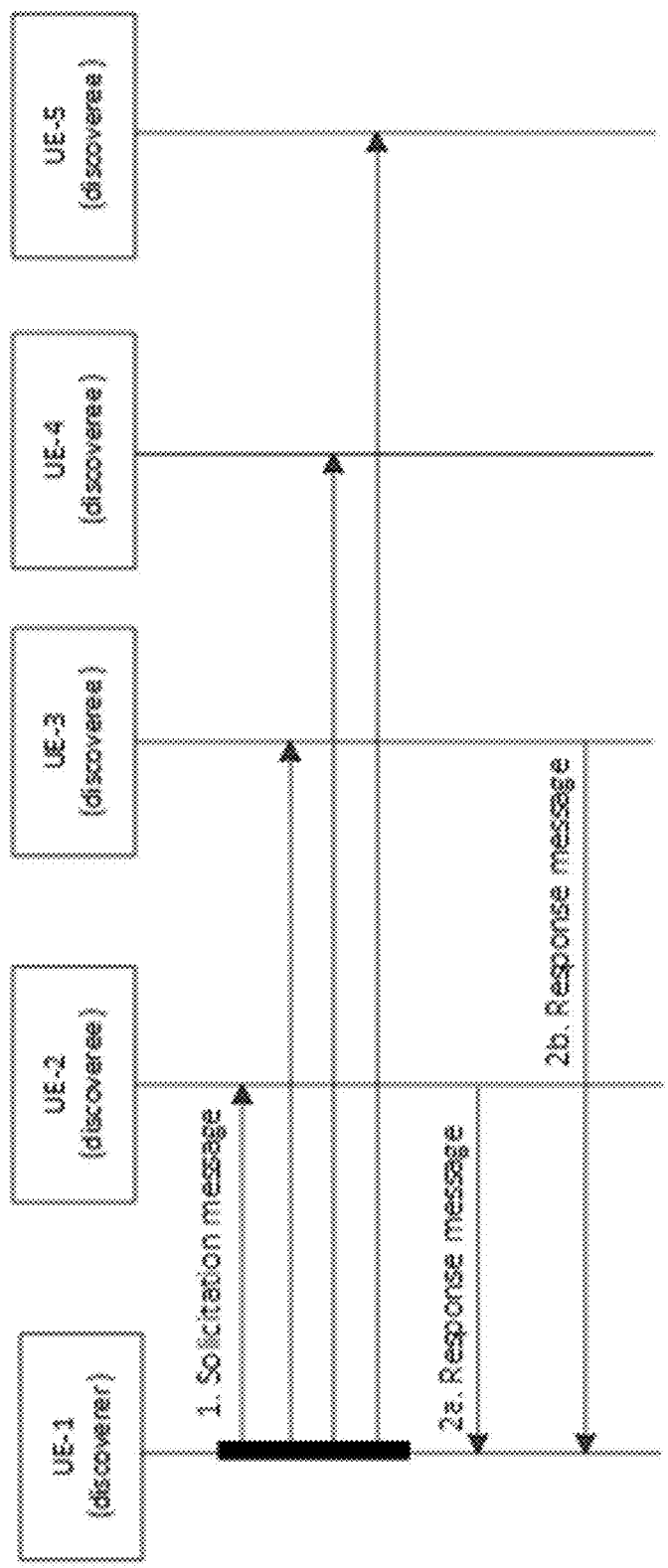
FIG. 8 is a reproduction of FIG. 6.3.2.1-2 of 3GPP TS 23.304 V17.3.0.

The Monitoring UE determines the Destination Layer-2 ID for signalling reception. The Destination Layer-2 ID is configured with the UE(s) as specified in clause 5.8.1.2. Depicted in FIG. 6.3.2.1-2 is the procedure for 5G ProSe Direct Discovery with Model B.
[FIG. 6.3.2.1-2 of 3GPP TS 23.304 V17.3.0, Entitled "5G ProSe Direct Discovery with Model B", is Reproduced as FIG. 8]

1. The Discoverer UE sends a Solicitation message. The Solicitation message may include Type of Discovery Message, ProSe Query Code, security protection element.

The Destination Layer-2 ID and Source Layer-2 ID used to send the Solicitation message are specified in clause 5.8.1.2 and clause 5.8.1.3.

How the Discoveree UE determines the Destination Layer-2 ID for signalling reception is specified in clause 5.8.1.2.

2. The Discoveree UE that matches the solicitation message responds to the Discoverer UE with the Response message. The Response message may include Type of Discovery Message, ProSe Response Code, security protection element, [metadata information]. The Application layer metadata information may be included as metadata in the Response message.

The Source Layer-2 ID used to send the Response message is specified in clause 5.8.1.3.

The Destination Layer-2 ID is set to the Source Layer-2 ID of the received Solicitation message.

NOTE: Details of Security Protection Element Will be Defined by SA WG3.

[ . . . ]

6.4.3 Unicast Mode 5G ProSe Direct Communication
6.4.3.1 Layer-2 Link Establishment Over PC5 Reference Point To perform unicast mode of ProSe Direct communication over PC5 reference point, the UE is configured with the related information as described in clause 5.1.3.

Figure 9:
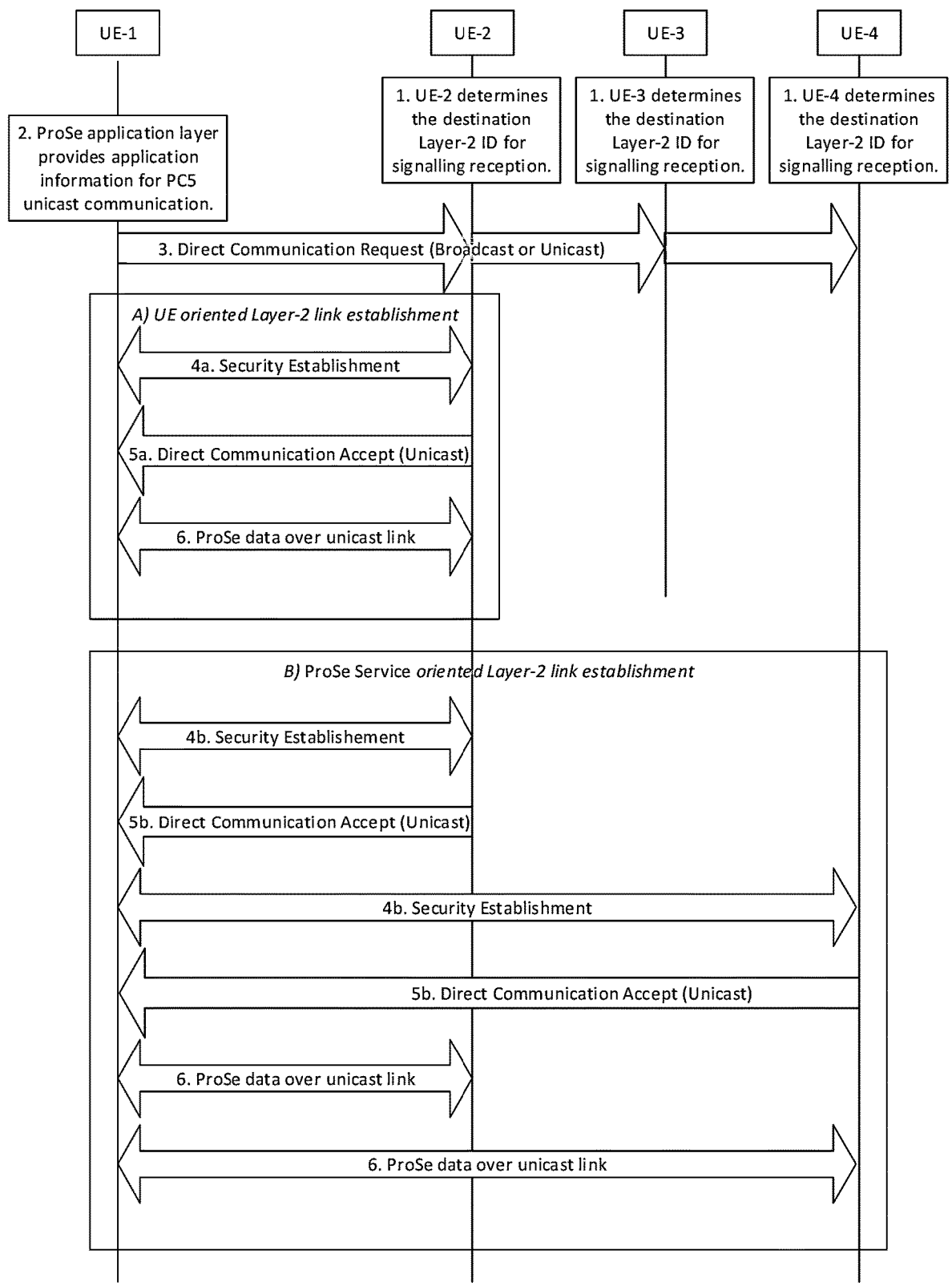
FIG. 9 is a reproduction of FIG. 6.4.3.1-1 of 3GPP TS 23.304 V17.3.0.

FIG. 6.4.3.1-1 shows the layer-2 link establishment procedure for the unicast mode of ProSe Direct communication over PC5 reference point.
[FIG. 6.4.3.1-1 of 3GPP TS 23.304 V17.3.0, Entitled "Layer-2 Link Establishment Procedure", is Reproduced as FIG. 9]

1. The UE(s) determine the destination Layer-2 ID for signalling reception for PC5 unicast link establishment as specified in clause 5.8.2.4.

2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QOS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPV6 address allocation mechanism is supported by the initiating UE, i.e., acting as an IPV6 Router; or "DHCPv4 server & IPV6 Router" if both IPv4 and IPV6 address allocation mechanism are supported by the initiating UE; or "address allocation not supported" if neither IPv4 nor IPv6 address allocation mechanism is supported by the initiating UE.

Link-Local IPV6 Address: a link-local IPv6 address formed locally based on RFC 4862 if UE-1 does not support the IPV6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:
   5a. (UE oriented Layer-2 link establishment) If the Target User Info is included in the Direct Communication Request message, the target UE, i.e. UE-2 responds with a Direct Communication Accept message if the Application Layer ID for UE-2 matches.
   5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).

Optional PC5 QoS Rule(s).

If IP communication is used:
   IP Address Configuration: For IP communication, IP address configuration is required for this link and indicates one of the following values:
      "DHCPv4 server" if only IPv4 address allocation mechanism is supported by the target UE, i.e., acting as a DHCPv4 server; or
      "IPv6 Router" if only IPV6 address allocation mechanism is supported by the target UE, i.e., acting as an IPV6 Router; or
      "DHCPv4 server & IPV6 Router" if both IPv4 and IPV6 address allocation mechanism are supported by the target UE; or
      "address allocation not supported" if neither IPv4 nor IPV6 address allocation mechanism is supported by the target UE.
   Link-Local IPV6 Address: a link-local IPv6 address formed locally based on RFC 4862 if the target UE does not support the IPV6 IP address allocation mechanism, i.e. the IP Address Configuration indicates "address allocation not supported", and UE-1 included a link-local IPV6 address in the Direct Communication Request message. The target UE shall include a non-conflicting link-local IPv6 address.

If both UEs (i.e. the initiating UE and the target UE) are selected to use link-local IPV6 address, they shall disable the duplicate address detection defined in RFC 4862 [17].

NOTE 3: When either the initiating UE or the target UE indicates the support of IPV6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. ProSe data is transmitted over the established unicast link as below:
   The PC5 Link Identifier and PFI are provided to the AS layer, together with the ProSe data. Optionally in addition, the Layer-2 ID information (i.e. source Layer-2 ID and destination Layer-2 ID) is provided to the AS layer.
   NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).
   NOTE 5: PC5 unicast link is bi-directional, therefore the peer UE of UE-1 can send the ProSe data to UE-1 over the unicast link with UE-1.

6.4.3.4 Layer-2 Link Modification for a Unicast Link

FIG. 6.4.3.4-1 shows the layer-2 link modification procedure for a unicast link. This procedure is used to:
   add new PC5 QOS Flow(s) in the existing PC5 unicast link.
      This covers the case for adding new PC5 QoS Flow(s) to the existing ProSe service(s) as well as the case for adding new PC5 QoS Flow(s) to new ProSe service(s).
   modify existing PC5 QoS Flow(s) in the existing PC5 unicast link.
      This covers the case for modifying the PC5 QOS parameters for existing PC5 Qos Flow(s).
      This also covers the case for removing the associated ProSe service(s) from existing PC5 QoS Flow(s) as well as the case for associating new ProSe service(s) with existing PC5 QoS Flow(s).
   remove existing PC5 QoS Flow(s) in the existing PC5 unicast link.

Figure 10:
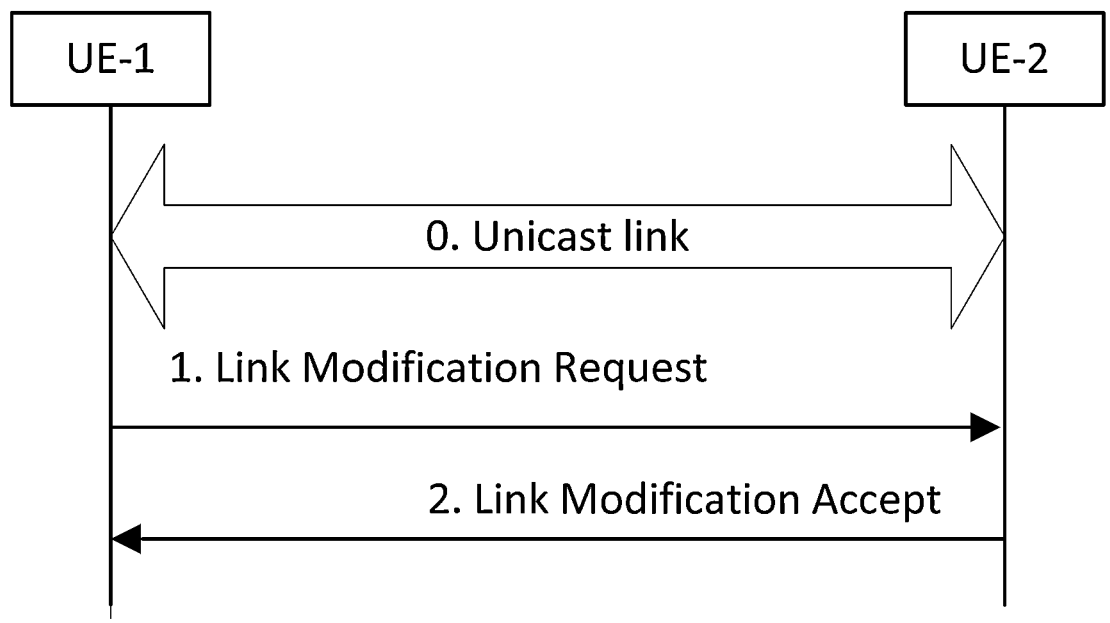
FIG. 10 is a reproduction of FIG. 6.4.3.4-1 of 3GPP TS 23.304 V17.3.0.

[FIG. 6.4.3.4-1 of 3GPP TS 23.304 V17.3.0, Entitled "Layer-2 Link Modification Procedure", is Reproduced as FIG. 10]

0. UE-1 and UE-2 have a unicast link established as described in clause 6.4.3.1.
1. The ProSe application layer in UE-1 provides application information for PC5 unicast communication. The application information includes the ProSe Service Info and the initiating UE's Application Layer ID. The target UE's Application Layer ID may be included in the application information. If UE-1 decides to reuse the existing PC5 unicast link as specified in clause 5.3.4, so decides to modify the unicast link established with UE-2, UE-1 sends a Link Modification Request to UE-2.

The Link Modification Request message includes:
a) To add new PC5 QoS Flow(s) in the existing PC5 unicast link:
   QOS Info: the information about PC5 QoS Flow(s) to be added. For each PC5 Qos Flow, the PFI, the corresponding PC5 QOS parameters (i.e. PQI and conditionally other parameters such as MFBR/GFBR, etc.) and optionally the associated ProSe identifier(s).
   Optional PC5 QoS Rule(s).
b) To modify PC5 QoS Flow(s) in the existing PC5 unicast link:

QoS Info: the information about PC5 QoS Flow(s) to be modified. For each PC5 QoS Flow, the PFI, the corresponding PC5 QOS parameters (i.e. PQI and conditionally other parameters such as MFBR/GFBR, etc.) and optionally the associated ProSe identifier(s).

Optional PC5 QoS Rule(s).

c) To remove PC5 QoS Flow(s) in the existing PC5 unicast link:

PFIs.

2. UE-2 responds with a Link Modification Accept message.

The Link Modification Accept message includes:

For case a) and case b) described in step 1:

QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and optionally the associated ProSe identifier(s).

Optional PC5 QoS Rule(s).

The ProSe layer of each UE provides information about the unicast link modification to the AS layer. This enables the AS layer to update the context related to the modified unicast link.

6.4.3.5 Layer-2 Link Maintenance Over PC5 Reference Point

The PC5 Signalling Protocol shall support keep-alive functionality that is used to detect if a particular PC5 unicast link is still valid. Either side of the PC5 unicast link can initiate the layer-2 link maintenance procedure (i.e. keep-alive procedure), based on for example triggers from the AS layer or internal timers. The UEs shall minimize the keep-alive signalling, e.g. cancel the procedure if data are successfully received over the PC5 unicast link.

Figure 11:
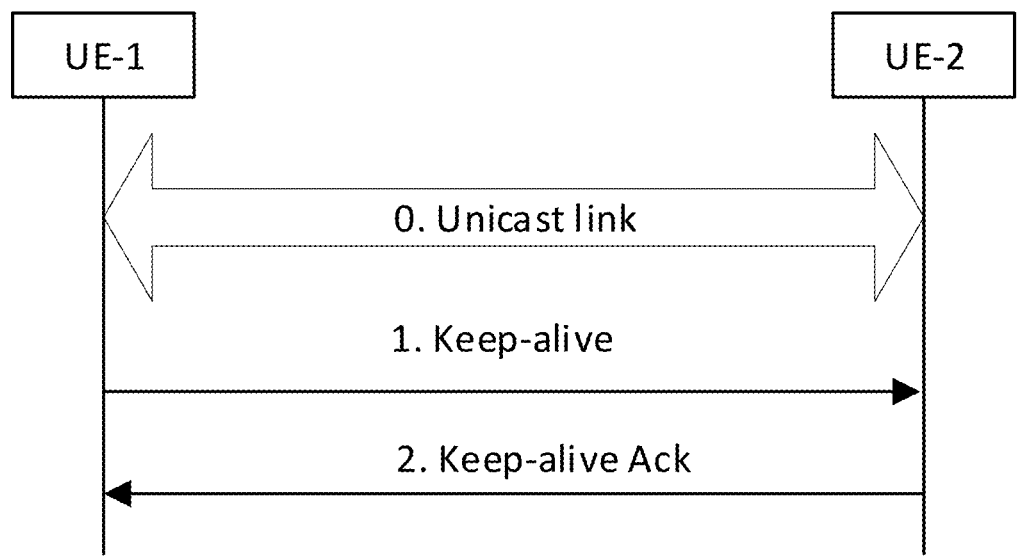
FIG. 11 is a reproduction of FIG. 6.4.3.5-1 of 3GPP TS 23.304 V17.3.0.

[FIG. 6.4.3.5-1 of 3GPP TS 23.304 V17.3.0, Entitled "Layer-2 Link Maintenance Procedure", is Reproduced as FIG. 11]

0. UE-1 and UE-2 have a unicast link established as described in clause 6.4.3.1.
1. Based on trigger conditions, UE-1 sends a Keep-alive message to UE-2 in order to determine the status of the PC5 unicast link.

NOTE 1: It is left to Stage 3 to determine the exact triggers for the keep-alive messages. For example, the trigger can be based on a timer associated with the Layer-2 link. The timer can be reset with a successful reception event defined by TS 38.300 [12].

2. Upon reception of the Keep-alive message, UE-2 responds with a Keep-alive Ack message. The UE initiating the keep-alive procedure shall determine the follow-up actions based on the result of the signalling, e.g. proceed with implicit layer-2 link release.

NOTE 2: It is left to Stage 3 to determine the follow-up actions. For example, a successful reception event can also cancel the layer-2 link release if received in time.

3GPP TS 24.554 introduced some procedures related to unicast link communication as follows:

7.2.2 5G ProSe Direct Link Establishment Procedure 7.2.2.1 General

Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G ProSe direct link between two UEs or to establish multiple 5G ProSe direct links. The UE sending the request message is called the "initiating UE" and the other UE is called the "target UE". If the request message does not indicate the specific target UE (i.e., target user info is not included in the request message), and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE: The recommended maximum number of established 5G ProSe direct link is 8.

When the 5G ProSe direct link establishment procedure for a 5G ProSe layer-3 remote UE completes successfully, and if there is a PDU session established for relaying the traffic of the remote UE, the 5G ProSe layer-3 UE-to-network relay UE shall perform the remote UE report procedure as specified in 3GPP TS 24.501 [11].

After the 5G ProSe direct link establishment procedure for a 5G ProSe layer-2 remote UE completes successfully, and upon getting a request from the 5G ProSe layer-2 remote UE through lower layers, the 5G ProSe layer-2 UE-to-network relay UE, if in 5GMM-IDLE mode, shall inform lower layers to perform a service request procedure as specified in 3GPP TS 24.501 [11].

Editor's note: Any possible changes to the 5G ProSe direct link establishment procedure due to the security requirements of 5G ProSe layer-2 UE-to-network relay or 5G ProSe layer-3 UE-to-network relay (such as adding new IEs or changing existing IEs) are FFS.

7.2.2.2 5G ProSe Direct Link Establishment Procedure Initiation by Initiating UE The initiating UE shall meet the following pre-conditions before initiating this procedure:

a) a request from upper layers to transmit the packet for ProSe application over PC5;

b) the communication mode is unicast mode (e.g., pre-configured as specified in clause 5.2.4 or indicated by upper layers);

c) the link layer identifier for the initiating UE (i.e., layer-2 ID used for unicast communication) is available (e.g., pre-configured or self-assigned) and is not being used by other existing 5G ProSe direct links within the initiating UE;

d) the link layer identifier for the destination UE (i.e., the unicast layer-2 ID of the target UE or the broadcast layer-2 ID) is available to the initiating UE (e.g., pre-configured, obtained as specified in clause 5.2 or known via prior ProSe direct communication);

NOTE 1: In the case where different ProSe applications are mapped to distinct default destination layer-2 IDs, when the initiating UE intends to establish a single unicast link that can be used for more than one ProSe identifiers, the UE can select any of the default destination layer-2 ID for unicast initial signalling.

e) the initiating UE is either authorised for 5G ProSe direct communication over PC5 in NR-PC5 in the serving PLMN, has a valid authorization for 5G ProSe direct communication over PC5 in NR-PC5 when not served by NG-RAN, or is authorized to use a 5G ProSe UE-to-network relay UE. The UE considers that it is not served by NG-RAN if the following conditions are met:

1) not served by NG-RAN for ProSe direct communication over PC5;

2) in limited service state as specified in 3GPP TS 23.122 [14], if the reason for the UE being in limited service state is one of the following;
   i) the UE is unable to find a suitable cell in the selected PLMN as specified in 3GPP TS 38.304 [15];
   ii) the UE received a REGISTRATION REJECT message or a SERVICE REJECT message with the 5GMM cause #11 "PLMN not allowed" as specified in 3GPP TS 24.501 [11]; or
   iii) the UE received a REGISTRATION REJECT message or a SERVICE REJECT message with the 5GMM cause #7 "5GS services not allowed" as specified in 3GPP TS 24.501 [11]; or
3) in limited service state as specified in 3GPP TS 23.122 for reasons other than i), ii) or iii) above, and located in a geographical area for which the UE is provisioned with "non-operator managed" radio parameters as specified in clause 5.2;

f) there is no existing 5G ProSe direct link for the pair of peer application layer IDs, or there is an existing 5G ProSe direct link for the pair of peer application layer IDs and:
   1) the network layer protocol of the existing 5G ProSe direct link is not identical to the network layer protocol required by the upper layer in the initiating UE for this ProSe application;
   2) the security policy (either signalling security policy or user plane security policy) corresponding to the ProSe identifier is not compatible with the security policy of the existing 5G ProSe direct link; or
   3) in case of the 5G ProSe direct link establishment procedure is for direct communication between the remote UE and the UE-to-network relay UE, the existing 5G ProSe direct link for the peer UE is established with a different RSC or without an RSC;

g) the number of established 5G ProSe direct links is less than the implementation-specific maximum number of established 5G ProSe direct links allowed in the UE at a time; and h) timer T5088 is not associated with the link layer identifier for the destination UE or timer T5088 associated with the link layer identifier for the destination UE has already expired or stopped.

After receiving the service data or request from the upper layers, the initiating UE shall derive the PC5 QoS parameters and assign the PQFI(s) for the PC5 QoS flows(s) to be established as specified in clause 7.2.7.

In order to initiate the 5G ProSe direct link establishment procedure, the initiating UE shall create a PROSE DIRECT LINK ESTABLISHMENT REQUEST message. The initiating UE:

a) shall include the source user info set to the initiating UE's application layer ID received from upper layers;

b) shall include the ProSe identifier(s) received from upper layer if the 5G ProSe direct link establishment procedure is not for 5G ProSe direct communication between the remote UE and the UE-to-network relay UE;

c) shall include the target user info set to the target UE's application layer ID if received from upper layers, or to the identity of the 5G ProSe UE-to-network relay UE obtained during the 5G ProSe UE-to-network relay discovery procedure, or if the destination layer-2 ID is the unicast layer-2 ID of target UE;

d) shall include the key establishment information container if the UE PC5 unicast signalling integrity protection policy is set to "Signalling integrity protection required" or "Signalling integrity protection preferred", and may include the key establishment information container if the UE PC5 unicast signalling integrity protection policy is set to "Signalling integrity protection not needed";

NOTE 2: The key establishment information container is provided by upper layers.

e) shall include a Nonce_1 set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";

f) shall include its UE security capabilities indicating the list of algorithms that the initiating UE supports for the security establishment of this 5G ProSe direct link;

g) shall include the most significant 8 bits (MSB) of $K_{NRP\text{-}sess}$ ID chosen by the initiating UE as specified in 3GPP TS 33.503 if the UE PC5 unicast signalling integrity protection policy is set to "Signalling integrity protection required" or "Signalling integrity protection preferred";

h) may include a $K_{NRP}$ ID if the initiating UE has an existing $K_{NRP}$ for the target UE;

i) shall include its UE PC5 unicast signalling security policy. In the case where the different ProSe applications are mapped to the different PC5 unicast signalling security policies, when the initiating UE intends to establish a single unicast link that can be used for more than one ProSe application, each of the signalling security polices of those ProSe applications shall be compatible, e.g., "Signalling integrity protection not needed" and "Signalling integrity protection required" are not compatible. In case the 5G ProSe direct link establishment procedure is for direct communication between 5G ProSe layer-3 remote UE and 5G ProSe layer-3 UE-to-network relay UE, the Signalling integrity protection policy shall be set to "Signalling integrity protection required";

j) shall include the Relay service code IE set to the relay service code of the target relay UE if the 5G ProSe direct link establishment procedure is for direct communication between the 5G ProSe remote UE and the 5G ProSe UE-to-network relay UE; and h) shall include the UE identity IE set to the SUCI of the initiating UE if:
   1) the 5G ProSe direct link establishment procedure is for direct communication between the 5G ProSe layer-3 remote UE and the 5G ProSe layer-3 UE-to-network relay UE; and
   2) the security for 5G ProSe layer-3 relay use the security procedure over control plane as specified in 3GPP TS 33.503 [34].

Editor's note: It is FFS how the UE determines whether the security for 5G ProSe layer-3 relay uses the security procedure over control plane or the security procedure over user plane as specified in 3GPP TS 33.503 [34].

After the PROSE DIRECT LINK ESTABLISHMENT REQUEST message is generated, the initiating UE shall pass this message to the lower layers for transmission along with the initiating UE's layer-2 ID for unicast communication and:

a) the destination layer-2 ID used for unicast initial signalling; or b) the destination layer-2 ID set to the source layer-2 ID of the selected 5G ProSe UE-to-network relay UE during the 5G ProSe UE-to-network relay discovery procedure as defined in clause 8.2.1; and start timer T5080.

The UE shall not send a new PROSE DIRECT LINK ESTABLISHMENT REQUEST message to the same target UE identified by the same application layer ID while timer T5080 is running. If the target user info IE is not included in the PROSE DIRECT LINK ESTABLISHMENT REQUEST message (i.e., ProSe application oriented 5G ProSe direct link establishment procedure), the initiating UE shall handle multiple PROSE DIRECT LINK ESTABLISHMENT ACCEPT messages, if any, received from different target UEs for the establishment of multiple 5G ProSe direct links before the expiry of timer T5080.

NOTE 3: In order to ensure successful 5G ProSe direct link establishment, T5080 should be set to a value larger than the sum of T5089 and T5092.

Figure 12:
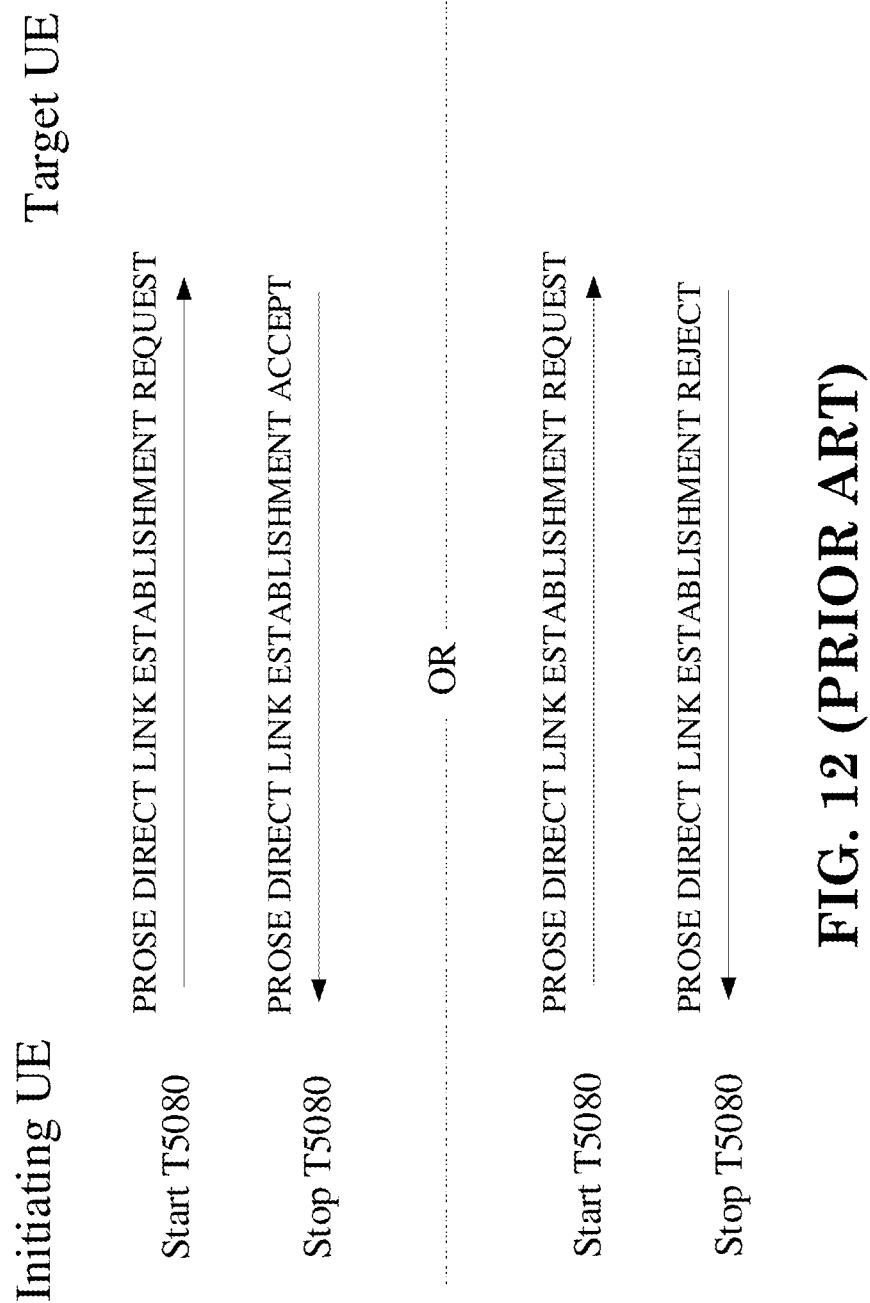
FIG. 12 is a reproduction of FIG. 7.2.2.2.1 of 3GPP TS 24.554 V17.2.1.

[FIG. 7.2.2.2.1 of 3GPP TS 24.554 V17.2.1, Entitled "UE Oriented 5G ProSe Direct Link Establishment Procedure", is Reproduced as FIG. 12]

Figure 13:
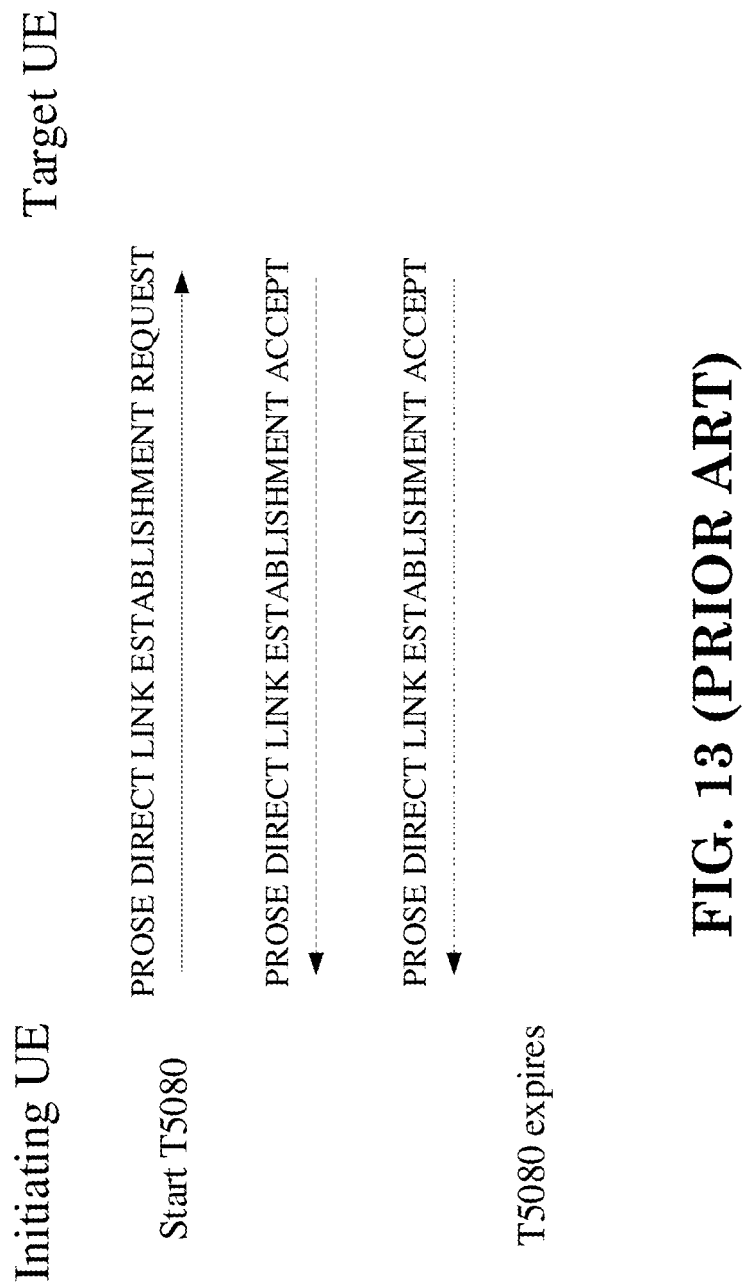
FIG. 13 is a reproduction of FIG. 7.2.2.2.2 of 3GPP TS 24.554 V17.2.1.

[FIG. 7.2.2.2.2 of 3GPP TS 24.554 V17.2.1, Entitled "ProSe Service Oriented 5G ProSe Direct Link Establishment Procedure", is Reproduced as FIG. 13]

7.2.2.3 5G ProSe Direct Link Establishment Procedure Accepted by the Target UE

Upon receipt of a PROSE DIRECT LINK ESTABLISHMENT REQUEST message, if the target UE accepts this request, the target UE shall uniquely assign a PC5 link identifier, create a 5G ProSe direct link context.

If the PROSE DIRECT LINK ESTABLISHMENT REQUEST message is not used for 5G ProSe direct communication between the remote UE and the UE-to-network relay UE, the target UE assigns a layer-2 ID for this 5G ProSe direct link. The newly assigned layer-2 ID replaces the target layer-2 ID as received on the PROSE DIRECT LINK ESTABLISHMENT REQUEST message. Then the target UE shall store this assigned layer-2 ID and the source layer-2 ID used in the transport of this message provided by the lower layers in the 5G ProSe direct link context.

The target UE may initiate 5G ProSe direct link authentication procedure as specified in clause 7.2.12 and shall initiate 5G ProSe direct link security mode control procedure as specified in clause 7.2.10.

NOTE 1: It is possible for the target UE to reuse the target UE's layer-2 ID used in the transport of the PROSE DIRECT LINK ESTABLISHMENT REQUEST message provided by the lower layers in case that the target UE's layer-2 ID has been used in previous 5G ProSe direct link with the same peer.

If:
  a) the target user info IE is included in the PROSE DIRECT LINK ESTABLISHMENT REQUEST message and this IE includes the target UE's application layer ID; or
  b) the target user info IE is not included in the PROSE DIRECT LINK ESTABLISHMENT REQUEST message and the target UE is interested in the ProSe application(s) identified by the ProSe identifier IE in the PROSE DIRECT LINK ESTABLISHMENT REQUEST message;
then the target UE shall either:
  a) identify an existing $K_{NRP}$ based on the $K_{NRP}$ ID included in the PROSE DIRECT LINK ESTABLISHMENT REQUEST message; or
  b) if $K_{NRP}$ ID is not included in the PROSE DIRECT LINK ESTABLISHMENT REQUEST message, the target UE does not have an existing $K_{NRP}$ for the $K_{NRP}$ ID included in PROSE DIRECT LINK ESTABLISHMENT REQUEST message or the target UE wishes to derive a new $K_{NRP}$, derive a new $K_{NRP}$. This may require performing one or more 5G ProSe direct link authentication procedures as specified in clause 7.2.12.

NOTE 2: How many times the 5G ProSe direct link authentication procedure needs to be performed to derive a new $K_{NRP}$ depends on the authentication method used.

After an existing $K_{NRP}$ was identified or a new $K_{NRP}$ was derived, the target UE shall initiate a 5G ProSe direct link security mode control procedure as specified in clause 7.2.10.

Upon successful completion of the 5G ProSe direct link security mode control procedure, in order to determine whether the PROSE DIRECT LINK ESTABLISHMENT REQUEST message can be accepted or not, in case of IP communication, the target UE checks whether there is at least one common IP address configuration option supported by both the initiating UE and the target UE.

Before sending the PROSE DIRECT LINK ESTABLISHMENT ACCEPT message to the remote UE, the target UE acting as a 5G ProSe layer-3 UE-to-network relay UE shall inform the lower layer to initiate the UE requested PDU session establishment procedure as specified in 3GPP TS 24.501 if:
  1) the PDU session for relaying the service associated with the RSC has not been established yet; or
  2) the PDU session for relaying the service associated with the RSC has been established but the PDU session type is Unstructured.

If the target UE accepts the 5G ProSe direct link establishment procedure, the target UE shall create a PROSE DIRECT LINK ESTABLISHMENT ACCEPT message. The target UE:
  a) shall include the source user info set to the target UE's application layer ID received from upper layers;
  b) shall include PQFI(s), the corresponding PC5 QoS parameters and optionally the ProSe identifier(s) that the target UE accepts, if the target UE is not acting as a 5G ProSe layer-2 UE-to-network relay UE;
  c) may include the PC5 QoS rule(s) if the target UE is not acting as a 5G ProSe layer-2 UE-to-network relay UE;
  d) shall include an IP address configuration IE set to one of the following values if IP communication is used and the target UE is not acting as a 5G ProSe layer-2 UE-to-network relay UE:
    1) "DHCPv4 server" if only IPV4 address allocation mechanism is supported by the target UE, i.e., acting as a DHCPv4 server; or
    2) "IPv6 router" if only IPV6 address allocation mechanism is supported by the target UE, i.e., acting as an IPV6 router; or
    3) "DHCPv4 server & IPV6 Router" if both IPv4 and IPV6 address allocation mechanism are supported by the target UE; or
    4) "address allocation not supported" if neither IPv4 nor IPV6 address allocation mechanism is supported by the target UE and the target UE is not acting as a 5G ProSe layer-3 UE-to-network relay UE;
  NOTE: The UE doesn't include an IP address configuration IE nor a link local IPV6 address IE, if Ethernet or Unstructured data unit type is used for communication.
  e) shall include a link local IPV6 address IE formed locally based on IETF RFC 4862 if IP address configuration IE is set to "address allocation not supported", the received PROSE DIRECT LINK SECU- RITY MODE COMPLETE message included a link local IPV6 address IE and the target UE is neither acting as a 5G ProSe layer-2 UE-to-network relay UE nor acting as a 5G ProSe layer-3 relay UE; and f) shall include the configuration of UE PC5 unicast user plane security protection based on the agreed user plane security policy, as specified in 3GPP TS 33.503 [34].

After the PROSE DIRECT LINK ESTABLISHMENT ACCEPT message is generated, the target UE shall pass this message to the lower layers for transmission along with the initiating UE's layer-2 ID for unicast communication and the target UE's layer-2 ID for unicast communication, and shall start timer T5090 if at least one of ProSe identifiers for the 5G ProSe direct links satisfies the privacy requirements as specified in clause 5.2.

After sending the PROSE DIRECT LINK ESTABLISHMENT ACCEPT message, the target UE shall provide the following information along with the layer-2 IDs to the lower layer, which enables the lower layer to handle the coming PC5 signalling or traffic data:
a) the PC5 link identifier self-assigned for this 5G ProSe direct link;
b) PQFI(s) and its corresponding PC5 QoS parameters, if available; and
c) an indication of activation of the PC5 unicast user plane security protection for the 5G ProSe direct link, if applicable.

If the target UE accepts the 5G ProSe direct link establishment request and the 5G ProSe direct link is established not for 5G ProSe direct communication between the 5G ProSe remote UE and the 5G ProSe UE-to-network relay UE, then the target UE may perform the PC5 QoS flow establishment over 5G ProSe direct link as specified in clause 7.2.7. If the 5G ProSe direct link is established for 5G ProSe direct communication between the 5G ProSe layer-3 remote UE and the 5G ProSe layer-3 UE-to-network relay UE, then the target UE may perform the PC5 QoS flow establishment over 5G ProSe direct link as specified in clause 8.2.6.

7.2.2.4 5G ProSe Direct Link Establishment Procedure Completion by the Initiating UE If the Target user info IE is included in the PROSE DIRECT LINK ESTABLISHMENT REQUEST message, upon receipt of the PROSE DIRECT LINK ESTABLISHMENT ACCEPT message, the initiating UE shall stop timer T5080. If the Target user info IE is not included in the PROSE DIRECT LINK ESTABLISHMENT REQUEST message the initiating UE may keep the timer T5080 running and continue to handle multiple response messages (i.e., the PROSE DIRECT LINK ESTABLISHMENT ACCEPT message) from multiple target UEs.

For each of the PROSE DIRECT LINK ESTABLISHMENT ACCEPT message received, the initiating UE shall uniquely assign a PC5 link identifier and create a 5G ProSe direct link context for each of the 5G ProSe direct link(s). Then the initiating UE shall store the source layer-2 ID and the destination layer-2 ID used in the transport of this message provided by the lower layers in the 5G ProSe direct link context(s) to complete the establishment of the 5G ProSe direct link with the target UE(s). From this time onward the initiating UE shall use the established link(s) for ProSe direct communication over PC5 and additional PC5 signalling messages to the target UE(s).

After receiving the PROSE DIRECT LINK ESTABLISHMENT ACCEPT message, the initiating UE shall delete the old security context it has for the target UE and shall provide the following information along with the layer-2 IDs to the lower layer, which enables the lower layer to handle the coming PC5 signalling or traffic data:
a) the PC5 link identifier self-assigned for this 5G ProSe direct link;
b) PQFI(s) and its corresponding PC5 QoS parameters, if available; and
c) an indication of activation of the PC5 unicast user plane security protection for the 5G ProSe direct link, if applicable.

The initiating UE shall start timer T5090 if at least one of ProSe identifiers for the 5G ProSe direct links satisfies the privacy requirements as specified in clause 5.2.

In addition, the initiating UE may perform the PC5 QoS flow establishment over 5G ProSe direct link as specified in clause 7.2.7.

Upon expiry of the timer T5080, if the PROSE DIRECT LINK ESTABLISHMENT REQUEST message did not include the Target user info IE, and the initiating UE received at least one PROSE DIRECT LINK ESTABLISHMENT ACCEPT message, it is up to the UE implementation to consider the 5G ProSe direct link establishment procedure as complete or to restart the timer T5080.

7.2.3 5G ProSe Direct Link Modification Procedure
7.2.3.1 General

The purpose of the 5G ProSe direct link modification procedure is to modify the existing ProSe direct link to:
a) add new PC5 QoS flow(s) to the existing 5G ProSe direct link;
b) modify existing PC5 QoS flow(s) for updating PC5 QoS parameters of the existing PC5 Qos flow(s);
c) modify existing PC5 QoS flow(s) for associating new ProSe application(s) with the existing PC5 QoS flow(s);
d) modify existing PC5 QoS flow(s) for removing the associated ProSe application(s) from the existing PC5 QoS flow(s); or
e) remove existing PC5 QoS flow(s) from the existing 5G ProSe direct link.

In this procedure, the UE sending the PROSE DIRECT LINK MODIFICATION REQUEST message is called the "initiating UE" and the other UE is called the "target UE".

NOTE: The 5G ProSe direct link modification procedure is not applicable for 5G ProSe layer-2 UE-to-network relay case.

7.2.3.2 5G ProSe Direct Link Modification Procedure Initiated by Initiating UE

The initiating UE shall meet the following pre-conditions before initiating this procedure for adding a new ProSe application to the existing 5G ProSe direct link:
a) there is a 5G ProSe direct link between the initiating UE and the target UE;
b) the pair of application layer IDs and the network layer protocol of this 5G ProSe direct link are identical to those required by the application layer in the initiating UE for this ProSe application; and
c) the security policy corresponding to the ProSe identifier is aligned with the security policy of the existing 5G ProSe direct link.

After receiving the service data or request from the upper layers, the initiating UE shall perform the PC5 QoS flow match as specified in clause 7.2.8. If there is no matched PC5 QoS flow, the initiating UE shall derive the PC5 QoS parameters and assign the PQFI(s) for the PC5 QoS flows(s) to be established as specified in clause 7.2.7.

If the 5G ProSe direct link modification procedure is to add new PC5 QoS flow(s) to the existing 5G ProSe direct link, the initiating UE shall create a PROSE DIRECT LINK MODIFICATION REQUEST message. In this message, initiating UE:

a) shall include the PQFI(s), the corresponding PC5 QOS parameters and optionally the ProSe identifier(s);

b) shall include the link modification operation code set to "Add new PC5 QoS flow(s) to the existing 5G ProSe direct link"; and c) may include the PC5 QoS rule(s) to indicate the packet filters of the PC5 QoS flow(s).

If the 5G ProSe direct link modification procedure is to modify the PC5 QoS parameters for existing PC5 QoS flow(s) in the existing 5G ProSe direct link, the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Modify PC5 QoS parameters of the existing PC5 QoS flow(s)"; and c) may include the PC5 QoS rule(s) to indicate the packet filters of the PC5 QoS flow(s).

If the 5G ProSe direct link modification procedure is to associate new ProSe application(s) with existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Associate new ProSe application(s) with existing PC5 QoS flow(s)"; and c) may include the PC5 QoS rule(s) to indicate the packet filters of the PC5 QoS flow(s).

If the PC5 5G ProSe direct link modification procedure is to remove the associated ProSe application(s) from existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters including the ProSe identifier(s); and b) shall include the link modification operation code set to "Remove ProSe application(s) from existing PC5 QoS flow(s)".

If the direct link modification procedure is to remove any PC5 QoS flow(s) from the existing 5G ProSe direct link, the initiating UE shall create a PROSE DIRECT LINK MODIFICATION REQUEST message. In this message, the initiating UE:

a) shall include the PQFI(s); and b) shall include the link modification operation code set to "Remove existing PC5 QoS flow(s) from the existing 5G ProSe direct link".

After the PROSE DIRECT LINK MODIFICATION REQUEST message is generated, the initiating UE shall pass this message to the lower layers for transmission along with the initiating UE's layer-2 ID for 5G ProSe direct communication and the target UE's layer-2 ID for 5G ProSe direct communication and start timer T5081. The UE shall not send a new PROSE DIRECT LINK MODIFICATION REQUEST message to the same target UE while timer T5081 is running.

Figure 14:
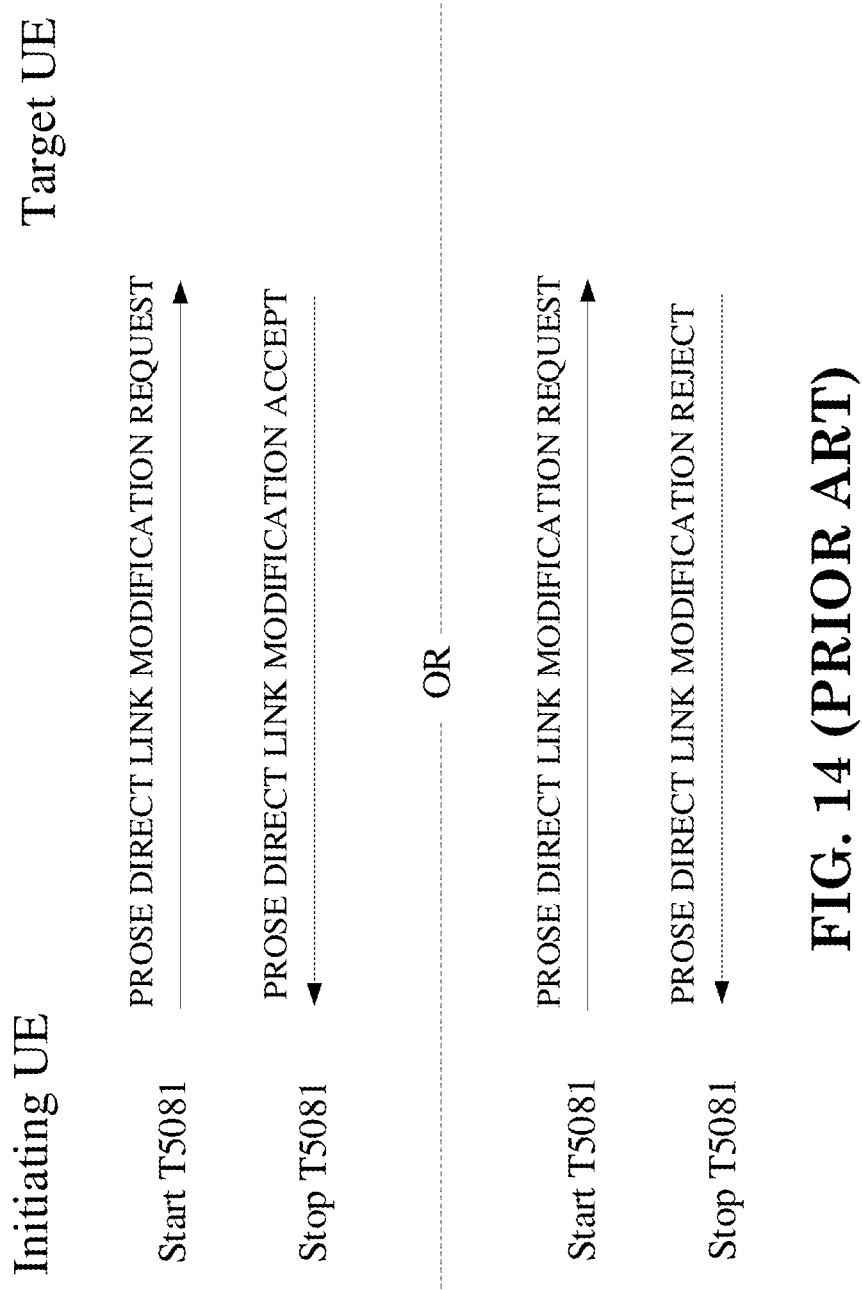
FIG. 14 is a reproduction of FIG. 7.2.3.2.1 of 3GPP TS 24.554 V17.2.1.

[FIG. 7.2.3.2.1 of 3GPP TS 24.554 V17.2.1, Entitled "5G ProSe Direct Link Modification Procedure", is Reproduced as FIG. 14]

7.2.3.3 5G ProSe Direct Link Modification Procedure Accepted by the Target UE

If the PROSE DIRECT LINK MODIFICATION REQUEST message is accepted, the target UE shall respond with the DIRECT LINK MODIFICATION ACCEPT message.

If the PROSE DIRECT LINK MODIFICATION REQUEST message is to add a new ProSe application, add new PC5 QoS flow(s) or modify any existing PC5 QoS flow(s) in the 5G ProSe direct link, the target UE:

a) shall include the PQFI(s), the corresponding PC5 QoS parameters and optionally the ProSe identifier(s) that the target UE accepts; and b) may include the PC5 QOS rule(s) to indicate the packet filters of the PC5 QoS flow(s); in the PROSE DIRECT LINK MODIFICATION ACCEPT message.

If the PROSE DIRECT LINK MODIFICATION REQUEST message is to remove an existing ProSe application from the 5G ProSe direct link, the target UE shall delete the ProSe identifier received in the PROSE DIRECT LINK MODIFICATION REQUEST message and the corresponding PQFI(s) and PC5 QoS parameters from the profile associated with the 5G ProSe direct link. If the PROSE DIRECT LINK MODIFICATION REQUEST message is to remove existing PC5 Qos flow(s) from the PC5 5G ProSe direct link, the target UE shall delete the PQFI(s) and the corresponding PC5 QoS parameters from the profile associated with the 5G ProSe direct link. If the PROSE DIRECT LINK MODIFICATION REQUEST message is to add a new ProSe application, add new PC5 QoS flow(s) or modify any existing PC5 QoS flow(s) in the 5G ProSe direct link, after sending the PROSE DIRECT LINK MODIFICATION ACCEPT message, the target UE shall provide the added or modified PQFI(s) and corresponding PC5 QOS parameters along with PC5 link identifier to the lower layer.

If the PROSE DIRECT LINK MODIFICATION REQUEST message is to remove an existing ProSe application or to remove the existing PC5 QoS flow(s) from the 5G ProSe direct link, after sending the PROSE DIRECT LINK MODIFICATION ACCEPT message, the target UE shall provide the removed PQFI(s) along with the PC5 link identifier to the lower layer.

If the target UE accepts the 5G ProSe direct link modification request, then the target UE may perform the PC5 QoS flow establishment over 5G ProSe direct link as specified in clause 7.2.7 and perform the PC5 QoS flow match over 5G ProSe direct link as specified in clause 7.2.8.

7.2.3.4 5G ProSe Direct Link Modification Procedure Completion by the Initiating UE Upon receipt of the PROSE DIRECT LINK MODIFICATION ACCEPT message, the initiating UE shall stop timer T5081.

Upon receipt of the PROSE DIRECT LINK MODIFICATION ACCEPT message, if the PROSE DIRECT LINK MODIFICATION REQUEST message is to add a new ProSe application, add new PC5 Qos flow(s) or modify any existing PC5 QoS flow(s) in the 5G ProSe direct link, the initiating UE shall provide the added or modified PQFI(s) and corresponding PC5 QoS parameters along with PC5 link identifier to the lower layer.

Upon receipt of the PROSE DIRECT LINK MODIFICATION ACCEPT message, if the PROSE DIRECT LINK MODIFICATION REQUEST message is to remove an existing ProSe application or to remove the existing PC5

QoS flow(s) from the 5G ProSe direct link, the initiating UE shall provide the removed PQFI(s) along with the PC5 link identifier to the lower layer.

In addition, the initiating UE may perform the PC5 QoS flow establishment over 5G ProSe direct link as specified in clause 7.2.7.

7.2.4 5G ProSe Direct Link Identifier Update Procedure 7.2.4.1 General

The 5G ProSe direct link identifier update procedure is used to update and exchange the new identifiers (e.g., application layer ID, layer-2 ID, security information and IP address/prefix) between two UEs for a 5G ProSe direct link before using the new identifiers. The UE sending the PROSE DIRECT LINK IDENTIFIER UPDATE REQUEST message is called the "initiating UE" and the other UE is called the "target UE".

7.2.4.2 5G ProSe Direct Link Identifier Update Procedure Initiation by Initiating UE The initiating UE shall initiate the procedure if:
  a) the initiating UE receives a request from upper layers to change the application layer ID and there is an existing 5G ProSe direct link associated with this application layer ID; or
  b) the privacy timer (see clause 5.2.4) of the initiating UE's layer-2 ID expires for an existing 5G ProSe direct link.

If the 5G ProSe direct link identifier update procedure is triggered by a change of the initiating UE's application layer ID, the initiating UE shall create a PROSE DIRECT LINK IDENTIFIER UPDATE REQUEST message. In this message, the initiating UE:
  a) shall include the initiating UE's new application layer ID received from upper layer;
  b) shall include the initiating UE's new layer-2 ID assigned by itself;
  c) shall include the new MSB of $K_{NRP-sess}$ ID; and
  d) shall include the new IP address/prefix if IP communication is used and the 5G ProSe direct link is not for 5G ProSe direct communication between 5G ProSe layer-2 remote UE and 5G ProSe layer-2 UE-to-network relay UE.

If the 5G ProSe direct link identifier update procedure is triggered by the expiry of the initiating UE's privacy timer T5090 as specified in clause 5.2.4 and clause 5.2.5, the initiating UE shall create a PROSE DIRECT LINK IDENTIFIER UPDATE REQUEST message. In this message, the initiating UE:
  a) shall include the initiating UE's new layer-2 ID assigned by itself;
  b) shall include the new MSB of $K_{NRP-sess}$ ID;
  c) may include the initiating UE's new application layer ID if received from upper layer; and
  d) shall include the new IP address/prefix if IP communication is used and changed and the 5G ProSe direct link is not for 5G ProSe direct communication between 5G ProSe layer-2 remote UE and 5G ProSe layer-2 UE-to-network relay UE.

After the PROSE DIRECT LINK IDENTIFIER UPDATE REQUEST message is generated, the initiating UE shall pass this message to the lower layers for transmission along with the initiating UE's old layer-2 ID for 5G ProSe direct communication and the target UE's layer-2 ID for 5G ProSe direct communication and start timer T5082. The UE shall not send a new PROSE DIRECT LINK IDENTIFIER UPDATE REQUEST message to the same target UE while timer T5082 is running.

Figure 15:
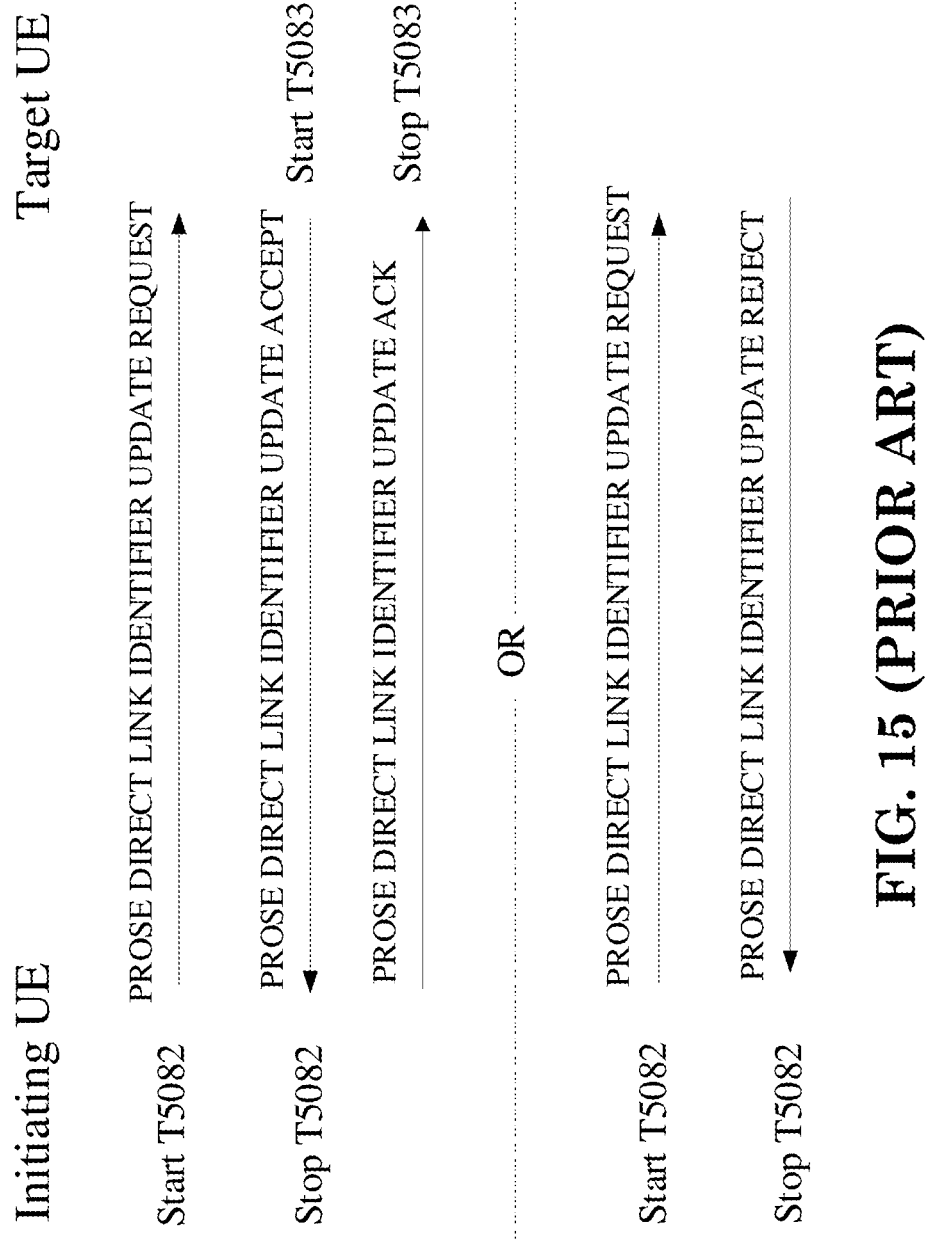
FIG. 15 is a reproduction of FIG. 7.2.4.2.1 of 3GPP TS 24.554 V17.2.

[FIG. 7.2.4.2.1 of 3GPP TS 24.554 V17.2.1, Entitled "5G ProSe Direct Link Identifier Update Procedure", is Reproduced as FIG. 15]

7.2.4.3 5G ProSe Direct Link Identifier Update Procedure Accepted by the Target UE Upon receipt of a PROSE DIRECT LINK IDENTIFIER UPDATE REQUEST message, if the target UE determines:
  a) the 5G ProSe direct link associated with this request message is still valid; and
  b) the timer T5083 for the 5G ProSe direct link identified by this request message is not running, then the target UE accepts this request and responds with a PROSE DIRECT LINK IDENTIFIER UPDATE ACCEPT message.

The target UE shall create the PROSE DIRECT LINK IDENTIFIER UPDATE ACCEPT message. In this message, the target UE:
  a) shall include the target UE's new layer-2 ID assigned by itself;
  b) shall include the new LSB of $K_{NRP-sess}$ ID;
  c) shall include the initiating UE's new MSB of $K_{NRP-sess}$ ID;
  d) shall include the initiating UE's new layer-2 ID;
  e) shall include the target UE's new application layer ID if received from upper layer;
  f) shall include the initiating UE's new IP address/prefix if received from the initiating UE and IP communication is used;
  g) shall include the initiating UE's new application layer ID if received from the initiating UE; and
  h) shall include the target UE's new IP address/prefix if IP communication is used and changed and the 5G ProSe direct link is not for 5G ProSe direct communication between 5G ProSe layer-2 remote UE and 5G ProSe layer-2 UE-to-network relay UE.

After the PROSE DIRECT LINK IDENTIFIER UPDATE ACCEPT message is generated, the target UE shall pass this message to the lower layers for transmission along with the initiating UE's old layer-2 ID for 5G ProSe direct communication and the target UE's old layer-2 ID for 5G ProSe direct communication and start timer T5083. The UE shall not send a new PROSE DIRECT LINK IDENTIFIER UPDATE ACCEPT message to the same initiating UE while timer T5083 is running.

Before target UE receives the traffic using the new layer-2 IDs, the target UE shall continue to receive the traffic with the old layer-2 IDs (i.e., initiating UE's old layer-2 ID and target UE's old layer-2 ID) from initiating UE.

Before target UE receives the PROSE DIRECT LINK IDENTIFIER UPDATE ACK message from initiating UE, the target UE shall keep sending traffic to the initiating UE using the old layer-2 IDs (i.e., initiating UE's old layer-2 ID for 5G ProSe direct communication and target UE's old layer-2 ID for 5G ProSe direct communication).

7.2.4.4 5G ProSe Direct Link Identifier Update Procedure Acknowledged by the Initiating UE Upon receipt of the PROSE DIRECT LINK IDENTIFIER UPDATE ACCEPT message, the initiating UE shall stop timer T5082 and respond with a PROSE DIRECT LINK IDENTIFIER UPDATE ACK message. In this message, the initiating UE:
  a) shall include the target UE's new layer-2 ID;
  b) shall include the target UE's new LSB of $K_{NRP-sess}$ ID;
  c) shall include the target UE's new application layer ID, if received; and
  d) shall include the target UE's new IP address/prefix, if received.

After the PROSE DIRECT LINK IDENTIFIER UPDATE ACK message is generated, the initiating UE shall pass this message to the lower layers for transmission along with the initiating UE's old layer-2 ID for 5G ProSe direct communication and the target UE's old layer-2 ID for 5G ProSe direct communication and shall stop timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5.

Upon sending the PROSE DIRECT LINK IDENTIFIER UPDATE ACK message, the initiating UE shall update the associated 5G ProSe direct link context with the new identifiers and pass the new layer-2 IDs (i.e., initiating UE's new layer-2 ID for 5G ProSe direct communication and target UE's new layer-2 ID for 5G ProSe direct communication) along with the PC5 link identifier down to the lower layer. Then the initiating UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

The initiating UE shall continue to receive traffic with the old layer-2 IDs (i.e., initiating UE's old layer-2 ID for 5G ProSe direct communication and target UE's old layer-2 ID for 5G ProSe direct communication) from the target UE until it receives traffic with the new layer-2 IDs (i.e., initiating UE's new layer-2 ID and target UE's new layer-2 ID) from the target UE.

7.2.4.5 5G ProSe Direct Link Identifier Update Procedure Completion by the Target UE Upon receipt of the PROSE DIRECT LINK IDENTIFIER UPDATE ACK message, the target UE shall update the associated 5G ProSe direct link context with the new identifiers, pass the new layer-2 IDs (i.e., initiating UE's new layer-2 ID and target UE's new layer-2 ID) down to the lower layer, stop timer T5083 and timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5. Then the target UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

7.2.5 5G ProSe Direct Link Keep-Alive Procedure 7.2.5.1 General

The 5G ProSe direct link keep-alive procedure is used to maintain a 5G ProSe direct link between two UEs, i.e., check that the link between the two UEs is still valid. The UE sending the PROSE DIRECT LINK KEEPALIVE REQUEST message is called the "initiating UE" and the other UE is called the "target UE".

The 5G ProSe direct link keep-alive procedure can be initiated by only one UE or both UEs in the established 5G ProSe direct link.

NOTE: Whether the 5G ProSe direct link keep-alive procedure is initiated by only one UE or both UEs in the established 5G ProSe direct link is UE implementation specific.

7.2.5.2 5G ProSe Direct Link Keep-Alive Procedure Initiation by the Initiating UE The initiating UE shall meet the following pre-condition before initiating the 5G ProSe direct link keep-alive procedure:

a) there is a 5G ProSe direct link between the initiating UE and the target UE.

The initiating UE shall manage a keep-alive timer T5084 and a keep-alive counter for the 5G ProSe direct link keep-alive procedure. Timer T5084 is used to trigger the periodic initiation of the 5G ProSe direct link keep-alive procedure. The UE shall start or restart timer T5084 whenever the UE receives a PC5 signalling message or PC5 user plane data from the target UE over this 5G ProSe direct link. The UE shall set the keep-alive counter to an initial value of zero after 5G ProSe direct link establishment.

The initiating UE shall initiate the 5G ProSe direct link keep-alive procedure when:

a) timer T5084 for this link expires;

b) optionally, a request from the lower layers to check the viability of the 5G ProSe direct link is received; or NOTE 1: Whether the lower layers can request the initiation of the 5G ProSe direct link keep-alive procedure and what the triggers for the lower layers are to request the initiation of the 5G ProSe direct link keep-alive procedure, are UE implementation specific.

c) optionally, a request from the upper layers to check the viability of the 5G ProSe direct link is received.

NOTE 2: Whether the upper layers can request the initiation of the 5G ProSe direct link keep-alive procedure and what the triggers for the upper layers are to request the initiation of the 5G ProSe direct link keep-alive procedure, are UE implementation specific.

In order to initiate the 5G ProSe direct link keep-alive procedure, the initiating UE shall stop timer T5084, if running and shall create a PROSE DIRECT LINK KEEPALIVE REQUEST message. In this message, the initiating UE:

a) shall include the keep-alive counter for the 5G ProSe direct link; and b) may include a maximum inactivity period to indicate the maximum inactivity period of the initiating UE over this 5G ProSe direct link.

NOTE 3: The value chosen for the maximum inactivity period of the initiating UE is UE implementation specific with the objective to minimize the number of keep-alive procedures as much as possible. It is desirable to have the maximum inactivity period value to be slightly higher than the value of keep-alive timer T5084.

After the PROSE DIRECT LINK KEEPALIVE REQUEST message is generated, the initiating UE shall pass this message to the lower layers for transmission along with the initiating UE's layer-2 ID for 5G ProSe direct communication and the target UE's layer-2 ID for 5G ProSe direct communication and start timer T5085. The UE shall not send a new PROSE DIRECT LINK KEEPALIVE REQUEST message to the same target UE while timer T5085 is running.

Figure 16:
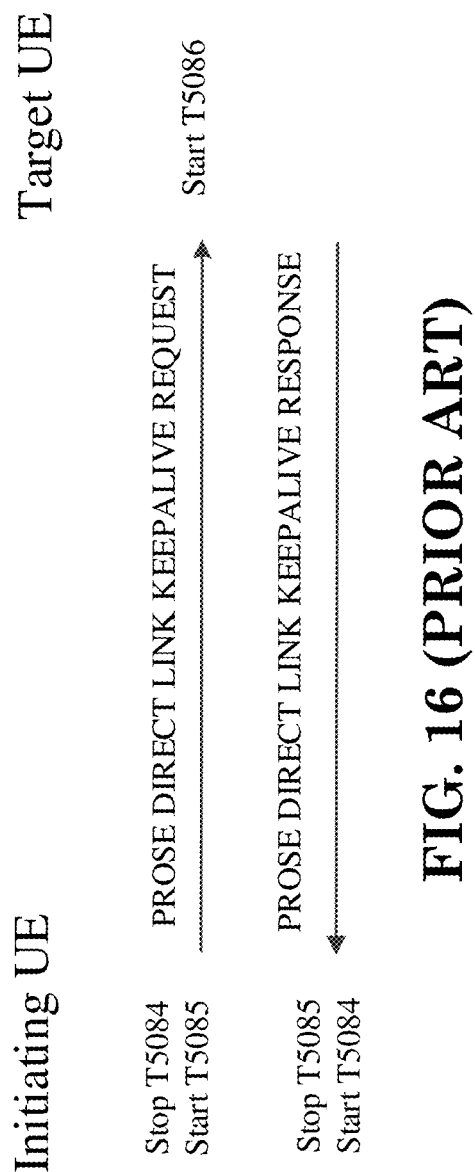
FIG. 16 is a reproduction of FIG. 7.2.5.2.1 of 3GPP TS 24.554 V17.2.1.

[FIG. 7.2.5.2.1 of 3GPP TS 24.554 V17.2.1, Entitled "5G ProSe Direct Link Keep-Alive Procedure", is Reproduced as FIG. 16]

7.2.5.3 5G ProSe Direct Link Keep-Alive Procedure Accepted by the Target UE

Upon receipt of a PROSE DIRECT LINK KEEPALIVE REQUEST message, the target UE shall create a PROSE DIRECT LINK KEEPALIVE RESPONSE message. In this message, the target UE:

a) shall include the keep-alive counter set to the same value as that received in the PROSE DIRECT LINK KEEPALIVE REQUEST message.

After the PROSE DIRECT LINK KEEPALIVE RESPONSE message is generated, the target UE shall pass this message to the lower layers for transmission along with the target UE's layer-2 ID for 5G ProSe direct communication and the initiating UE's layer-2 ID for 5G ProSe direct communication.

If a maximum inactivity period is included in the PROSE DIRECT LINK KEEPALIVE REQUEST message, the target UE shall stop T5086, if running and start T5086 with its value set to the maximum inactivity period. The target UE shall restart T5086 whenever the target UE receives a PC5 signalling message or PC5 user plane data from the initiating UE over this 5G ProSe direct link.

7.2.5.4 5G ProSe Direct Link Keep-Alive Procedure Completion by the Initiating UE Upon receipt of a PROSE DIRECT LINK KEEPALIVE RESPONSE message, the initiating UE shall stop timer T5085, start timer T5084 and increment the keep-alive counter for the 5G ProSe direct link.

7.2.10 5G ProSe Direct Link Security Mode Control Procedure 7.2.10.1 General

The 5G ProSe direct link security mode control procedure is used to establish security between two UEs during a 5G ProSe direct link establishment procedure or a 5G ProSe direct link re-keying procedure. Security is not established if the UE PC5 signalling integrity protection is not activated. After successful completion of the 5G ProSe direct link security mode control procedure, the selected security algorithms and keys are used to integrity protect and cipher all PC5 signalling messages exchanged over this 5G ProSe direct link between the UEs and the security context can be used to protect all PC5 user plane data exchanged over this 5G ProSe direct link between the UEs. The UE sending the PROSE DIRECT LINK SECURITY MODE COMMAND message is called the "initiating UE" and the other UE is called the "target UE". Editor's note: Any possible changes to the 5G ProSe direct link security mode control procedure due to the security requirements of 5G ProSe layer-2 UE-to-network relay and 5G ProSe layer-3 UE-to-network relay are FFS and waiting for SA3 conclusion.

7.2.10.2 5G ProSe Direct Link Security Mode Control Procedure Initiation by the Initiating UE The initiating UE shall meet the following pre-conditions before initiating the 5G ProSe direct link security mode control procedure:

a) the target UE has initiated a 5G ProSe direct link establishment procedure toward the initiating UE by sending a PROSE DIRECT LINK ESTABLISHMENT REQUEST message and:
  1) the PROSE DIRECT LINK ESTABLISHMENT REQUEST message:
    i) includes a target user info IE which includes the application layer ID of the initiating UE; or
    ii) does not include a target user info IE and the initiating UE is interested in the ProSe service identified by the ProSe identifier in the PROSE DIRECT LINK ESTABLISHMENT REQUEST message; and
  2) the initiating UE:
    i) has either identified an existing $K_{NRP}$ based on the $K_{NRP}$ ID included in the PROSE DIRECT LINK ESTABLISHMENT REQUEST message or derived a new $K_{NRP}$; or
    ii) has decided not to activate security protection based on its UE 5G ProSe direct signalling security policy and the target UE's 5G ProSe direct signalling security policy; or
b) the target UE has initiated a 5G ProSe direct link re-keying procedure toward the initiating UE by sending a PROSE DIRECT LINK REKEYING REQUEST message and:
  1) if the target UE has included a Re-authentication indication in the PROSE DIRECT LINK REKEYING REQUEST message, the initiating UE has derived a new $K_{NRP}$.

If a new $K_{NRP}$ has been derived by the initiating UE, the initiating UE shall generate the 2 MSBs of $K_{NRP}$ ID to ensure that the resultant $K_{NRP}$ ID will be unique in the initiating UE. The initiating UE shall select security algorithms in accordance with its UE 5G ProSe direct signalling security policy and the target UE's 5G ProSe direct signalling security policy. If the 5G ProSe direct link security mode control procedure was triggered during a 5G ProSe direct link establishment procedure, the initiating UE shall not select the null integrity protection algorithm if the initiating UE or the target UE's 5G ProSe direct signalling integrity protection policy is set to "Signalling integrity protection required". If the 5G ProSe direct link security mode control procedure was triggered during a 5G ProSe direct link re-keying procedure, the initiating UE:

a) shall not select the null integrity protection algorithm if the integrity protection algorithm currently in use for the 5G ProSe direct link is different from the null integrity protection algorithm;
b) shall not select the null ciphering protection algorithm if the ciphering protection algorithm currently in use for the 5G ProSe direct link is different from the null ciphering protection algorithm;
c) shall select the null integrity protection algorithm if the integrity protection algorithm currently in use is the null integrity protection algorithm; and
d) shall select the null ciphering protection algorithm if the ciphering protection algorithm currently in use is the null ciphering protection algorithm.

Then the initiating UE shall:
a) generate a 128-bit Nonce_2 value;
b) derive $K_{NRP-sess}$ from $K_{NRP}$, Nonce_2 and Nonce_1 received in the PROSE DIRECT LINK ESTABLISHMENT REQUEST message as specified in 3GPP TS 33.536 [37];
c) derive the NR PC5 encryption key NRPEK and the NR PC5 integrity key NRPIK from $K_{NRP}$-sess and the selected security algorithms as specified in 3GPP TS 33.536 [37], and
d) create a PROSE DIRECT LINK SECURITY MODE COMMAND message. In this message, the initiating UE:
  1) shall include the key establishment information container IE if a new $K_{NRP}$ has been derived at the initiating UE and the authentication method used to generate $K_{NRP}$ requires sending information to complete the 5G ProSe direct link authentication procedure;
  NOTE: The key establishment information container is provided by upper layers.
  2) shall include the MSB of $K_{NRP}$ ID IE if a new $K_{NRP}$ has been derived at the initiating UE;
  3) shall include a Nonce_2 IE set to the 128-bit nonce value generated by the initiating UE for the purpose of session key establishment over this 5G ProSe direct link if the selected integrity protection algorithm is not the null integrity protection algorithm;

4) shall include the selected security algorithms;
5) shall include the UE security capabilities received from the target UE in the PROSE DIRECT LINK ESTABLISHMENT REQUEST message or PROSE DIRECT LINK REKEYING REQUEST message;
6) shall include the UE 5G ProSe direct signalling security policy received from the target UE in the PROSE DIRECT LINK ESTABLISHMENT REQUEST message; and
7) shall include the LSB of $K_{NRP-sess}$ ID chosen by the initiating UE as specified in 3GPP TS 33.536 if the selected integrity protection algorithm is not the null integrity protection algorithm.

If the security protection of this 5G ProSe direct link is activated, the initiating UE shall form the $K_{NRP-sess}$ ID from the MSB of $K_{NRP-sess}$ ID received in the PROSE DIRECT LINK ESTABLISHMENT REQUEST message or PROSE DIRECT LINK REKEYING REQUEST message and the LSB of $K_{NRP}$-sess ID included in the PROSE DIRECT LINK SECURITY MODE COMMAND message. The initiating UE shall use the $K_{NRP-sess}$ ID to identify the new security context.

After the PROSE DIRECT LINK SECURITY MODE COMMAND message is generated, the initiating UE shall pass this message to the lower layers for transmission along with the initiating UE's layer-2 ID for 5G ProSe direct communication and the target UE's layer-2 ID for 5G ProSe direct communication, NRPIK, NRPEK if applicable, $K_{NRP-sess}$ ID, the selected security algorithm as specified in TS 33.536 [37]; an indication of activation of the 5G ProSe direct signalling security protection for the 5G ProSe direct link with the new security context, if applicable, and start timer T5089. The initiating UE shall not send a new PROSE DIRECT LINK SECURITY MODE COMMAND message to the same target UE while timer T5089 is running.

NOTE: The PROSE DIRECT LINK SECURITY MODE COMMAND message is integrity protected (and not ciphered) at the lower layer using the new security context.

Figure 17:
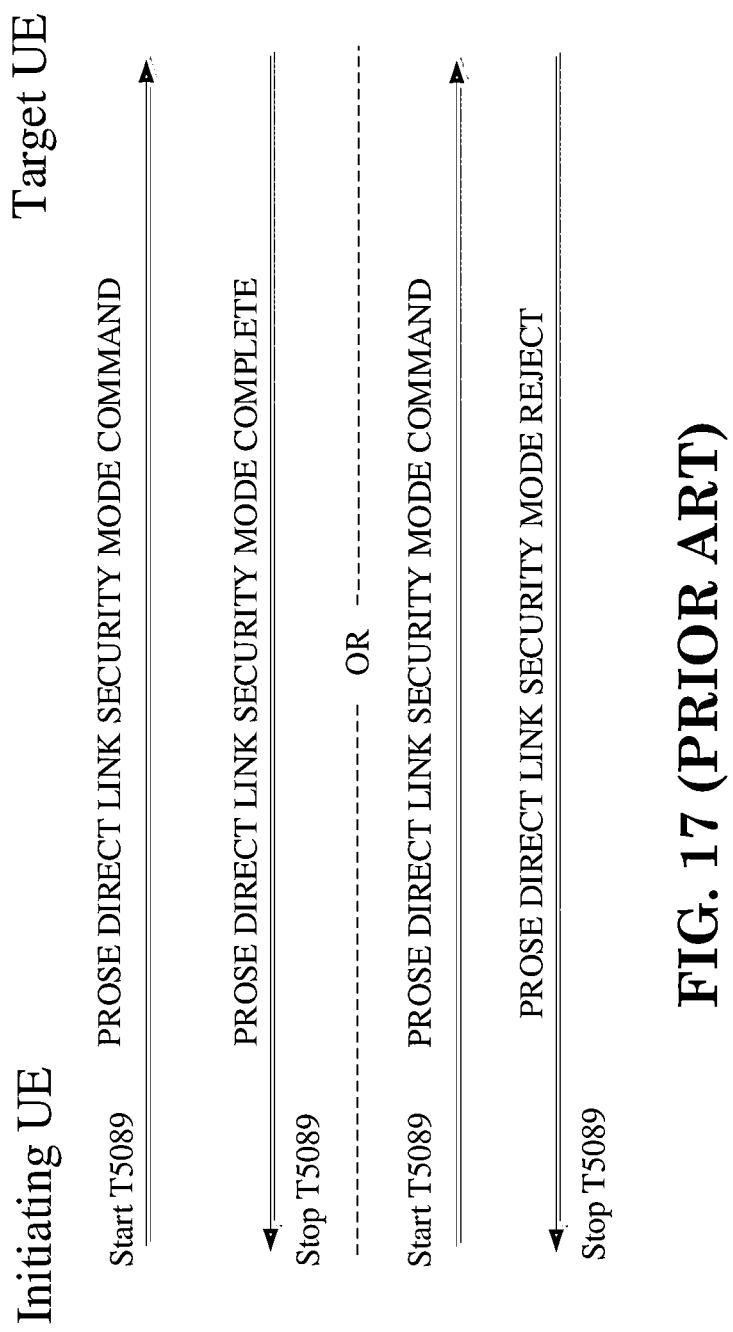
FIG. 17 is a reproduction of FIG. 7.2.10.2.1 of 3GPP TS 24.554 V17.2.1.

If the 5G ProSe direct link security mode control procedure was triggered during a 5G ProSe direct link re-keying procedure, the initiating UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.
[FIG. 7.2.10.2.1 of 3GPP TS 24.554 V17.2.1, Entitled "5G ProSe Direct Link Security Mode Control Procedure", is Reproduced as FIG. 17]

7.2.10.3 5G ProSe Direct Link Security Mode Control Procedure Accepted by the Target UE Upon receipt of a PROSE DIRECT LINK SECURITY MODE COMMAND message, if a new assigned initiating UE's layer-2 ID is included and if the 5G ProSe direct link authentication procedure has not been executed, the target UE shall replace the original initiating UE's layer-2 ID with the new assigned initiating UE's layer-2 ID for 5G ProSe direct communication. The target UE shall check the selected security algorithms IE included in the PROSE DIRECT LINK SECURITY MODE COMMAND message. If "null integrity algorithm" is included in the selected security algorithms IE, the security of this 5G ProSe direct link is not activated. If "null ciphering algorithm" and an integrity algorithm other than "null integrity algorithm" are included in the selected algorithms IE, the signalling ciphering protection is not activated. If the target UE's 5G ProSe direct signalling integrity protection policy is set to "Signalling integrity protection required", the target UE shall check the selected security algorithms IE in the PROSE DIRECT LINK SECURITY MODE COMMAND message does not include the null integrity protection algorithm. If the selected integrity protection algorithm is not the null integrity protection algorithm, the target UE shall:
a) derive $K_{NRP-sess}$ from $K_{NRP}$, Nonce_1 and Nonce_2 received in the PROSE DIRECT LINK SECURITY MODE COMMAND message as specified in 3GPP TS 33.536 [37]; and
b) derive NRPIK from $K_{NRP-sess}$ and the selected integrity algorithm as specified in 3GPP TS 33.536 [37].

If the $K_{NRP-sess}$ is derived and the selected ciphering protection algorithm is not the null ciphering protection algorithm, then the target UE shall derive NRPEK from $K_{NRP-sess}$ and the selected ciphering algorithm as specified in 3GPP TS 33.536 [37].

The target UE shall determine whether or not the PROSE DIRECT LINK SECURITY MODE COMMAND message can be accepted by:
a) checking that the selected security algorithms in the PROSE DIRECT LINK SECURITY MODE COMMAND message does not include the null integrity protection algorithm if the target UE's 5G ProSe direct signalling integrity protection policy is set to "Signalling integrity protection required";
b) asking the lower layers to check the integrity of the PROSE DIRECT LINK SECURITY MODE COMMAND message using NRPIK and the selected integrity protection algorithm, if the selected integrity protection algorithm is not the null integrity protection algorithm;
c) checking that the received UE security capabilities have not been altered compared to the values that the target UE sent to the initiating UE in the PROSE DIRECT LINK ESTABLISHMENT REQUEST message or PROSE DIRECT LINK REKEYING REQUEST message;
d) if the 5G ProSe direct link security mode control procedure was triggered during a 5G
ProSe direct link establishment procedure,
1) checking that the received UE 5G ProSe direct signalling security policy has not been altered compared to the values that the target UE sent to the initiating UE in the PROSE DIRECT LINK ESTABLISHMENT REQUEST message; and
2) checking that the LSB of $K_{NRP-sess}$ ID included in the PROSE DIRECT LINK SECURITY MODE COMMAND message are not set to the same value as those received from another UE in response to the target UE's PROSE DIRECT LINK ESTABLISHMENT REQUEST message; and
e) if the 5G ProSe direct link security mode control procedure was triggered during a 5G ProSe direct link re-keying procedure and the integrity protection algorithm currently in use for the 5G ProSe direct link is different from the null integrity protection algorithm, checking that the selected security algorithms in the PROSE DIRECT LINK SECURITY MODE COMMAND message do not include the null integrity protection algorithm.

If the target UE did not include a $K_{NRP}$ ID in the PROSE DIRECT LINK ESTABLISHMENT REQUEST message, the target UE included a Re-authentication indication in the PROSE DIRECT LINK REKEYING REQUEST message or the initiating UE has chosen to derive a new $K_{NRP}$, the target UE shall derive $K_{NRP}$ as specified in 3GPP TS 33.536 [37]. The target UE shall choose the 2 LSBs of $K_{NRP}$ ID to ensure that the resultant $K_{NRP}$ ID will be unique in the target UE. The target UE shall form $K_{NRP}$ ID from the received MSB of $K_{NRP}$ ID and its chosen LSB of $K_{NRP}$ ID and shall store the complete $K_{NRP}$ ID with $K_{NRP}$.

If the target UE accepts the PROSE DIRECT LINK SECURITY MODE COMMAND message, the target UE shall create a PROSE DIRECT LINK SECURITY MODE COMPLETE message. In this message, the target UE:
  a) shall include the PQFI and the corresponding PC5 QoS parameters if the direct communication is not for 5G ProSe direct communication between the 5G ProSe layer-2 remote UE and the 5G ProSe layer-2 UE-to-network relay UE;
  b) if IP communication is used and the 5G ProSe direct link security mode control procedure was triggered during a 5G ProSe direct link establishment procedure, shall include an IP address configuration IE set to one of the following values:
    1) "IPv6 router" if IPv6 address allocation mechanism is supported by the target UE, i.e., acting as an IPV6 router; or
    2) "address allocation not supported" if IPv6 address allocation mechanism is not supported by the target UE;
  c) if IP communication is used, the IP address configuration IE is set to "address allocation not supported" and the 5G ProSe direct link security mode control procedure was triggered during a 5G ProSe direct link establishment procedure, shall include a link local IPv6 address IE formed locally based on IETF RFC 4862 [25];
  d) if a new $K_{NRP}$ was derived, shall include the 2 LSBs of $K_{NRP}$ ID; and
  e) if the 5G ProSe direct link security mode control procedure was triggered during a 5G ProSe direct link establishment procedure, shall include its UE 5G ProSe direct user plane security policy for this 5G ProSe direct link. In the case where the different ProSe services are mapped to the different 5G ProSe direct user plane security policies, when more than one ProSe identifier is included in the PROSE DIRECT LINK ESTABLISHMENT REQUEST message, each of the user plane security polices of those ProSe services shall be compatible, e.g., "user plane integrity protection not needed" and "user plane integrity protection required" are not compatible.

If the selected integrity protection algorithm is not the null integrity protection algorithm, the target UE shall form the $K_{NRP\text{-}sess}$ ID from the MSB of $K_{NRP\text{-}sess}$ ID it had sent in the PROSE DIRECT LINK ESTABLISHMENT REQUEST message or PROSE DIRECT LINK REKEYING REQUEST message and the LSB of $K_{NRP\text{-}sess}$ ID received in the PROSE DIRECT LINK SECURITY MODE COMMAND message. The target UE shall use the $K_{NRP\text{-}sess}$ ID to identify the new security context.

After the PROSE DIRECT LINK SECURITY MODE COMPLETE message is generated, the target UE shall pass this message to the lower layers for transmission along with the target UE's layer-2 ID for 5G ProSe direct communication and the initiating UE's layer-2 ID for 5G ProSe direct communication, NRPIK, NRPEK if applicable, $K_{NRP\text{-}sess}$ ID, the selected security algorithm as specified in 3GPP TS 33.536, and an indication of activation of the 5G ProSe direct signalling security protection for the 5G ProSe direct link with the new security context, if applicable.

NOTE: The PROSE DIRECT LINK SECURITY MODE COMPLETE message and further 5G ProSe direct signalling messages are integrity protected and ciphered (if applicable) at the lower layer using the new security context.

If the 5G ProSe direct link security mode control procedure was triggered during a 5G ProSe direct link re-keying procedure, the target UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

7.2.10.4 5G ProSe Direct Link Security Mode Control Procedure Completion by the Initiating UE Upon receiving a PROSE DIRECT LINK SECURITY MODE COMPLETE message, the initiating UE shall stop timer T5089. If the selected integrity protection algorithm is not the null integrity protection algorithm, the UE checks the integrity of the PROSE DIRECT LINK SECURITY MODE COMPLETE message. If the integrity check passes, the initiating UE shall then continue the procedure which triggered the 5G ProSe direct link security mode control procedure. If the selected integrity protection algorithm is the null integrity protection algorithm, the UE continues the procedure without checking the integrity protection.

After receiving the PROSE DIRECT LINK SECURITY MODE COMPLETE message, the initiating UE shall delete the old security context it has for the target UE.

7.2.9 Data Transmission Over 5G ProSe Direct Link 7.2.9.1 Transmission

When receiving user data from upper layers to be sent over 5G ProSe direct link to a specific UE, the transmitting UE shall determine the 5G ProSe direct link context corresponding to the application layer ID and then shall tag each outgoing protocol data unit with the following information before passing it to the lower layers for transmission:
  a) a layer-3 protocol data unit type (see 3GPP TS 38.323 [16]) set to:
    1) IP, if the ProSe message contains IP data;
    2) Ethernet, if the ProSe message contains Ethernet data; or
    3) Unstructured, if the ProSe message contains Unstructured data;
  b) the PC5 link identifier associated with the 5G ProSe direct link context;
  c) optionally, the source layer-2 ID set to the source layer-2 ID associated with the 5G ProSe direct link context;
  d) optionally, the destination layer-2 ID set to the destination layer-2 ID associated with the 5G ProSe direct link context; and
  e) the PQFI set to the value corresponding to the ProSe identifier and the optional ProSe application requirements according to the mapping rules specified in clause 5.2.4.

3GPP TS 38.331 introduced the following:

5.8.9.1 Sidelink RRC Reconfiguration 5.8.9.1.1 General

Figure 18:
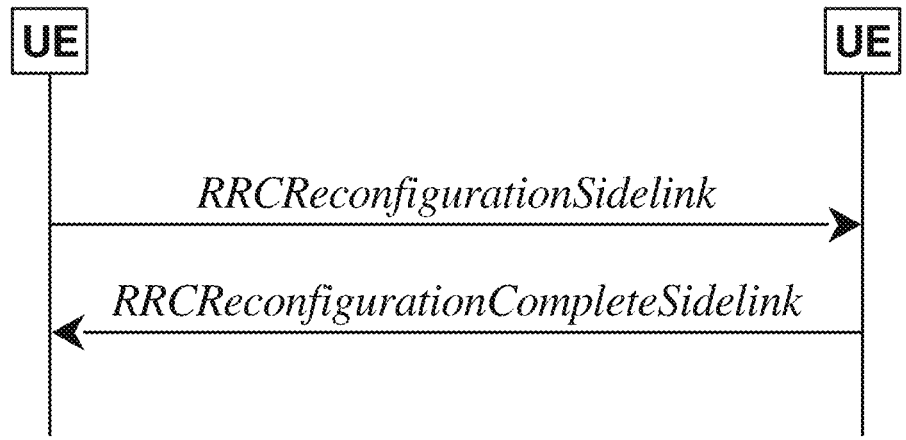
FIG. 18 is a reproduction of FIG. 5.8.9.1.1-1 of 3GPP TS 38.331 V17.2.0.

[FIG. 5.8.9.1.1-1 of 3GPP TS 38.331 V17.2.0, Entitled "Sidelink RRC Reconfiguration, Successful", is Reproduced as FIG. 18]

The purpose of this procedure is to modify a PC5-RRC connection, e.g. to establish/modify/release sidelink DRBs or PC5 Relay RLC channels, to (re-)configure NR sidelink measurement and reporting, to (re-)configure sidelink CSI reference signal resources, to (re)configure CSI reporting latency bound, to (re)configure sidelink DRX, and to (re-)configure the latency bound of SL Inter-UE coordination report.

The UE may initiate the sidelink RRC reconfiguration procedure and perform the operation in clause 5.8.9.1.2 on the corresponding PC5-RRC connection in following cases:
  the release of sidelink DRBs associated with the peer UE, as specified in clause 5.8.9.1a.1;
  the establishment of sidelink DRBs associated with the peer UE, as specified in clause 5.8.9.1a.2;
  the modification for the parameters included in SLRB-Config of sidelink DRBs associated with the peer UE, as specified in clause 5.8.9.1a.2;
  the release of PC5 Relay RLC channels for L2 U2N Relay UE and Remote UE, as specified in clause 5.8.9.7.1;
  the establishment of PC5 Relay RLC channels for L2 U2N Relay UE and Remote UE, as specified in clause 5.8.9.7.2;
  the modification for the parameters included in SL-RLC-ChannelConfigPC5 of PC5 Relay RLC channels for L2 U2N Relay UE and Remote UE, as specified in clause 5.8.9.7.2;
  the (re-)configuration of the peer UE to perform NR sidelink measurement and report.
  the (re-)configuration of the sidelink CSI reference signal resources and CSI reporting latency bound;
  the (re-)configuration of the peer UE to perform sidelink DRX;
  the (re-)configuration of the latency bound of SL Inter-UE coordination report.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

5.8.9.3 Sidelink Radio Link Failure Related Actions

The UE shall:
1> upon indication from sidelink RLC entity that the maximum number of retransmissions for a specific destination has been reached; or
1> upon T400 expiry for a specific destination; or
1> upon indication from MAC entity that the maximum number of consecutive HARQ DTX for a specific destination has been reached; or
1> upon integrity check failure indication from sidelink PDCP entity concerning SL-SRB2 or SL-SRB3 for a specific destination:
    2> consider sidelink radio link failure to be detected for this destination;
    2> release the DRBs of this destination, according to clause 5.8.9.1a.1;
    2> release the SRBs of this destination, according to clause 5.8.9.1a.3;
    2> release the PC5 Relay RLC channels of this destination if configured, in according to clause 5.8.9.7.1;
    2> discard the NR sidelink communication related configuration of this destination;
    2> reset the sidelink specific MAC of this destination;
    2> consider the PC5-RRC connection is released for the destination;
    2> indicate the release of the PC5-RRC connection to the upper layers for this destination (i.e. PC5 is unavailable);
    2> if UE is in RRC_CONNECTED:
        3> if the UE is acting as L2 U2N Remote UE:
            4> initiate the RRC connection re-establishment procedure as specified in 5.3.7.
        3> else:
            4> perform the sidelink UE information for NR sidelink communication procedure, as specified in 5.8.3.3;
    NOTE: It is up to UE implementation on whether and how to indicate to upper layers to maintain the keep-alive procedure [55].

9.1.1.4 SCCH Configuration

Parameters that are specified for unicast of NR sidelink communication, which is used for the sidelink signalling radio bearer of PC5-RRC message. The SL-SRB using this SCCH configuration is named as SL-SRB3.

| Name | Value | Semantics description | Ver |
|---|---|---|---|
| PDCP configuration | | | |
| >t-Reordering | Undefined | Selected by the receiving UE, up to UE implementation | |
| >pdcp-SN-Size | 12 | | |
| RLC configuration | | AM RLC | |
| >sn-FieldLength | 12 | | |
| >t-Reassembly | Undefined | Selected by the receiving UE, up to UE implementation | |
| >t-PollRetransmit | Undefined | Selected by the transmitting UE, up to UE implementation | |
| >pollPDU | Undefined | Selected by the transmitting UE, up to UE implementation | |
| >pollByte | Undefined | Selected by the transmitting UE, up to UE implementation | |

-continued

| Name | Value | Semantics description | Ver |
|---|---|---|---|
| >maxRetxThreshold | Undefined | Selected by the transmitting UE, up to UE implementation | |
| >t-StatusProhibit | Undefined | Selected by the receiving UE, up to UE implementation | |
| >logicalChannelIdentity | 3 | | |
| MAC configuration | | | |
| >priority | 1 | | |
| >prioritisedBitRate | infinity | | |
| >logicalChannelGroup | 0 | | |
| >schedulingRequestId | 0 | The scheduling request configuration with this value is applicable for this SCCH if configured by the network. | |
| >sl-HARQ-FeedbackEnabled | Undefined | Selected by the transmitting UE, up to UE implementation | |

Parameters that are specified of NR sidelink communication, which is used for the sidelink signalling radio bearer of unprotected PC5-S message (e.g. Direct Link Establishment Request, TS 24.587 [57]). The SL-SRB using this SCCH configuration is named as SL-SRB0.

| Name | Value | Semantics description | Ver |
|---|---|---|---|
| PDCP configuration | | | |
| >t-Reordering | Undefined | Selected by the receiving UE, up to UE implementation | |
| >pdcp-SN-Size | 12 | | |
| RLC configuration | | UM RLC | |
| >sn-FieldLength | 6 | | |
| >t-Reassembly | Undefined | Selected by the receiving UE, up to UE implementation | |
| >logicalChannelIdentity | 0 | | |
| MAC configuration | | | |
| >priority | 1 | | |
| >prioritisedBitRate | infinity | | |
| >logicalChannelGroup | 0 | | |
| >schedulingRequestId | 0 | The scheduling request configuration with this value is applicable for this SCCH if configured by the network. | |
| >sl-HARQ-FeedbackEnabled | Undefined | Selected by the transmitting UE, up to UE implementation | |

Parameters that are specified for unicast of NR sidelink communication, which is used for the sidelink signalling radio bearer of PC5-S message establishing PC5-S security (e.g. Direct Link Security Mode Command and Direct Link Security Mode Complete, TS 24.587 [57]). The SL-SRB using this SCCH configuration is named as SL-SRB1.

| Name | Value | Semantics description | Ver |
|---|---|---|---|
| PDCP configuration | | | |
| >t-Reordering | Undefined | Selected by the receiving UE, up to UE implementation | |
| >pdcp-SN-Size | 12 | | |
| RLC configuration | | AM RLC | |
| >sn-FieldLength | 12 | | |
| >t-Reassembly | Undefined | Selected by the receiving UE, up to UE implementation | |
| >t-PollRetransmit | Undefined | Selected by the transmitting UE, up to UE implementation | |
| >pollPDU | Undefined | Selected by the transmitting UE, up to UE implementation | |

-continued

| Name | Value | Semantics description | Ver |
|---|---|---|---|
| >pollByte | Undefined | Selected by the transmitting UE, up to UE implementation | |
| Name | Value | Semantics description | Ver |
| >maxRetxThreshold | Undefined | Selected by the transmitting UE, up to UE implementation | |
| >t-StatusProhibit | Undefined | Selected by the receiving UE, up to UE implementation | |
| >logicalChannelIdentity | 1 | | |
| MAC configuration | | | |
| >priority | 1 | | |
| >prioritisedBitRate | infinity | | |
| >logicalChannelGroup | 0 | | |
| >schedulingRequestId | 0 | The scheduling request configuration with this value is applicable for this SCCH if configured by the network. | |
| >sl-HARQ-FeedbackEnabled | Undefined | Selected by the transmitting UE, up to UE implementation | |

Parameters that are specified for unicast of NR sidelink communication, which is used for the sidelink signalling radio bearer of protected PC5-S message except Direct Link Security Mode Complete. The SL-SRB using this SCCH configuration is named as SL-SRB2.

| Name | Value | Semantics description | Ver |
|---|---|---|---|
| PDCP configuration | | | |
| >t-Reordering | Undefined | Selected by the receiving UE, up to UE implementation | |
| >pdcp-SN-Size | 12 | | |
| RLC configuration | | AM RLC | |
| >sn-FieldLength | 12 | | |
| >t-Reassembly | Undefined | Selected by the receiving UE, up to UE implementation | |
| >t-PollRetransmit | Undefined | Selected by the transmitting UE, up to UE implementation | |
| >pollPDU | Undefined | Selected by the transmitting UE, up to UE implementation | |
| >pollByte | Undefined | Selected by the transmitting UE, up to UE implementation | |
| >maxRetxThreshold | Undefined | Selected by the transmitting UE, up to UE implementation | |
| >t-StatusProhibit | Undefined | Selected by the receiving UE, up to UE implementation | |
| >logicalChannelIdentity | 2 | | |
| MAC configuration | | | |
| >priority | 1 | | |
| >prioritisedBitRate | infinity | | |
| >logicalChannelGroup | 0 | | |
| >schedulingRequestId | 0 | The scheduling request configuration with this value is applicable for this SCCH if configured by the network. | |
| >sl-HARQ-FeedbackEnabled | Undefined | Selected by the transmitting UE, up to UE implementation | |

Parameters that are specified for NR sidelink L2 U2N Relay operations, which is used for the PC5 Relay RLC channel for Remote UE's SRB0 message transmission. The PC5 Relay RLC channel using this configuration is named as SL-RLC0.

| Name | Value | Semantics description | Ver |
|---|---|---|---|
| RLC configuration | | AM | |
| >sn-FieldLength | 12 | | |
| >t-Reassembly | Undefined | Selected by the receving UE, up to UE implementation | |

-continued

| Name | Value | Semantics description | Ver |
|---|---|---|---|
| >t-PollRetransmit | Undefined | Selected by the transmitting UE, up to UE implementation | |
| >pollPDU | Undefined | Selected by the transmitting UE, up to UE implementation | |
| >pollByte | Undefined | Selected by the transmitting UE, up to UE implementation | |
| >maxRetxThreshold | Undefined | Selected by the transmitting UE, up to UE implementation | |
| >t-StatusProhibit | Undefined | Selected by the receiving UE, up to UE implementation | |
| >logicalChannelIdentity | 56 | | |
| MAC configuration | | | |
| >priority | 1 | | |
| >proritisedBitRate | Inifinity | | |
| >logicalChannelGroup | 0 | | |
| >scheduling RequestId | 0 | The scheduling request configuration with this value is applicable for this SCCH if configured by the network. The scheduling request configuration is not applicable to L2 U2N Remote UE. | |
| >sl-HARQ-FeedbackEnabled | Undefined | Selected by the transmitting UE, up to UE implementation | |

9.2.4 Default PC5 Relay RLC Channel

Parameters of the PC5 Relay RLC Channel used for Remote UE's SRB1 RRC message transmission and reception. The PC5 Relay RLC Channel using this configuration is named as SL-RLC1.

| Name | Value | Semantics description | Ver |
|---|---|---|---|
| RLC configuration | | AM | |
| >sn-FieldLength | 12 | | |
| >t-Reassembly | Undefined | Selected by the receiving UE, up to UE implementation | |
| >t-PollRetransmit | Undefined | Selected by the transmitting UE, up to UE implementation | |
| >pollPDU | Undefined | Selected by the transmitting UE, up to UE implementation | |
| >pollByte | Undefined | Selected by the transmitting UE, up to UE implementation | |
| >maxRetxThreshold | Undefined | Selected by the transmitting UE, up to UE implementation | |
| >t-StatusProhibit | Undefined | Selected by the receiving UE, up to UE implementation | |
| >logicalChannelIdentity | 57 | | |
| MAC configuration | | | |
| >priority | 1 | | |
| >proritisedBitRate | Inifinity | | |
| >logicalChannelGroup | 0 | | |
| >schedulingRequestId | 0 | The scheduling request configuration with this value is applicable for this SCCH if configured by the network. | |

3GPP TR 38.836 introduces the following:

3.1 Terms

UE-to-UE Relay: A relaying architecture where a Relay UE relays the traffic between a first Remote UE (i.e., source UE) and a second Remote UE (i.e, destination UE).

5 Sidelink-Based UE-to-UE Relay 5.1 Scenario, Assumption and Requirement

The UE-to-UE Relay enables the coverage extension of the sidelink transmissions between two sidelink UEs and power saving. The coverage scenarios considered in this study are the following:

1) All UEs (Source UE, Relay UE, Destination UE) are in coverage.
2) All UEs (Source UE, Relay UE, Destination UE) are out-of-coverage.
3) Partial coverage whereby at least one of the UEs involved in relaying (Source UE, Relay UE, Destination UE) is in-coverage, and at least one of the UEs involved in relaying is out-of-coverage.

RAN2 will strive for a common solution to the in- and out-of-coverage cases. For the UE-to-UE Relay, the scenario where UEs can be in coverage of the different cell is supported.

FIGS. 5.1-1 shows the scenarios considered for UE-to-UE Relay. In FIGS. 5.1-1, coverage implies that the Source/Destination UE and/or UE-to-UE Relay UE are in coverage and can access the network on Uu.

Figure 19:
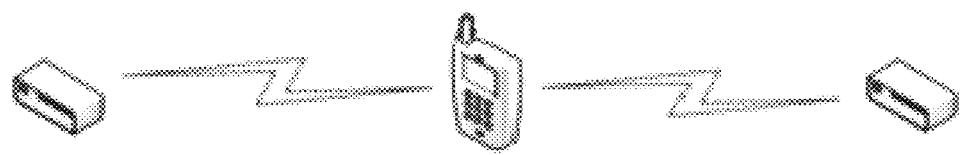
FIG. 19 is a reproduction of FIGS. 5.1-1 of 3GPP TR 38.836 V17.0.0.

[FIGS. 5.1-1 of 3GPP TR 38.836 V17.0.0, Entitled "Scenarios for UE-to-UE Relay (where the Coverage Status is not Shown)", is Reproduced as FIG. 19]

NR sidelink is assumed on PC5 between the Remote UE(s) and the UE-to-UE Relay. Cross-RAT configuration/control of Source UE, UE-to-UE Relay and Destination UE is not considered, i.e., eNB/ng-eNB do not control/configure an NR Source UE, Destination UE or UE-to-UE Relay UE. For UE-to-UE Relay, this study focuses on unicast data traffic between the Source UE and the Destination UE.

Configuring/scheduling of a UE (Source UE, Destination UE or UE-to-UE Relay UE) by the SN to perform NR sidelink communication is out of scope of this study.

For UE-to-UE Relay, it is assumed that the Remote UE has an active end-to-end connection via only a single Relay UE at a given time.

Relaying of data between a Source UE and a Destination UE can occur once a PC5 link is established between the Source UE, UE-to-UE Relay, and Destination UE.

No restrictions are assumed on the RRC states of any UEs involved in UE-to-UE Relaying. The requirement of service continuity is only for UE-to-Network Relay, but not for UE-to-UE Relay, during mobility in this release.

5.2 Discovery

Model A and model B discovery model as defined in clause 5.3.1.2 of TS 23.303 [3] are supported for UE-to-UE Relay, and integrated PC5 unicast link establishment procedure can be supported based on SA2 conclusion. The protocol stack of discovery message is described in FIGS. 5.2-1.

Figure 20:
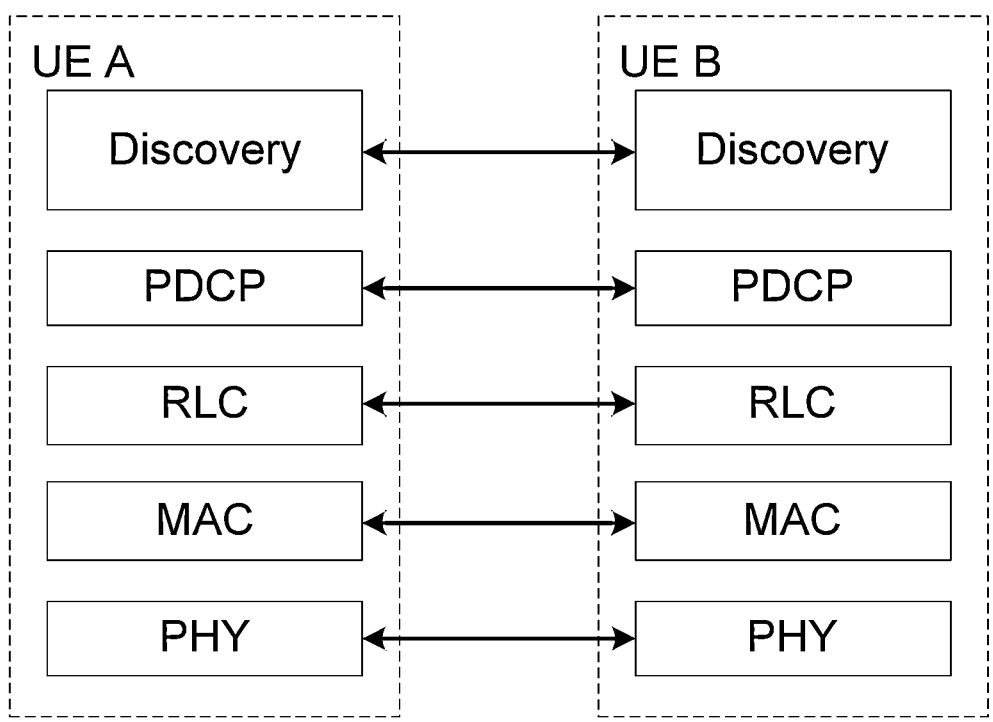
FIG. 20 is a reproduction of FIGS. 5.2-1 of 3GPP TR 38.836 V17.0.0.

[FIGS. 5.2-1 of 3GPP TR 38.836 V17.0.0, Entitled "Protocol Stack of Discovery Message for UE-to-UE Relay", is Reproduced as FIG. 20]

Relay UE or Remote UE is allowed to transmit discovery message when triggered by upper layer.

Both Remote UE and Relay UE can rely on pre-configuration unless relevant radio configuration is provided by network, either via system information or dedicated signalling.

Resource pool to transmit discovery message can be either shared with or separated from resource pool for data transmission.

For both shared resource pool and separated resource pool, a new LCID is introduced for discovery message i.e. discovery message is carried by a new SL SRB.

Within separated resource pool discovery messages are treated equally with each other during LCP procedure.

5.3 Relay (Re-)Selection Criteria and Procedure

The baseline solution for relay (re-)selection is as follow:

Radio measurements at PC5 interface are considered as part of relay (re)selection criteria.

Remote UE at least uses the radio signal strength measurements of sidelink discovery messages to evaluate whether PC5 link quality of a Relay UE satisfies relay selection and reselection criterion.

When Remote UE is connected to a Relay UE, it may use SL-RSRP measurements on the sidelink unicast link to evaluate whether PC5 link quality with the Relay UE satisfies relay reselection criterion.

Further details on the PC5 radio measurements criteria, e.g., in case of no transmission on the sidelink unicast link can be discussed in WI phase. How to perform RSRP measurement based on RSRP of discovery message and/or SL-RSRP if Remote UE has PC5-RRC connection with Relay UE can be decided in WI phase.

For relay (re-)selection, Remote UE compares the PC5 radio measurements of a Relay UE with the threshold which is configured by gNB or preconfigured. Higher layer criteria also need to be considered by Remote UE for relay (re-)selection, but details can be left to SA2 to decide. Relay (re-)selection can be triggered by upper layers of Remote UE.

Relay reselection should be triggered if the NR Sidelink signal strength of current Sidelink relay is below a (pre)configured threshold. Also, relay reselection may be triggered if RLF of PC5 link with current Relay UE is detected by Remote UE.

The above-described baseline for relay (re)selection apply to both L2 and L3 relay solutions. Additional AS layer criteria can be considered in WI phase for both L2 and L3 UE-to-UE Relay solutions.

For relay (re-)selection, when Remote UE has multiple suitable Relay UE candidates which meet all AS-layer & higher layer criteria and Remote UE need to select one Relay UE by itself, it is up to UE implementation to choose one Relay UE.

As captured in TR 23.752, solution #8 and solution #50 in TR 23.752 are taken as baseline solution for L2 and L3 UE-to-UE Relay reselection, and solution #8 and solution #11 in TR 23.752 are taken as baseline solution for L3 UE-to-UE Relay selection.

5.4 Relay/Remote UE Authorization

RAN2 concludes that authorization of both Relay UE and Remote UE has no RAN2 impact.

5.5 Layer-2 Relay 5.5.1 Architecture and Protocol Stack

For L2 UE-to-UE Relay architecture, the protocol stacks are similar to L2 UE-to-Network Relay other than the fact that the termination points are two Remote UEs. The protocol stacks for the user plane and control plane of L2 UE-to-UE Relay architecture are described in FIG. 5.5.1-1 and FIG. 5.5.1-2.

An adaptation layer is supported over the second PC5 link (i.e. the PC5 link between Relay UE and Destination UE) for L2 UE-to-UE Relay. For L2 UE-to-UE Relay, the adaptation layer is put over RLC sublayer for both CP and UP over the second PC5 link. The sidelink SDAP/PDCP and RRC are terminated between two Remote UEs, while RLC, MAC and PHY are terminated in each PC5 link.

Figure 21:
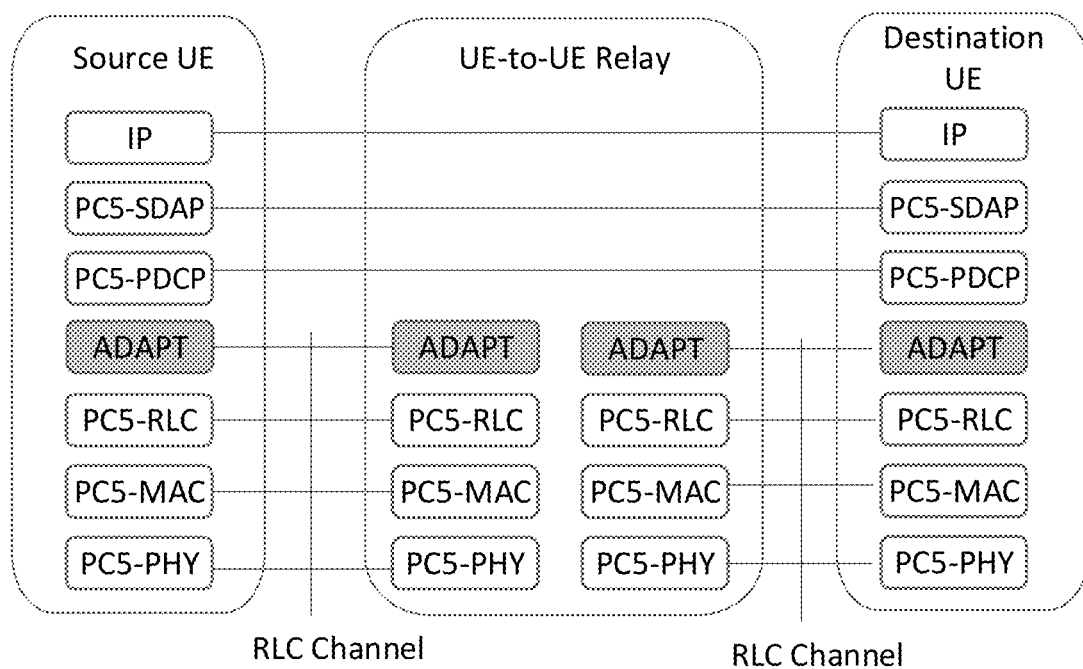
FIG. 21 is a reproduction of FIG. 5.5.1-1 of 3GPP TR 38.836 V17.0.0.

[FIG. 5.5.1-1 of 3GPP TR 38.836 V17.0.0, Entitled "User Plane Protocol Stack for L2 UE-to-UE Relay", is Reproduced as FIG. 21]

Figure 22:
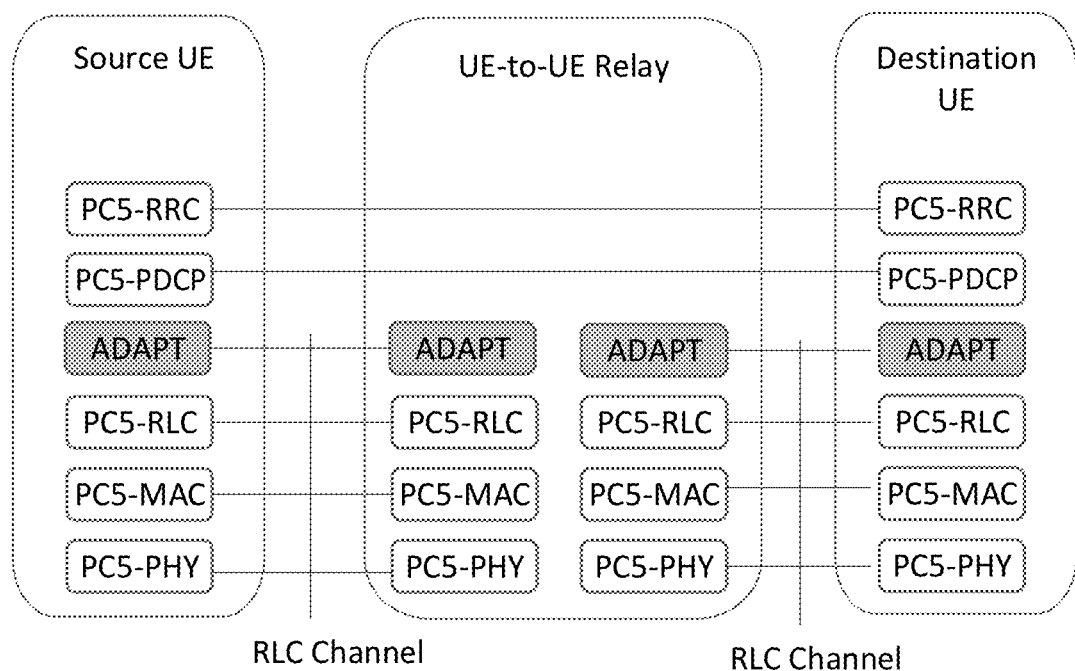
FIG. 22 is a reproduction of FIG. 5.5.1-2 of 3GPP TR 38.836 V17.0.0.

[FIG. 5.5.1-2 of 3GPP TR 38.836 V17.0.0, Entitled "Control Plane Protocol Stack for L2 UE-to-UE Relay", is Reproduced as FIG. 22]

For the first hop of L2 UE-to-UE Relay:
The N:1 mapping is supported by first hop PC5 adaptation layer between Remote UE SL Radio Bearers and first hop PC5 RLC channels for relaying.
The adaptation layer over first PC5 hop between Source Remote UE and Relay UE supports to identify traffic destined to different Destination Remote UEs.
For the second hop of L2 UE-to-UE Relay:
The second hop PC5 adaptation layer can be used to support bearer mapping between the ingress RLC channels over first PC5 hop and egress RLC channels over second PC5 hop at Relay UE.
PC5 Adaptation layer supports the N:1 bearer mapping between multiple ingress PC5 RLC channels over first PC5 hop and one egress PC5 RLC channel over second PC5 hop and supports the Remote UE identification function.
For L2 UE-to-UE Relay:
The identity information of Remote UE end-to-end Radio Bearer is included in the adaptation layer in first and second PC5 hop.
In addition, the identity information of Source Remote UE and/or the identity information of Destination Remote UE are candidate information to be included in the adaptation layer, which are to be decided in WI phase.

5.5.2 Qos

QoS handling for L2 UE-to-UE Relay is subject to upper layer, e.g. solution #31 in TR 23.752 studied by SA2.

5.5.3 Security

As described in clause 6.9.1.2 (Solution #9) of TR 23.752, in case of L2 UE-to-UE Relay, the security is established at PDCP layer in an end to end manner between UE1 and UE2. Security aspects require confirmation from SA3.

5.5.4 Control Plane Procedure

RAN2 consider the SA2 solution in TR 23.752[6] as baseline. Further RAN2 impacts can be discussed in WI phase, if any.

3GPP TR 23.700-33 introduces the following:

6.1 Solution #1: UE-to-UE Relay Selection without Relay Discovery 6.1.1 Description This solution addressed Key Issue #1 "Support of UE-to-UE Relay".

NOTE: The solution was Solution #8 of TR 23.752 [2].

When a source UE wants to communicate with a target UE, it will first try to find the target UE by either sending a Direct Communication Request or a Solicitation message with the target UE info. If the source UE cannot reach the target UE directly, it will try to discover a UE-to-UE relay to reach the target UE which may also trigger the relay to discover the target UE. To be more efficient, this solution tries to integrate target UE discovery and UE-to-UE relay discovery and selection together, including two alternatives:

Alternative 1: UE-to-UE relay discovery and selection can be integrated into the unicast link establishment procedure as described in clause 6.4.3.1 of TS 23.304 [3].

Alternative 2: UE-to-UE relay discovery and selection is integrated into Model B direct discovery procedure.

A new field is proposed to be added in the Direct Communication Request or the Solicitation message to indicate whether relays can be used in the communication. The field can be called relay_indication. When a UE wants to broadcast a Direct Communication Request or a Solicitation message, it indicates in the message whether a UE-to-UE relay could be used. For Release 18, it is assumed that the value of the indication is restricted to single hop. When a UE-to-UE relay receives a Direct Communication Request or a Solicitation message with the relay_indication set, then it shall decide whether to forward the message (i.e. modify the message and broadcast it in its proximity), according to e.g. Relay Service Code if there is any, Application ID, authorization policy (e.g. relay for specific ProSe Service), the current traffic load of the relay, the radio conditions between the source UE and the relay UE, etc. It may exist a situation where multiple UE-to-UE relays can be used to reach the target UE or the target UE may also directly receive the Direct Communication Request or Solicitation message from the source UE. The target UE may choose which one to reply according to e.g. signal strength, local policy (e.g. traffic load of the UE-to-UE relays), Relay Service Code if there is any or operator policies (e.g. always prefer direct communication or only use some specific UE-to-UE relays).

The source UE may receive the responses from multiple UE-to-UE relays and may also from the target UE directly, the source UE chooses the communication path according to e.g. signal strength or operator policies (e.g. always prefer direct communication or only use some specific UE-to-UE relays).

6.1.2 Procedures 6.1.2.1 UE-to-UE Relay Discovery and Selection is Integrated into the Unicast Link Establishment Procedure (Alternative 1)

Figure 23:
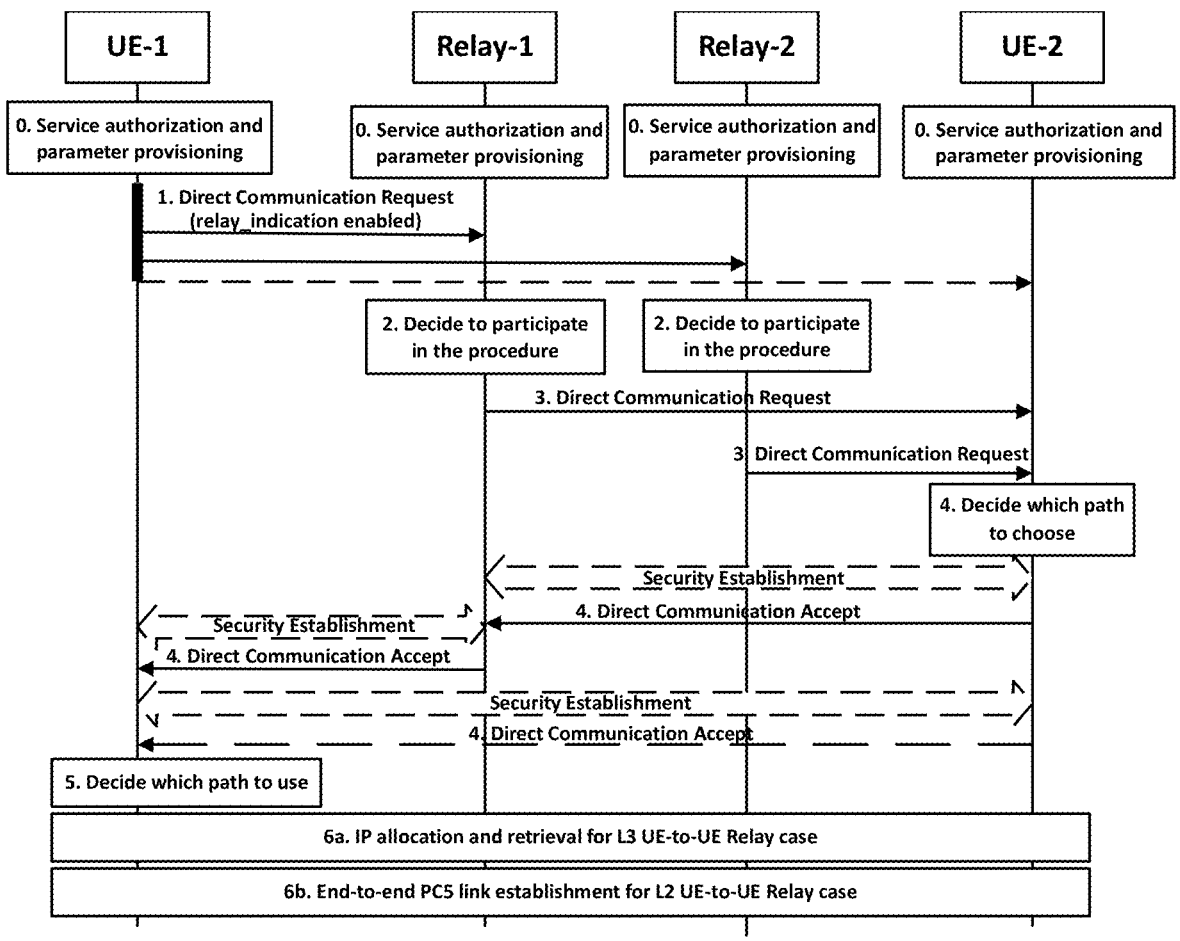
FIG. 23 is a reproduction of FIG. 6.1.2.1-1 of 3GPP TR 23.700-33 V1.1.0.

[FIG. 6.1.2.1-1 of 3GPP TR 23.700-33 V1.1.0, Entitled "5G ProSe UE-to-UE Relay Selection (Alternative 1)", is Reproduced as FIG. 23]

FIG. 6.1.2.1-1 illustrates the procedure of the proposed method.

0. UEs are authorized to use the service provided by the UE-to-UE relays. UE-to-UE relays are authorized to provide service of relaying traffic among UEs. The authorization and the parameter provisioning can use solutions for KI #5. The authorization can be done when UEs/relays are registered to the network. Security related parameters may be provisioned so that a UE and a relay can verify the authorization with each other if needed.

1. UE-1 wants to establish unicast communication with UE-2 and the communication can be either through direct link with UE-2 or via a UE-to-UE relay. Then UE-1 broadcasts Direct Communication Request with relay_indication enabled. The message will be received by relay-1, relay-2. The message may also be received by UE-2 if it is in the proximity of UE-1. UE-1 includes source UE info, target UE info, Application ID, as well as Relay Service Code if there is any. If UE-1 does not want relay to be involved in the communication, then it will made relay_indication disabled.

NOTE 1: The data type of relay_indication can be determined in Stage 3. Details of Direct Communication Request/Accept messages will be determined in stage 3.

2. Relay-1 and relay-2 decide to participate in the procedure. They broadcast a new Direct Communication Request message in their proximity without relay_indication enabled. If a relay receives this message, it will just drop it. When a relay broadcasts the Direct Communication Request message, it includes source UE info, target UE info and Relay UE info (e.g. Relay UE ID) in the message and use Relay's L2 address as the source Layer-2 ID. The Relay maintains association between the source UE information (e.g. source UE L2 ID) and the new Direct Communication Request.
3. UE-2 receives the Direct Communication Requests from relay-1 and relay-2. UE-2 may also receive Direct Communication Request message directly from the UE-1 if the UE-2 is in the communication range of UE-1.
4. UE-2 chooses relay-1 and replies with Direct Communication Accept message. If UE-2 directly receives the Direct Communication Request from UE-1, it may choose to setup a direct communication link by sending the Direct Communication Accept message directly to UE-1. After receiving Direct Communication Accept, a UE-to-UE relay retrieves the source UE information stored in step 2 and sends the Direct Communication Accept message to the source UE with its Relay UE info added in the message.

After step 4, UE-1 and UE-2 have respectively setup the PC5 links with the chosen UE-to-UE relay.

NOTE 2: The security establishment between the UE1 and Relay-1, and between Relay-1 and UE-2 are performed before the Relay-1 and UE-2 send Direct Communication Accept message. Details of the authentication/security establishment procedure are determined by SA WG3. The security establishment procedure can be skipped if there already exists a PC5 link between the source (or target) UE and the relay which can be used for relaying the traffic.

5. UE-1 receives the Direct Communication Accept message from relay-1. UE-1 chooses path according to e.g. policies (e.g. always choose direct path if it is possible), signal strength, etc. If UE-1 receives Direct Communication Accept/Response message request accept directly from UE-2, it may choose to setup a direct PC5 L2 link with UE-2 as described in clause 6.4.3.1 of TS 23.304 [3], then step 6 is skipped.

6a. For the L3 UE-to-UE Relay case, UE-1 and UE-2 finish setting up the communication link via the chosen UE-to-UE relay. The link setup information may vary depending on the type of relay, e.g. L2 or L3 relaying. Then UE-1 and UE-2 can communicate via the relay. Regarding IP address allocation for the source/remote UE, the addresses can be either assigned by the relay or by the UE itself (e.g. link-local IP address) as defined in clause 6.4.3.1 of TS 23.304 [3].

6b. For the Layer 2 UE-to-UE Relay case, the source and target UE can setup an end-to-end PC5 link via the relay. UE-1 sends a unicast E2E Direct Communication Request message to UE-2 via the Relay-1, and UE-2 responds with a unicast E2E Direct Communication Accept message to UE-1 via the Relay-1. Relay-1 transfers the messages based on the identity information of UE-1/UE-2 in the Adaptation Layer.

NOTE 3: How Relay-1 can transfer the messages based on the identity information of UE-1/UE-2 in the Adaptation Layer requires cooperation with RAN2 during the normative phase.

NOTE 4: In order to make a relay or path selection, the source UE can setup a timer after sending out the Direct Communication Request for collecting the corresponding response messages before making a decision. Similarly, the target UE can also setup a timer after receiving the first copy of the Direct Communication Request/message for collecting multiple copies of the message from different paths before making a decision.

NOTE 5: In the first time when a UE receives a message from a UE-to-UE relay, the UE needs to verify if the relay is authorized be a UE-to-UE relay. Similarly, the UE-to-UE relay may also need to verify if the UE is authorized to use the relay service. The verification details and the how to secure the communication between two UEs through a UE-to-UE relay is to be defined by SA WG3.

6.11 Solution #11: Consolidated Solution for Layer-3 UE-to-UE Relay Communication Setup after Model a and Model B Discovery 6.11.1 Description This solution applies to Key Issue #1 "Support for UE-to-UE Relay" to support communication setup for Layer-3 UE-to-UE Relay. It can be taken as a merged and consolidated solution of sol #5, Sol #6 and Sol #4. The assumption is that source UE has selected a suitable UE-to-UE Relay and received the Layer-2 ID of the target UE after Model A or Model B discovery. RSC used in the UE-to-UE Relay communication setup procedure is selected during UE-to-UE Relay discovery procedures. The RSC can be associated with one or multiple ProSe identifier(s). The UE-to-UE Relay, the source UE and the target UE are aware of whether an RSC is offering Layer-2 or Layer-3 UE-to-UE Relay service, and whether an RSC is for IP or non-IP based the configured policy.

This solution is applicable for both IP and non-IP traffic. For non-IP traffic, the UE-to-UE Relay stores the 1:1 mapping between the link with source UE and the link with target UE, thus Direct Communication Request is always provided by source UE to the UE-to-UE Relay and provided by the UE-to-UE Relay to target UE. For IP traffic, the UE-to-UE Relay acts as an IP router, the link between source UE and UE-to-UE Relay can be shared by multiple target UEs, the link between UE-to-UE Relay and target UE can be shared by multiple source UEs. If there's no PC5 link between source UE and the UE-to-UE Relay existing for the required RSC, or for non-IP traffic transmitting, Source UE sends the Direct Communication Request to the UE-to-UE Relay which contains User Info ID of UE-to-UE Relay, User Info ID and Layer-2 ID of target UE, RSC. If there's an existing PC5 link between source UE and the UE-to-UE Relay for the required RSC which is related to IP type traffic, source UE sends a Link Modification Request to the UE-to-UE Relay contains User Info ID and Layer-2 ID of target UE. If there's no PC5 link between the UE-to-UE Relay and the target UE existing for the required RSC, or for non-IP traffic transmitting, the UE-to-UE Relay sends Direct Communication Request to the target UE using the received Layer-2 ID of target UE as the Destination Layer-2 ID. If there's an existing PC5 link between the UE-to-UE Relay and the target UE for the required RSC which is related to IP type traffic, the UE-to-UE Relay sends a Link Modification Request to the target UE. After receiving the response from target UE, for IP traffic, UE-to-UE Relay provides the IP address of target UE to source UE.

6.11.2 Procedures

Depicted in FIG. 6.11.2-1 is the procedure for Layer-3 UE-to-UE Relay communication setup.

Figure 24:
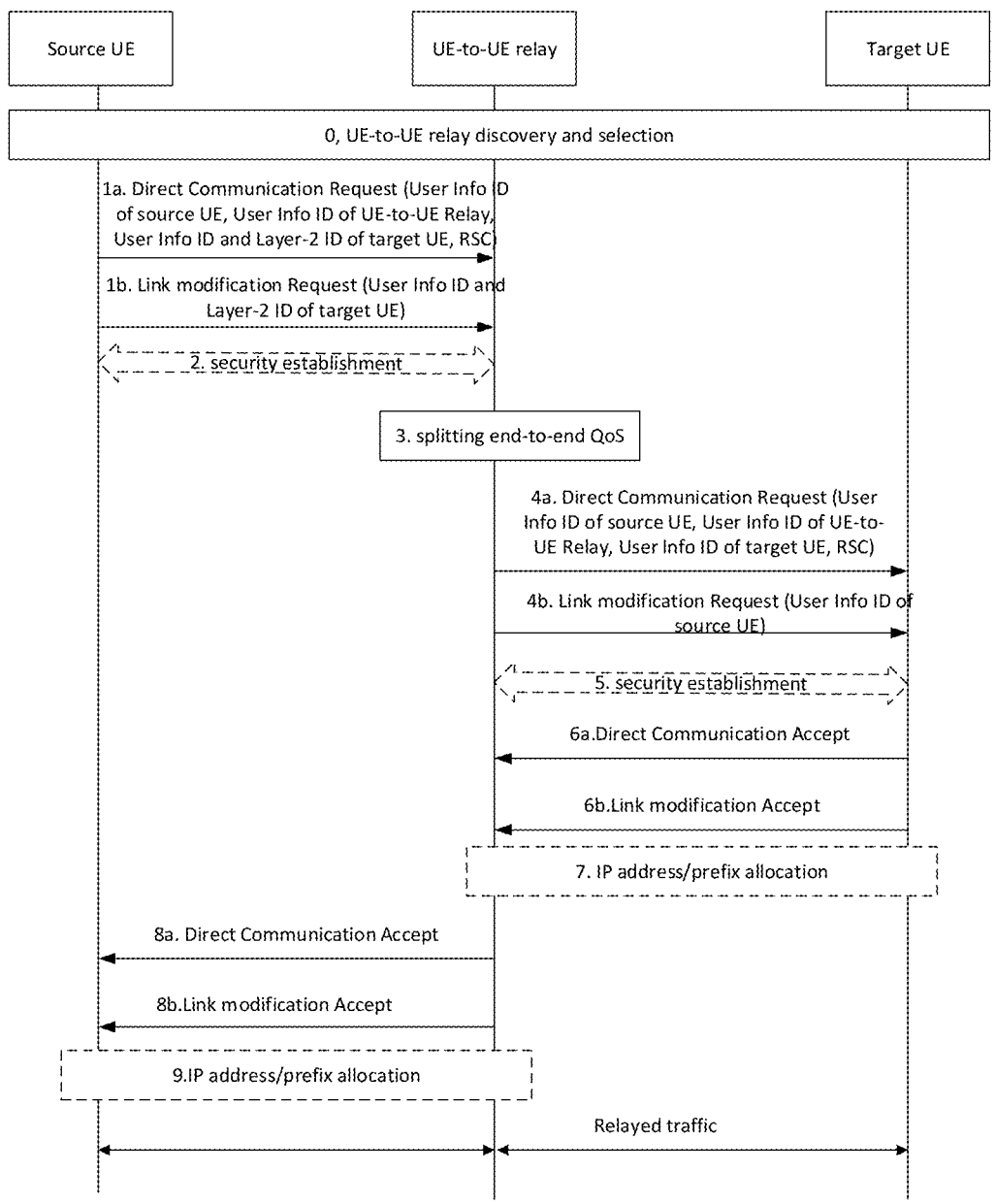
FIG. 24 is a reproduction of FIG. 6.11.2-1 of 3GPP TR 23.700-33 V1.1.0.

[FIG. 6.11.2-1 of 3GPP TR 23.700-33 V1.1.0, Entitled "Layer-3 UE-to-UE Relay Communication Setup after Model a and Model B Discovery", is Reproduced as FIG. 24]

0. Source UE has selected a suitable UE-to-UE Relay and received the Layer-2 ID of the target UE after Model A or Model B discovery. Source UE decides to connect with target UE via the selected UE-to-UE Relay.
1a. If there's no PC5 link between source UE and the UE-to-UE Relay existing for the required RSC, or for non-IP traffic transmitting, Source UE sends a Direct Communication Request to the UE-to-UE Relay. The Direct Communication Request contains User Info ID of source UE, User Info ID of UE-to-UE Relay, User Info ID and Layer-2 ID of target UE, RSC. The Source Layer-2 ID of the Direct Communication Request is self-assigned by the source UE, the Destination Layer-2 ID of the Direct Communication Request is the source Layer-2 ID of the selected UE-to-UE Relay during UE-to-UE Relay discovery.
1b. If there's an existing PC5 link between source UE and the UE-to-UE Relay for the required RSC which is related to IP type traffic, source UE sends a Link Modification Request to the UE-to-UE Relay. The Link Modification Request contains User Info ID and Layer-2 ID of target UE, end-to-end QoS to the target UE.
2. After step 1a, if the UE-to-UE Relay matches the User Info ID of UE-to-UE Relay and RSC, it responds by establishing the security with source UE. When the security protection is enabled, source UE sends the information as described in clause 6.4.3.1 of TS 23.304 [3] including end-to-end QoS to the target UE, source UE may provide its Link-Local IPv6 Address in this step.
3. The UE-to-UE Relay, based on its implementation, splits the end-to-end QoS into two parts: one part is for the PC5 interface between source UE and UE-to-UE Relay, the other part is for the PC5 interface between UE-to-UE Relay and the target UE.
4a. If there's no PC5 link between the UE-to-UE Relay and the target UE exist for the required RSC, or for non-IP traffic transmitting, the UE-to-UE Relay sends a Direct Communication Request to the target UE. The Direct Communication Request contains User Info ID of source UE, User Info ID of UE-to-UE Relay, User Info ID of target UE, RSC, source UE's IP address if it's available in the UE-to-UE Relay. The Source Layer-2 ID of the Direct Communication Request is self-assigned by the UE-to-UE Relay, the Destination Layer-2 ID of the Direct Communication Request is the Layer-2 ID of target UE received in step 1.

NOTE: For non-IP traffic, the UE-to-UE Relay use different Source Layer-2 IDs in the Direct Communication Requests towards the same target UE for different source UEs.

4b. If there's an existing PC5 link between the UE-to-UE Relay and the target UE for the required RSC which is related to IP type traffic, the UE-to-UE Relay sends a Link Modification Request to the target UE. The Link Modification Request contains User Info ID of source UE, source UE's IP address if it's available in the UE-to-UE Relay, QoS part between UE-to-UE Relay and the target UE.
5. After step4a, if the target UE matches the User Info ID of target UE and RSC, it responds by establishing the security with UE-to-UE Relay. When the security protection is enabled, UE-to-UE Relay sends the information to target UE, the information is as described in clause 6.4.3.1 of TS 23.304 [3] including QoS part between UE-to-UE Relay and the target UE.
6a. After step5, the target UE sends the Direct Communication Accept as described in clause 6.4.3.1 of TS 23.304 [3] to the UE-to-UE Relay, the target UE may provide its Link-Local IPv6 Address in this step.
6b. After step4b, the target UE sends the Link Modification Accept as described in clause 6.4.3.4 of TS 23.304 [3] to the UE-to-UE Relay.
7. After step 6a, if the target UE doesn't provide its Link-Local IPV6 Address, for IP traffic, IPV6 prefix or IPv4 address is allocated by the UE-to-UE Relay for the target UE.
8a. if step1a is performed, the UE-to-UE Relay sends the Direct Communication Accept as described in clause 6.4.3.1 of TS 23.304 [3] to the source UE. For IP traffic, the Direct Communication Accept in addition contains the IP address of target UE. For non-IP traffic, the UE-to-UE Relay stores the 1:1 mapping between the link with source UE and the link with target UE.
8b. if step1b is performed, the UE-to-UE Relay sends the Link Modification Accept as described in clause 6.4.3.4 of TS 23.304 [3] to the source UE. the Link Modification Accept in addition contains the IP address of target UE.
9. After step 8a, if the source UE hasn't provided its Link-Local IPV6 Address, for IP traffic, IPV6 prefix or IPv4 address is allocated by the UE-to-UE Relay for the source UE. The UE-to-UE Relay performs relaying function at the corresponding layer as follows:

For IP traffic, the UE-to-UE Relay acts as an IP router.

For non-IP traffic, the UE-to-UE Relay performs traffic relaying based on a mapping between the link with source UE and the link with target UE.

8 Conclusions 8.1 Key Issue #1: Support of UE-to-UE Relay

For Key Issue #1 (Support of UE-to-UE Relay), the followings are taken as conclusions:

The following conclusions are common for both Layer-3 UE-to-UE Relay and Layer-2 UE-to-UE Relay:

For UE-to-UE Relay discovery, both Model A and Model B discovery are supported.

Discovery integrated into PC5 unicast link establishment procedure is supported. Sol #1 Alt1 is used as basis for normative phase.

The 5G ProSe UE-to-UE Relay discovery message contains two sets of elements, i.e. direct discovery set(s) and a U2U discovery set.

The direct discovery set of elements can be part of the contents of 5G ProSe Direct Discovery message as defined in Rel-17. This includes for example the User Info ID of Source UE and Target UE.

The U2U discovery set contains the information to support the discovery of the UE-to-UE relay and extensions of the direct discovery. This includes for example Type of Discovery Message, RSC, User Info ID of the relay, etc.

5G ProSe UE-to-UE relay only modifies the U2U set of the elements, and forwards the end-to-end elements during the discovery procedures.

The following parameters are used for UE-to-UE Relay discovery:
  For UE-to-UE Relay Model A discovery, the Type of Discovery Message, User Info ID of the UE-to-UE Relay, RSC, list of User Info ID of Target UE are contained in the Announcement message.
  For UE-to-UE Relay Model B discovery between Source UE and UE-to-UE Relay, the Type of Discovery Message, User Info ID of Source UE, RSC, and User Info ID of Target UE are contained in the Solicitation message, and the Type of Discovery Message, User Info ID of UE-to-UE Relay, RSC, and User Info ID of Target UE are contained in the Response message.
  For UE-to-UE Relay Model B discovery between UE-to-UE Relay and Target UE, the Type of Discovery Message, User Info ID of Source UE, User Info ID of UE-to-UE Relay, RSC, and User Info ID of Target UE are contained in the Solicitation message, and the Type of Discovery Message, RSC, User Info ID of Source UE, and User Info ID and Layer-2 ID of Target UE are contained in the Response message.
NOTE 1: Whether UE-to-UE Relay provides Layer-2 ID of Target UE in the discovery messages to Source UE can align with the decision of RAN WGs during normative work.
NOTE 2: Whether and how a Source UE and a Target UE indicate support of UE-to-UE Relay operation will be determined in normative phase.
For UE-to-UE Relay selection, the Source UE performs the UE-to-UE Relay selection for both Model A and Model B discovery. For Model B discovery, a Target UE may choose to respond or not to a UE-to-UE Relay, for example, based on the PC5 signal strength of each message received.
For service authorization and policy/parameter provisioning for UE-to-UE Relay operation, the PCF based service authorization and provisioning as defined in TS 23.304 [3] is used as basis for normative work.
  The policy/parameters per ProSe service includes Relay Service Code(s) and UE-to-UE Relay Layer indicator(s); a UE-to-UE Relay Layer Indicator per RSC that indicates whether the RSC is offering 5G ProSe Layer-2 or Layer-3 UE-to-UE Relay service.
The Target UE performs the UE-to-UE Relay selection if the UE-to-UE relay discovery is integrated into PC5 unicast link establishment procedure, i.e., upon receiving a Direct Communication Request from the Source UE via one or more UE-to-UE Relay UEs.
For UE-to-UE Relay reselection, the negotiated UE-to-UE Relay reselection between Source UE and Target UE in Sol #7 and the UE-to-UE Relay selection procedure in Sol #10 can be used under different conditions.
NOTE 3: UE-to-UE Relay selection/reselection requires cooperation with RAN WGs during normative work.
IP, Ethernet and Unstructured traffic types are supported.
NOTE 4: Ethernet and Unstructured traffic types can be encapsulated in IP traffic type if supported by source and target UE.
In the case of one Source UE communicates with multiple Target UEs, the PC5 link between Source UE and UE-to-UE Relay can be shared for multiple Target UEs per RSC while the PC5 links may be established individually between UE-to-UE Relay and Target UEs per RSC. For the shared PC5 link, the Layer-2 link modification procedure can be used.

In the case of multiple Source UEs communicate with one Target UE, the PC5 link between UE-to-UE Relay and Target UE can be shared per RSC while the PC5 links may be established individually between Source UEs and UE-to-UE Relay per RSC. For the shared PC5 link, the Layer-2 link modification procedure can be used.
NOTE 5: If source UE or target UE has multiple application layer IDs (user info), it would be treated as different UEs per application layer ID and separate PC5 link between UE (source UE or target UE) and Relay UE shall be setup. This will be confirmed by RAN during normative phase.
For UE-to-UE Relay Per-hop links setup (i.e. PC5 link establishment between Source UE and UE-to-UE Relay, as well as between UE-to-UE Relay and Target UE), Source UE initiates the PC5 link setup with UE-to-UE Relay (first hop), and UE-to-UE Relay initiates the PC5 link setup with the target UE (second hop). Sol #11 is used as basis for normative work.
The Layer-2 link establishment procedure as defined in TS 23.304 [3] clause 6.4.3.1 is reused for per-hop link establishment for UE-to-UE Relay with the following clarifications:
  UE-to-UE Relay initiates the second hop PC5 link establishment after the Security Establishment procedure is completed at the first hop.
  UE-to-UE Relay sends the Direct Communication Accept message to Source UE after the second hop PC5 link establishment is completed (i.e. UE-to-UE Relay has received Direct Communication Accept message from Target UE).
  The IP address allocation procedure as defined in TS 23.304 [3] clause 6.4.3.1 is reused on each hop for UE-to-UE Relay.
  The Source UE and Target UE may obtain the IP address of each other using DNS. The Source UE may obtain the IP address of a Target UE from the UE-to-UE Relay in the Direct Communication Accept message (if included).
  For the first hop PC5 link establishment:
    The Source UE sends a Direct Communication Request message including User Info ID of Source UE, User Info ID of UE-to-UE Relay, User Info ID and Layer-2 ID of Target UE, RSC and Security Information to UE-to-UE Relay.
    For Layer-3 UE-to-UE Relaying after the security protection is enabled the Source UE sends IP Address Configuration or Link-Local IPv6 address, QoS Info (PFI and PC5 QoS parameters) to UE-to-UE Relay.
    The UE-to-UE Relay sends a Direct Communication Accept message to the Source UE including User Info ID of Source UE, User Info ID of UE-to-UE Relay, User Info ID of Target UE and RSC.
    For Layer-3 UE-to-UE Relaying the Layer-3 UE-to-UE Relay also includes the IP address of the Target UE (optional), QoS Info (PFI and split PC5 QoS parameters), and IP Address Configuration or Link-Local IPV6 address in the Direct Communication Accept.
  For the second hop PC5 link establishment:
    The UE-to-UE Relay sends Direct Communication Request message including User Info ID of Source UE, User Info ID of UE-to-UE Relay, User Info ID of Target UE, RSC and Security Information to the Target UE.

For Layer-3 UE-to-UE Relaying after the security protection is enabled, the Layer-3 UE-to-UE Relay sends IP Address Configuration or Link-Local IPV6 address, and Qos Info (PFI and split PC5 QoS parameters) to the Target UE.

The Target UE sends Direct Communication Accept message to the UE-to-UE Relay including User Info ID of Source UE, User Info ID of UE-to-UE Relay, User Info ID of Target UE and RSC.

For Layer-3 UE-to-UE Relaying the Target UE also includes QoS Info (PFI and split PC5 QoS parameters), and IP Address Configuration or Link-Local IPV6 address in the Direct Communication Accept message.

The following conclusions are specific for Layer-3 UE-to-UE Relay:

NOTE 6: Evaluation of any solution to authorize the sharing of IP address information of Source UE and Target UE depends on SA3.

The Link Identifier Update (LIU) procedure, Sol #32 (clause 6.32.3) is used as basis for normative work.

For QoS control of Layer-3 UE-to-UE Relay, the UE-to-UE Relay receives E2E QoS from Source UE and determines the per-hop QoS parameters to satisfy the E2E QoS. Sol #4 (clause 6.4.2) is used as basis for normative work.

The following conclusions are specific for Layer-2 UE-to-UE Relay:

Per-hop links (i.e. PC5 link between Source UE and UE-to-UE Relay, as well as between UE-to-UE Relay and Target UE) needs to be established before E2E PC5 link establishment is performed. Sol #30 (clause 6.30.2.2) is used as basis for normative work.

NOTE 7: How the E2E PC5-S messages are forwarded by the UE-to-UE Relay is to be determined by RAN WGs.

NOTE 8: For Layer-2 UE-to-UE Relay, RAN WGs will define how the E2E QoS will be handled and split over the PC5 links.

According to 3GPP TS 23.287 and 3GPP TS 23.304, a UE may perform a PC5 unicast link establishment procedure (e.g. Layer-2 link establishment) with a peer UE for establishing a layer-2 link or a unicast link between these two UEs. Basically, the Layer-2 ID of the peer UE, identified by the Application Layer ID of the peer UE, may be discovered via discovery messages, during the establishment of the PC5 unicast link, or known to the UE via prior sidelink communications, e.g. existing or prior unicast link to the same Application Layer ID, or obtained from application layer service announcements. The initial signaling for the establishment of the PC5 unicast link (i.e. Direct Communication Request) may use the known Layer-2 ID of the peer UE, or a default destination Layer-2 ID associated with the ProSe service/application configured for PC5 unicast link establishment. During the PC5 unicast link establishment procedure, Layer-2 IDs of the two UEs are exchanged and used for future communication between the two UEs.

In addition, according to 3GPP TS 24.554, the two UEs would exchange security information to each other during the PC5 unicast link establishment so that the two UEs use the negotiated security algorithm and/or key(s) for protection of the content of traffic (including e.g. PC5-S signaling, PC5-RRC signaling and/or PC5 user plane data) sent over the PC5 unicast link.

According to 3GPP TR 23.700-33, UE-to-UE Relay will be supported in sidelink communication, which means a relay UE may be used to support data communication between two UEs (e.g. Source remote UE/UE1 and Destination remote UE/UE2) in case these two UEs cannot communicate with each other directly. For privacy, the content of traffic communicated between the two UEs cannot be read or known by Relay UE. Therefore, it is supposed that a security context for protection of user plane (session traffic sent on Sidelink (SL) Data Radio Bearer(s) (DRB(s))) over the two UEs should be isolated from a security context established between a Relay UE and each of these two UEs. It is also supposed that some PC5-S signaling not related to the Relay UE (i.e. these PC5-S signaling sent on SL SRB(s) may be exchanged between UE1 and UE2) could be also protected by the security context established for protection of user plane traffic transfer between UE1 and UE2.

Solution #1 in 3GPP TR 23.700-33 introduced that when a source UE wants to communicate with a target UE, it will first try to find the target UE by sending a Direct Communication Request with the target UE info. If the source UE cannot reach the target UE directly, it will try to discover a UE-to-UE relay to reach the target UE which may also trigger one or more relay UEs to discover the target UE. To be more efficient, this solution could integrate target UE discovery and/or UE-to-UE relay discovery and selection together, i.e. UE-to-UE relay discovery and selection can be integrated into the unicast link (or direct link) establishment procedure as described in clause 6.4.3.1 of 3GPP TS 23.304.

On the other hand, 3GPP TR 23.700-33 concluded that the Layer-2 link establishment procedure as defined in 3GPP TS 23.304 clause 6.4.3.1 is reused for per-hop link establishment for UE-to-UE Relay with the following clarifications:

UE-to-UE Relay initiates the second hop PC5 link establishment after the Security Establishment procedure is completed at the first hop.

UE-to-UE Relay sends the Direct Communication Accept message to Source UE after the second hop PC5 link establishment is completed (i.e. UE-to-UE Relay has received Direct Communication Accept message from Target UE).

Figure 25:
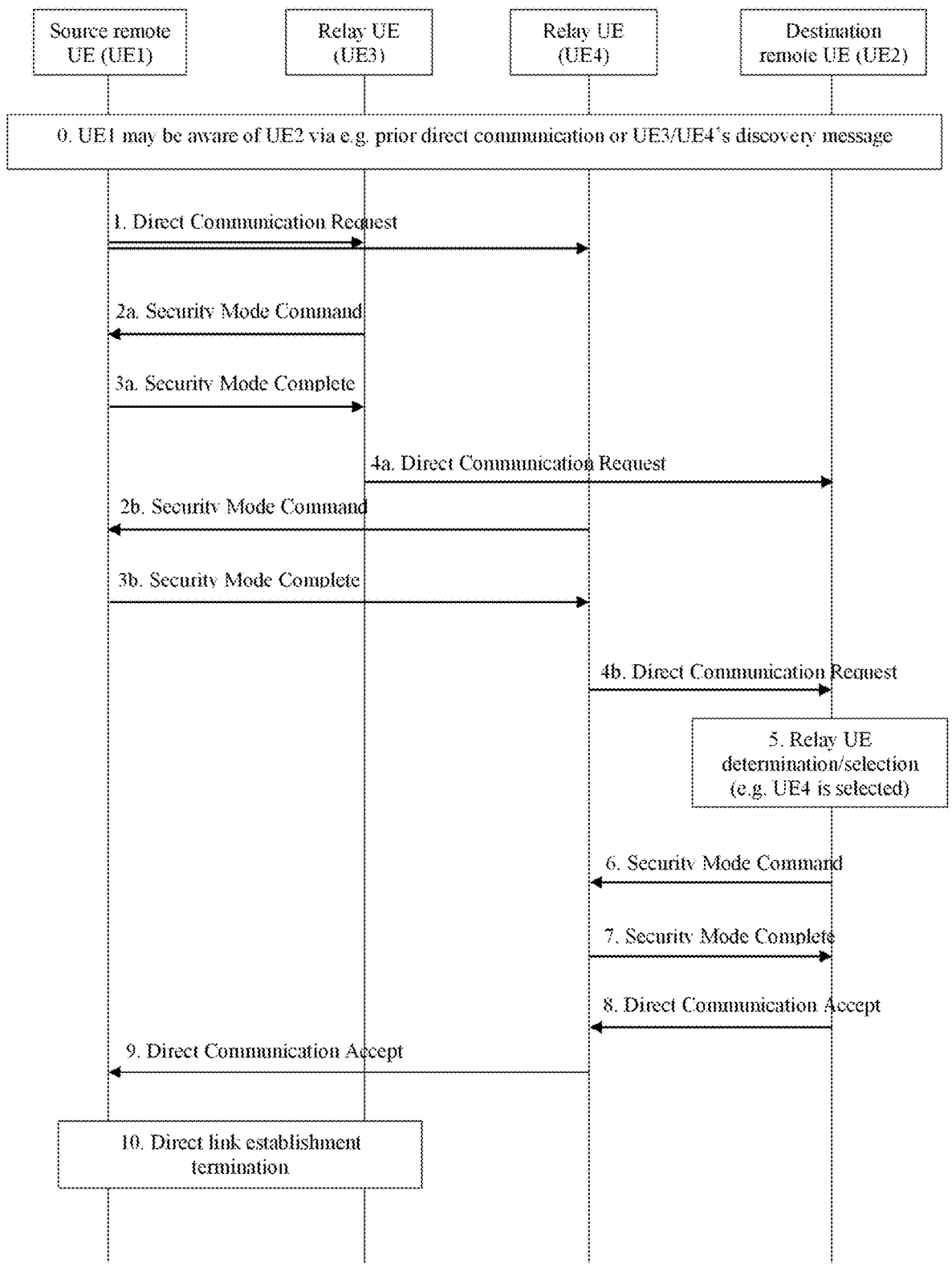
FIG. 25 illustrates an exemplary flow chart of direct link establishment for UE-to-UE relay communication based on solutions discussed in 3GPP TR 23.700-33 according to one exemplary embodiment.

If the discovery integrated into direct link establishment procedure follows the concept of the clarifications of the per-hop link establishment, an example of step flow could be illustrated in FIG. 25, which illustrates an exemplary flow chart of direct link establishment for UE-to-UE relay communication based on solutions discussed in 3GPP TR 23.700-33 according to one exemplary embodiment. Details of each step could be described below. In following examples, there is a source remote UE (i.e. UE1) could expect to communicate with a destination remote UE (i.e. UE2), while there could be a first relay UE (i.e. UE3) and a second relay UE (i.e. UE4) in proximity of the two remote UEs.

0. UE1 may be aware of UE2's upper layer identity (i.e. application layer identity) beforehand. It would be known to UE1 due to prior direct communication between UE1 and UE2. It would be known to UE1 due to content of relay discovery message received from UE3 and/or UE4 (as introduced in Step 2 of FIG. 6.10.2.1-1 (not shown) of 3GPP TR 23.700-33).

1. UE1 may not select which relay UE for participating the following U2U relay communication since it would now know the channel quality between each of them and UE2. Thus, relay selection/determination may be performed by UE2.

UE1 could send a Direct Communication Request (DCR) message (as introduced in 3GPP TS 23.304) or Direct Link Establishment Request message (as introduced in 3GPP TS 24.554) with some modifications as introduced in 3GPP TR 23.700-33. This DCR message could be sent by using a default/broadcast layer-2 ID as Destination Layer-2 ID. UE3 and UE4 can use the default/broadcast layer-2 ID (as Destination Layer-2 ID) to receive the DCR message from UE1.

2. For step 2a, UE3 could send a direct link security mode command message (as introduced in 3GPP TS 24.554) to UE1 for establishing a security context of a first PC5 connection between UE1 and UE3.

For step 2b, UE4 could send a direct link security mode command message (as introduced in 3GPP TS 24.554) to UE1 for establishing a security context of a second PC5 connection between UE1 and UE4.

3. For step 3a, UE1 could send a direct link security mode complete message (as introduced in 3GPP TS 24.554) to UE3 for completing establishment of the security context of the first PC5 connection.

For step 3b, UE1 could send a direct link security mode complete message (as introduced in 3GPP TS 24.554) to UE4 for completing establishment of the security context of the second PC5 connection.

4. For step 4a, UE3 could send a DCR message or Direct Link Establishment Request message for request of establishing one PC5 connection between UE3 and UE2 to UE2. For step 4b, UE4 could send a DCR message or Direct Link Establishment Request message for request of establishing one PC5 connection between UE4 and UE2 to UE2.

5. Based on the received DCR messages from UE3 and UE4, UE2 could perform relay UE determination or selection. In this example, UE4 could be selected.

6. UE2 could send a direct link security mode command message to UE4 for establishing a security context of a third PC5 connection between UE2 and UE4.

7. UE4 could send a direct link security mode complete message to UE2 for completing establishment of the security context of the third PC5 connection.

8. UE2 could send a Direct Communication Accept (DCA) message (as introduced in 3GPP TS 23.304) or Direct Link Establishment Accept message (as introduced in 3GPP TS 24.554) to UE4 for completing establishment of the third PC5 connection.

9. UE4 could send a DCA message or Direct Link Establishment Accept message to UE1 for completing establishment of the second PC5 connection.

10. UE1 and/or UE3 could abort or terminate the procedure of the first PC5 connection establishment.

Possibly, UE1 could control period of the first PC5 connection establishment. If the first PC5 connection establishment cannot be completed within the period, UE1 could directly release any resource associated with UE3 (e.g. the security context of the first PC5 connection). UE1 may start a timer for controlling the period.

Possibly, UE3 could control period of the first PC5 connection establishment. Or, UE3 could control period of procedure of establishing the one PC5 connection between UE3 and UE2. Or, UE3 could control period of expectation of receiving the security mode command message from UE2. If the first PC5 connection establishment, the procedure of establishing the one PC5 connection between UE3 and UE2, or expectation of receiving the security mode command message from UE2 cannot be completed within the period, UE3 could send a reject message corresponding to the DCR message in step 1 to UE1. UE3 may start a timer for controlling the period. Alternatively, UE3 could directly release any resource associated with UE1 (e.g. the security context of the first PC5 connection) if the first PC5 connection establishment cannot be completed within the period.

As shown in FIG. 25, the sidelink resource/context established between UE1 and UE3 becomes useless and should be then released that would cause signaling overhead.

Figure 26:
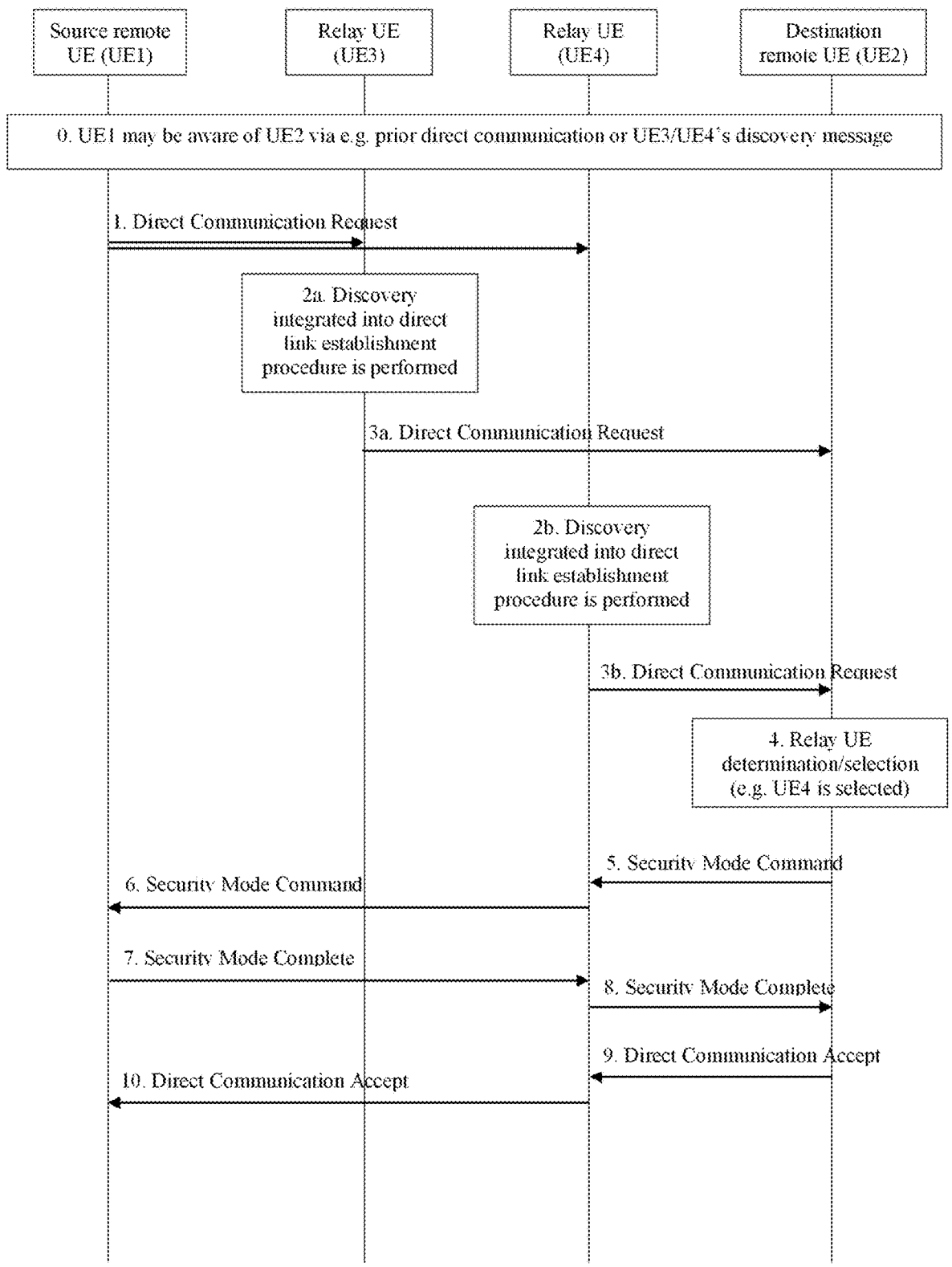
FIG. 26 illustrates an exemplary flow chart of direct link establishment for UE-to-UE relay communication if discovery integrated into direct link establishment procedure is performed according to one exemplary embodiment.

To address the issue, it would be better for relay UE(s) to determine the following actions to be performed when the first-hop DCR message (as in step 1) received from the source remote UE. If the source remote UE does not sure to use which relay UE (i.e. discovery integrated into direct link establishment procedure is (to be) initiated), then any relay UE which receives the first-hop DCR message from the source remote UE could postpone/defer security mode control procedure with the source remote UE and send the second-hop DCR message to the destination remote UE. This concept could be illustrated in FIG. 26, which illustrates an exemplary flow chart of direct link establishment for UE-to-UE relay communication if discovery integrated into direct link establishment procedure is performed according to one exemplary embodiment.

UE2 may receive the second-hop DCR messages (as step 3a and step 3b in FIG. 26) from different relay UEs (e.g. UE3 and UE4). Possibly, UE2 may select/determine UE4 for participating the following U2U relay communication with UE1. Thus, UE2 may initiate the second-hop security mode control procedure (as step 5 and step 8 in FIG. 26) with UE4. Upon the step 5 in FIG. 26, UE4 knows it was selected to participate the U2U relay communication between UE1 and UE2. Thus, it would be that UE4 could then initiate the first-hop security mode control procedure (as step 6 and step 7 in FIG. 26) with UE1. Alternatively, in FIG. 26, the second-hop security mode control procedure could be complete first and the first-hop security mode control procedure is then initiated (i.e. step 6 could start after step 8 (and before step 9)). Alternatively, in FIG. 26, the second-hop direct link establishment procedure could be complete first and the first-hop security mode control procedure is then initiated (i.e. step 6 could start after step 9). UE4 could send the first-hop direct communication accept message (as step 10 in FIG. 26) to UE1 after the second-hop direct communication accept message (as step 9 in FIG. 26) is received from UE2.

In addition, it is possible that service-oriented U2U relay communication could be supported. In other words, the source remote UE may initiate a service toward any destination remote UE(s) which would be also interested in the service. In this use case, the source remote UE may not expect which relay UE(s) and/or which destination remote UE(s) would participate following U2U relay communications. Thus, such discovery integrated into direct link establishment procedure could be used.

More specifically, one or more methods could be considered/used for each Relay UE to consider the discovery integrated into direct link establishment procedure is initiated/preferred:

the first-hop Direct Communication Request (DCR) message contains a relay service code (RSC) associated with preferring/using discovery integrated into direct link establishment procedure;

the first-hop DCR message contains a relay service code (RSC) associated with service-oriented U2U relay communication;

- the first-hop DCR message contains information (e.g. a bit, a field, a flag, an indicator, etc.) indicating the discovery integrated into direct link establishment procedure is preferred;
- the first-hop DCR message is sent by using default/broadcast layer-2 ID as Destination Layer-2 ID;
- the first-hop DCR message contains information element about relay_indication;
- the first-hop DCR message contains relay_indication set to "enabled";
- the first-hop DCR message contains no target relay UE information (e.g. upper/application layer ID of target relay UE);
- the first-hop DCR message contains information about more than one target relay UEs (e.g. upper/application layer ID of each target relay UE);
- the first-hop DCR message contains no information about destination remote UE (e.g. upper/application layer ID of destination remote UE, layer-2 ID of destination remote UE, etc.).

Figure 27:
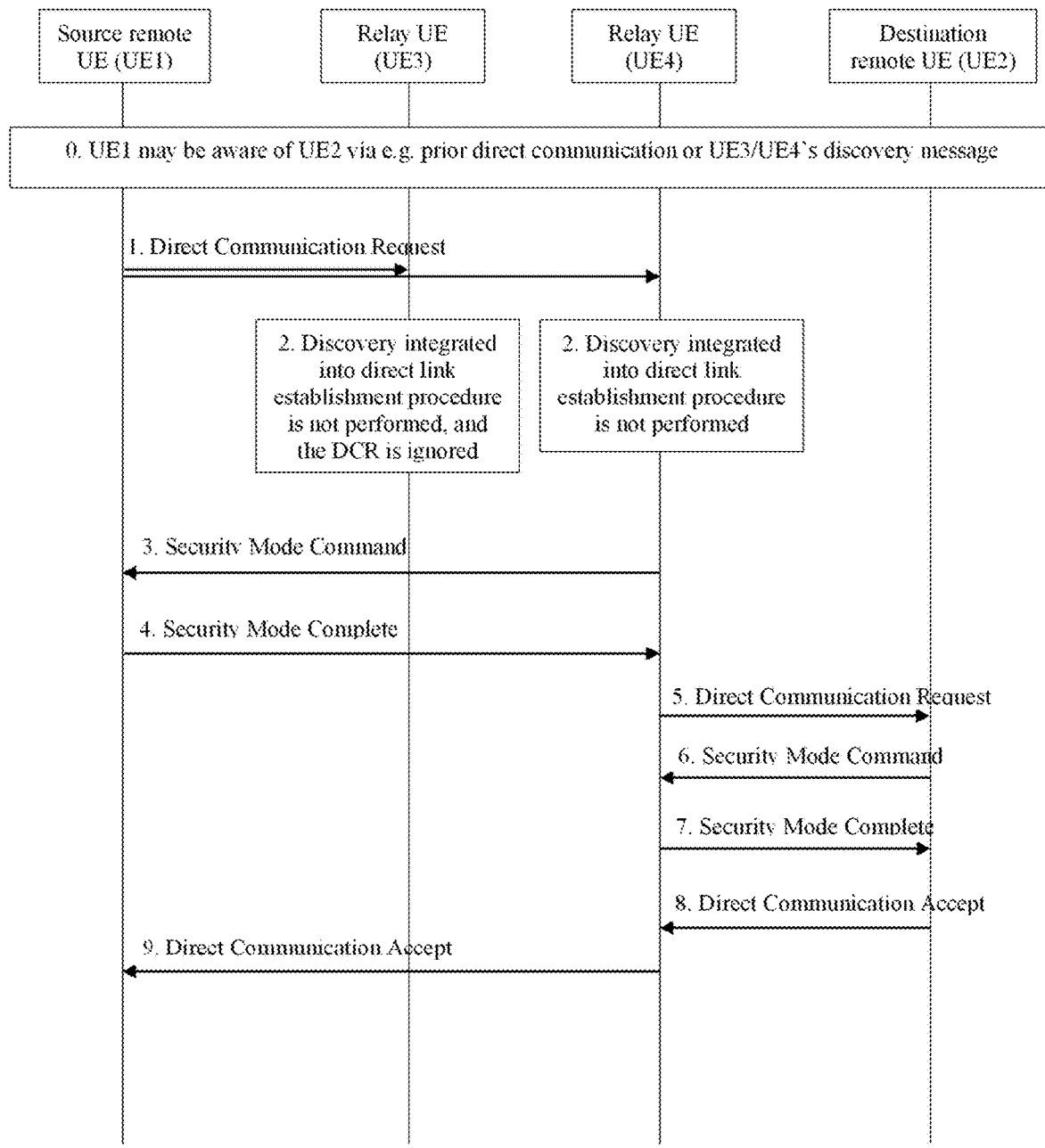
FIG. 27 illustrates an exemplary flow chart of direct link establishment for UE-to-UE relay communication if discovery integrated into direct link establishment procedure is not performed according to one exemplary embodiment.

On the other hand, if the source remote UE considers to use a particular relay UE (i.e. discovery integrated into direct link establishment procedure is not (to be) initiated), then this relay UE which receives the first-hop DCR message from the source remote UE could start to initiate security mode control procedure with the source remote UE. This concept could be illustrated in FIG. 27, which illustrates an exemplary flow chart of direct link establishment for UE-to-UE relay communication if discovery integrated into direct link establishment procedure is not performed according to one exemplary embodiment.

More specifically, one or more methods could be considered/used for each Relay UE to consider the discovery integrated into direct link establishment procedure is not initiated/preferred:

- the first-hop DCR message contains a relay service code (RSC) not associated with preferring/using discovery integrated into direct link establishment procedure;
- the first-hop DCR message contains information (e.g. a bit, a field, a flag, an indicator, etc.) indicating the discovery integrated into direct link establishment procedure is not preferred;
- the first-hop DCR message is sent by using a Relay UE's layer-2 ID as Destination Layer-2 ID:
- the first-hop DCR message contains no information element about relay_indication;
- the first-hop DCR message contains relay_indication set to 'disabled';
- the first-hop DCR message contains information about a target relay UE (e.g. upper/application layer ID of the target relay UE).

Figure 28:
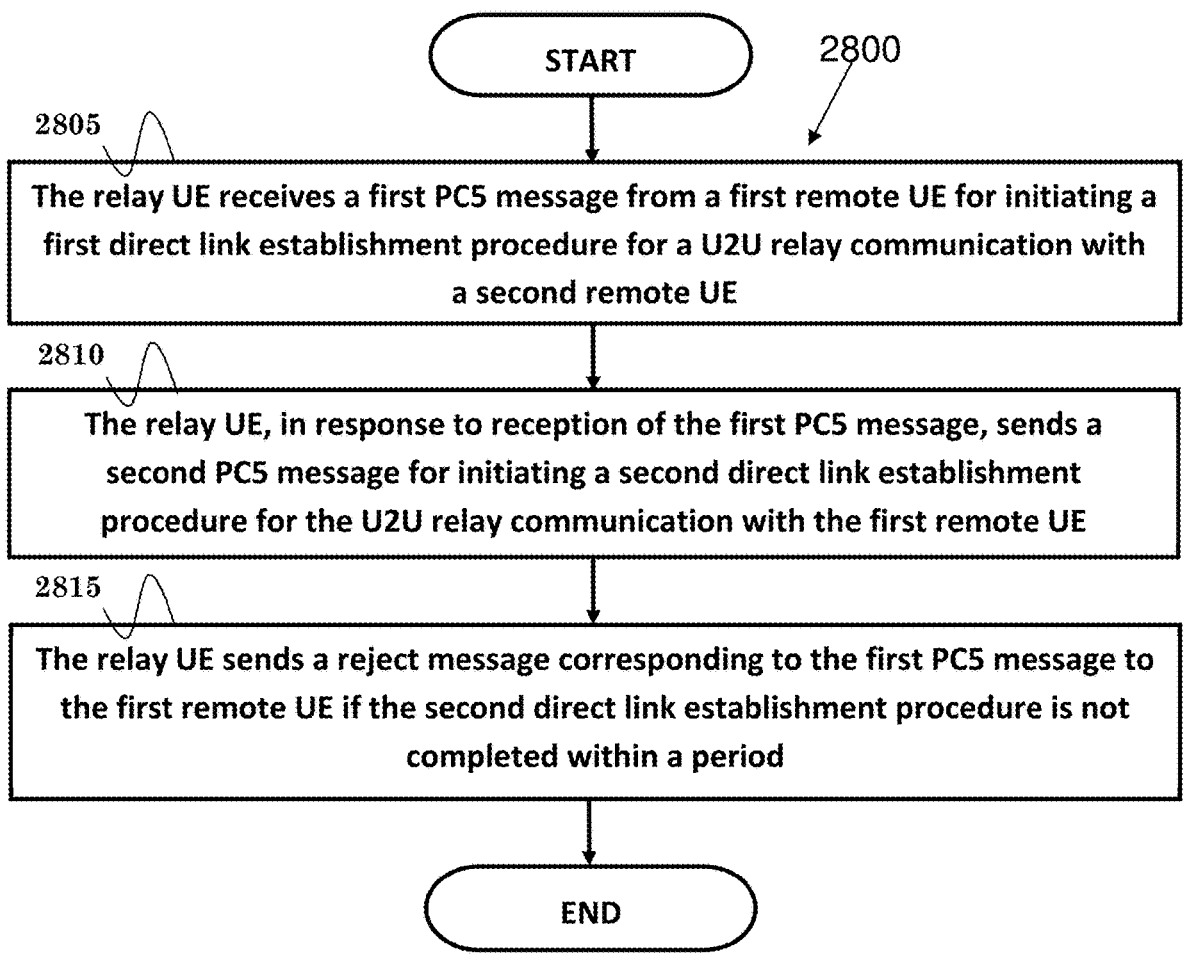
FIG. 28 is a flow chart according to one exemplary embodiment.

FIG. 28 is a flow chart 2800 of a method for a relay UE. In step 2805, the relay UE receives a first PC5 message from a first remote UE for initiating a first direct link establishment procedure for a UE-to-UE (U2U) relay communication with a second remote UE. In step 2810, the relay UE, in response to reception of the first PC5 message, sends a second PC5 message for initiating a second direct link establishment procedure for the U2U relay communication with the first remote UE. In step 2815, the relay UE sends a reject message corresponding to the first PC5 message to the first remote UE if the second direct link establishment procedure is not completed within a period.

In one embodiment, the first PC5 message may be a Direct Communication Request message. The second PC5 message may be a Direct Communication Request message.

In one embodiment, the period may be controlled by a timer. The first PC5 message may include information identifying the first remote UE. The first PC5 message may also include information identifying the second remote UE. The second PC5 message may include information identifying the first remote UE. The second PC5 message may also include information identifying the second remote UE.

Referring back to FIGS. 3 and 4, in one exemplary from the perspective of a relay UE, the relay UE 300 includes a program code 312 stored in the memory 310. The CPU 308 could execute program code 312 to enable the relay UE (i) to receive a first PC5 message from a first remote UE for initiating a first direct link establishment procedure for a U2U relay communication with a second remote UE, (ii) to send, in response to reception of the first PC5 message, a second PC5 message for initiating a second direct link establishment procedure for the U2U relay communication with the first remote UE, and (iii) to send a reject message corresponding to the first PC5 message to the first remote UE if the second direct link establishment procedure is not completed within a period. Furthermore, the CPU 308 can execute the program code 312 to perform all of the above-described actions and steps or others described herein.

Figure 29:
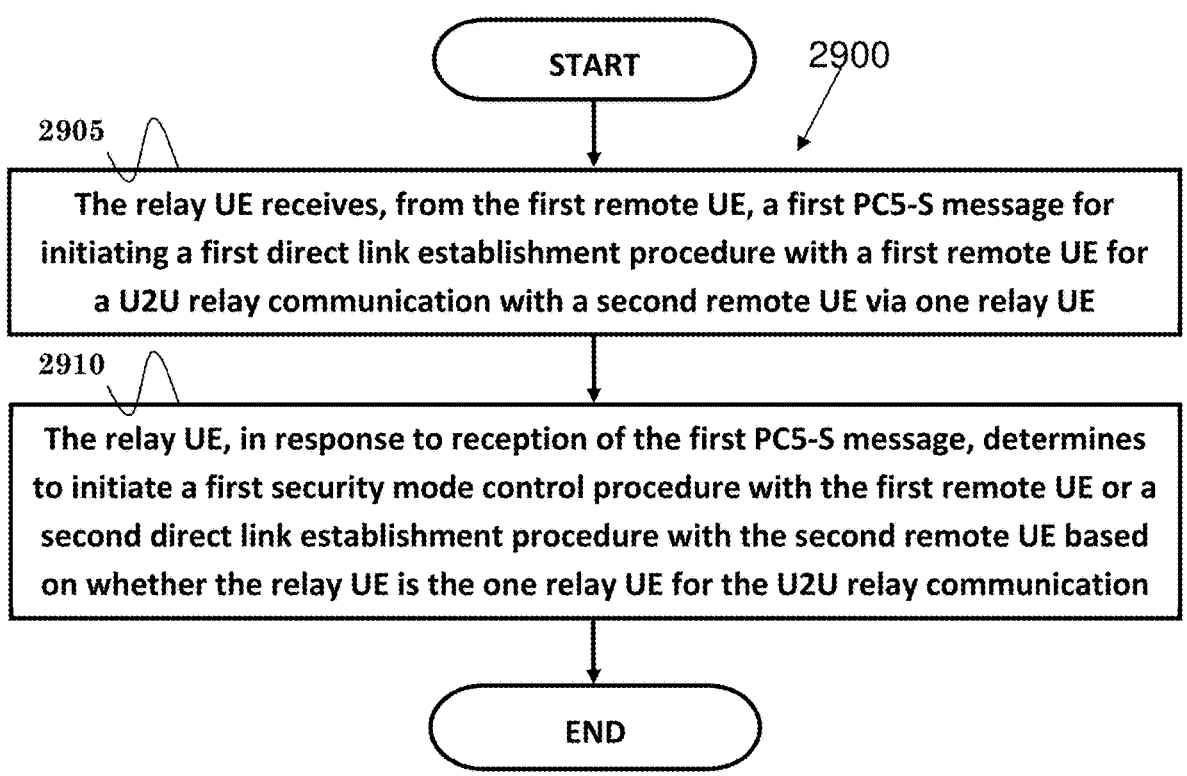
FIG. 29 is a flow chart according to one exemplary embodiment.

FIG. 29 is a flow chart 2900 of a method for a relay UE. In step 2905, the relay UE receives, from a first remote UE, a first PC5-S message for initiating a first direct link establishment procedure with a first remote UE for a UE-to-UE (U2U) relay communication with a second remote UE via one relay UE. In step 2910, the relay UE, in response to reception of the first PC5-S message, determines to initiate a first security mode control procedure with the first remote UE or a second direct link establishment procedure with the second remote UE based on whether the relay UE is the one relay UE for the U2U relay communication.

In one embodiment, the relay UE could initiate the first security mode procedure with the first remote UE if the relay UE is the one relay UE for the U2U relay communication. The relay UE may be the particular relay UE for the U2U relay communication. The relay UE, in the first security mode procedure, could send a second PC5-S message for establishing a security context of a first PC5 connection between the relay UE and the first remote UE to the first remote UE.

In one embodiment, the relay UE could initiate the second direct link establishment procedure with the second remote UE if the relay UE is not the one relay UE for the U2U relay communication. The relay UE may be a candidate relay UE for the U2U relay communication.

In one embodiment, the relay UE, in the second direct link establishment procedure, could send a third PC5-S message for request of establishing a second PC5 connection between the relay UE and the second remote UE to the second remote UE. The first PC5-S message could include information indicates the relay UE is the particular relay UE or the candidate relay UE for the U2U relay communication.

In one embodiment, the first PC5-S message may include information indicates whether discovery integrated into direct link establishment procedure is preferred or not. The first PC5-S message may be a direct link establishment request message or a direct communication request message. The second PC5-S message may be a direct link security mode command message or a security mode command message. The third PC5-S message may be a direct link establishment request message or a direct communication request message. The first/second PC5 connection may be a layer-2 link, a direct link, a PC5-S connection or a PC5-RRC connection.

Referring back to FIGS. 3 and 4, in one exemplary from the perspective of a relay UE, the relay UE 300 includes a program code 312 stored in the memory 310. The CPU 308 could execute program code 312 to enable the relay UE (i) to receive, from the first remote UE, a first PC5-S message for initiating a first direct link establishment procedure with a first remote UE for a U2U relay communication with a second remote UE via one relay UE, and (ii) to determine, in response to reception of the first PC5-S message, to initiate a first security mode control procedure with the first remote UE or a second direct link establishment procedure with the second remote UE based on whether the relay UE is the one relay UE for the U2U relay communication. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a relay User Equipment (UE), comprising:
   receiving, by the relay UE, a first PC5 message from a first remote UE for initiating a first direct link establishment procedure for supporting a UE-to-UE (U2U) relay communication between the first remote UE and a second remote UE via the relay UE;
   sending, by the relay UE and in response to reception of the first PC5 message, a second PC5 message to the second remote UE for initiating a second direct link establishment procedure for supporting the U2U relay communication, wherein the second PC5 message includes at least one of an upper layer identity or an application layer identity identifying the second remote UE, and wherein the relay UE starts a timer T5080 for the second direct link establishment procedure associated with the second remote UE; and
   sending, by the relay UE, a reject message corresponding to the first PC5 message to the first remote UE in the first direct link establishment procedure in response to the second direct link establishment procedure not being completed within a period that is controlled based on the timer T5080.

2. The method of claim 1, wherein the first PC5 message is a Direct Communication Request message.

3. The method of claim 1, wherein the second PC5 message is a Direct Communication Request message.

4. The method of claim 1, wherein the first PC5 message includes information identifying the first remote UE.

5. The method of claim 1, wherein the first PC5 message includes information identifying the second remote UE.

6. The method of claim 1, wherein the second PC5 message includes information identifying the first remote UE.

7. The method of claim 1, wherein the information in the second PC5 message comprises the upper layer identity identifying the second remote UE.

8. The method of claim 1, wherein the information in the second PC5 message comprises the application layer identity identifying the second remote UE.

9. The method of claim 1, comprising:
   receiving, by the relay UE, a third PC5 message from a third remote UE for initiating a third direct link establishment procedure for supporting a second U2U relay communication between the third remote UE and a fourth remote UE via the relay UE;
   sending, by the relay UE, to the fourth remote UE and in response to reception of the third PC5 message, a fourth PC5 message including information, comprising at least one of a second upper layer identity or a second application layer identity, identifying the fourth remote UE for initiating a fourth direct link establishment procedure for supporting the second U2U relay communication; and
   sending, by the relay UE, a first response message corresponding to the third PC5 message to the third remote UE for completing the third direct link establishment procedure when the fourth direct link establishment procedure is completed by receiving a second response message corresponding to the fourth PC5 message from the fourth remote UE.

10. The method of claim 9, wherein the first response message is a Direct Communication Accept message, and the second response message is a Direct Communication Accept message.

11. A relay User Equipment (UE), comprising:
    a control circuit;
    a processor installed in the control circuit; and
    a memory installed in the control circuit and operatively coupled to the processor;
    wherein the processor is configured to execute a program code stored in the memory to:
       receive a first PC5 message from a first remote UE for initiating a first direct link establishment procedure for supporting a UE-to-UE (U2U) relay communication between the first remote UE and a second remote UE via the relay UE;
       send, in response to reception of the first PC5 message, a second PC5 message to the second remote UE for initiating a second direct link establishment procedure for supporting the U2U relay communication, wherein the second PC5 message includes at least one of an upper layer identity or an application layer identity identifying the second remote UE, and wherein the relay UE starts a timer T5080 for the second direct link establishment procedure associated with the second remote UE; and
       send a reject message corresponding to the first PC5 message to the first remote UE in the first direct link establishment procedure in response to the second direct link establishment procedure not being completed within a period that is controlled based on the timer T5080.

12. The relay UE of claim 11, wherein the first PC5 message is a Direct Communication Request message.

13. The relay UE of claim 11, wherein the second PC5 message is a Direct Communication Request message.

14. The relay UE of claim 11, wherein the first PC5 message includes information identifying the first remote UE.

15. The relay UE of claim 11, wherein the first PC5 message includes information identifying the second remote UE.

16. The relay UE of claim 11, wherein the second PC5 message includes information identifying the first remote UE.

17. The relay UE of claim 11, wherein the information in the second PC5 message comprises the upper layer identity identifying the second remote UE.

18. The relay UE of claim 11, wherein the information in the second PC5 message comprises the application layer identity identifying the second remote UE.

19. The relay UE of claim 11, wherein the processor is configured to execute the program code stored in the memory to:
    receive a third PC5 message from a third remote UE for initiating a third direct link establishment procedure for supporting a second U2U relay communication between the third remote UE and a fourth remote UE via the relay UE;
    send, to the fourth remote UE and in response to reception of the third PC5 message, a fourth PC5 message including information, comprising at least one of a second upper layer identity or a second application layer identity, identifying the fourth remote UE for initiating a fourth direct link establishment procedure for supporting the second U2U relay communication; and
    send a first response message corresponding to the third PC5 message to the third remote UE for completing the third direct link establishment procedure when the fourth direct link establishment procedure is completed by receiving a second response message corresponding to the fourth PC5 message from the fourth remote UE.

20. A relay User Equipment (UE), comprising:

a control circuit;

a processor installed in the control circuit; and a memory installed in the control circuit and operatively coupled to the processor;

wherein the processor is configured to execute a program code stored in the memory to:

receive a first PC5 message from a first remote UE for initiating a first direct link establishment procedure for supporting a UE-to-UE (U2U) relay communication between the first remote UE and a second remote UE via the relay UE;

send, in response to reception of the first PC5 message, a second PC5 message including information, comprising at least one of an upper layer identity or an application layer identity, identifying the second remote UE for initiating a second direct link establishment procedure for supporting the U2U relay communication; and without a link having been established between the relay UE and the first remote UE nor between the relay UE and the second remote UE, send a reject message corresponding to the first PC5 message to the first remote UE when the second direct link establishment procedure is not completed within a period that is controlled based on a timer such that neither the first direct link establishment procedure nor the second direct link establishment procedure is completed successfully.

\* \* \* \* \*